May 6, 1952 R. E. HERSEY 2,595,944
REVERTING CALL CIRCUITS
Filed Oct. 29, 1948 64 Sheets-Sheet 1

INVENTOR
R. E. HERSEY
BY
P. C. Smith
ATTORNEY

INVENTOR
R. E. HERSEY
BY
ATTORNEY

May 6, 1952

R. E. HERSEY 2,595,944

REVERTING CALL CIRCUITS

Filed Oct. 29, 1948

64 Sheets-Sheet 16

FIG. 16

INVENTOR
R. E. HERSEY
BY
P. C. Smith
ATTORNEY

May 6, 1952 R. E. HERSEY 2,595,944
REVERTING CALL CIRCUITS
Filed Oct. 29, 1948 64 Sheets-Sheet 18

INVENTOR
R. E. HERSEY
BY
ATTORNEY

May 6, 1952 — R. E. HERSEY — 2,595,944
REVERTING CALL CIRCUITS
Filed Oct. 29, 1948 — 64 Sheets-Sheet 23

INVENTOR
R.E. HERSEY
BY
P.C. Smith
ATTORNEY

May 6, 1952     R. E. HERSEY     2,595,944
REVERTING CALL CIRCUITS
Filed Oct. 29, 1948     64 Sheets—Sheet 28

INVENTOR
R.E. HERSEY
BY
ATTORNEY

May 6, 1952 — R. E. HERSEY — 2,595,944
REVERTING CALL CIRCUITS
Filed Oct. 29, 1948 — 64 Sheets-Sheet 36

INVENTOR
R. E. HERSEY
BY P. C. Smith
ATTORNEY

May 6, 1952 R. E. HERSEY 2,595,944
REVERTING CALL CIRCUITS
Filed Oct. 29, 1948 64 Sheets-Sheet 43

INVENTOR
R. E. HERSEY
BY
P. C. Smith
ATTORNEY

May 6, 1952  R. E. HERSEY  2,595,944
REVERTING CALL CIRCUITS
Filed Oct. 29, 1948  64 Sheets-Sheet 44

INVENTOR
R. E. HERSEY
BY
P. C. Smith
ATTORNEY

May 6, 1952  R. E. HERSEY  2,595,944
REVERTING CALL CIRCUITS
Filed Oct. 29, 1948  64 Sheets-Sheet 48

INVENTOR
R.E. HERSEY
BY
*P. C. Smith*
ATTORNEY

May 6, 1952 — R. E. HERSEY — 2,595,944
REVERTING CALL CIRCUITS
Filed Oct. 29, 1948 — 64 Sheets-Sheet 50

INVENTOR
R. E. HERSEY
BY P. C. Smith
ATTORNEY

May 6, 1952

R. E. HERSEY 2,595,944

REVERTING CALL CIRCUITS

Filed Oct. 29, 1948

64 Sheets-Sheet 54

FIG. 54

INVENTOR
R. E. HERSEY
BY
P. C. Smith
ATTORNEY

May 6, 1952 R. E. HERSEY 2,595,944
REVERTING CALL CIRCUITS
Filed Oct. 29, 1948 64 Sheets-Sheet 55

FIG. 55

INVENTOR
R.E. HERSEY
BY
P.C. Smith
ATTORNEY

May 6, 1952  R. E. HERSEY  2,595,944
REVERTING CALL CIRCUITS
Filed Oct. 29, 1948  64 Sheets-Sheet 56

INVENTOR
R. E. HERSEY
BY
P. C. Smith
ATTORNEY

May 6, 1952 R. E. HERSEY 2,595,944
REVERTING CALL CIRCUITS
Filed Oct. 29, 1948 64 Sheets-Sheet 61

INVENTOR
R. E. HERSEY
BY
P. C. Smith
ATTORNEY

INVENTOR
R. E. HERSEY
BY P. C. Smith
ATTORNEY

May 6, 1952

R. E. HERSEY 2,595,944

REVERTING CALL CIRCUITS

Filed Oct. 29, 1948

64 Sheets-Sheet 63

INVENTOR
R. E. HERSEY
BY
P. C. Smith
ATTORNEY

May 6, 1952  R. E. HERSEY  2,595,944
REVERTING CALL CIRCUITS
Filed Oct. 29, 1948  64 Sheets—Sheet 64

Figure 1:
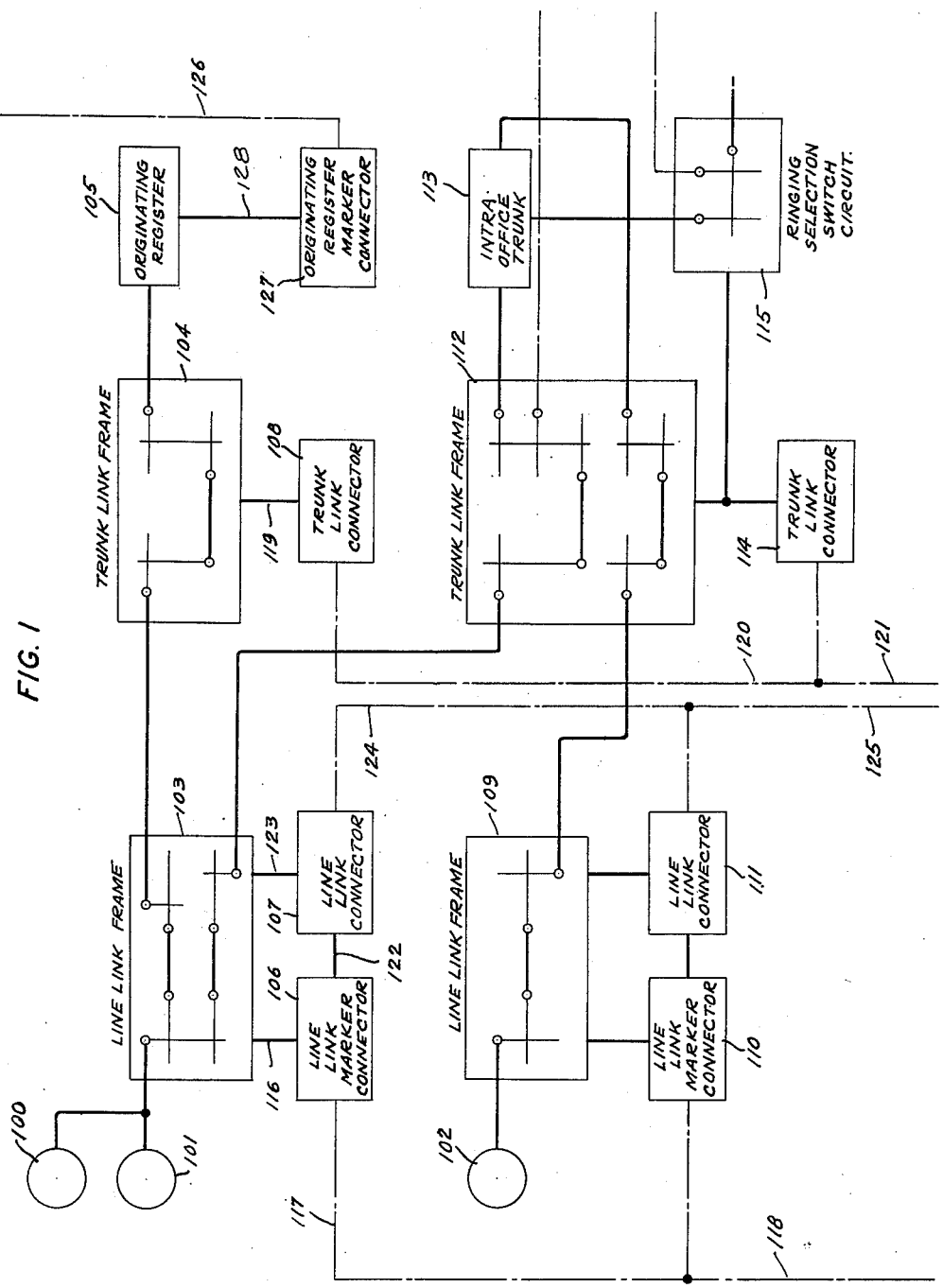
Figure 2:
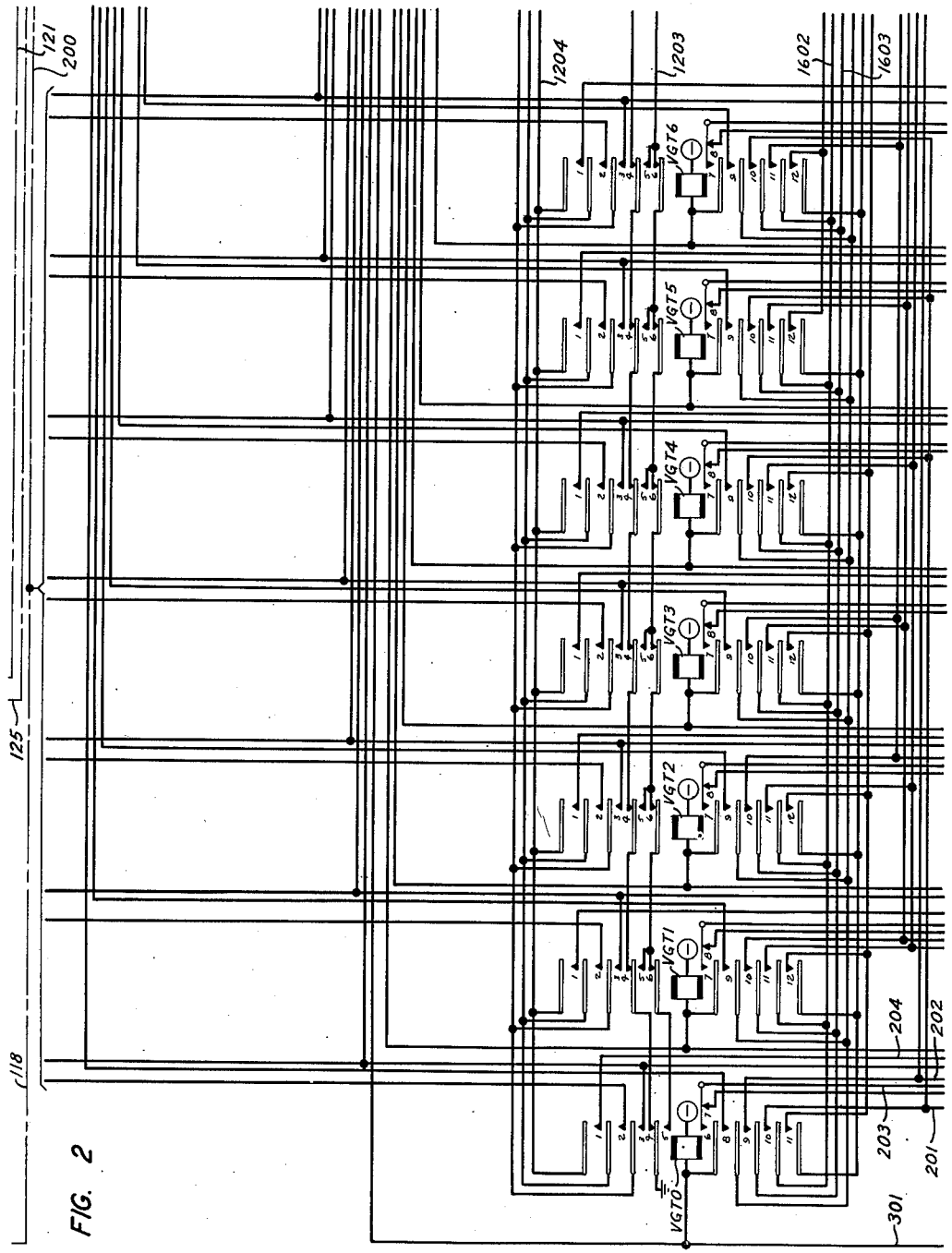
Figure 3:
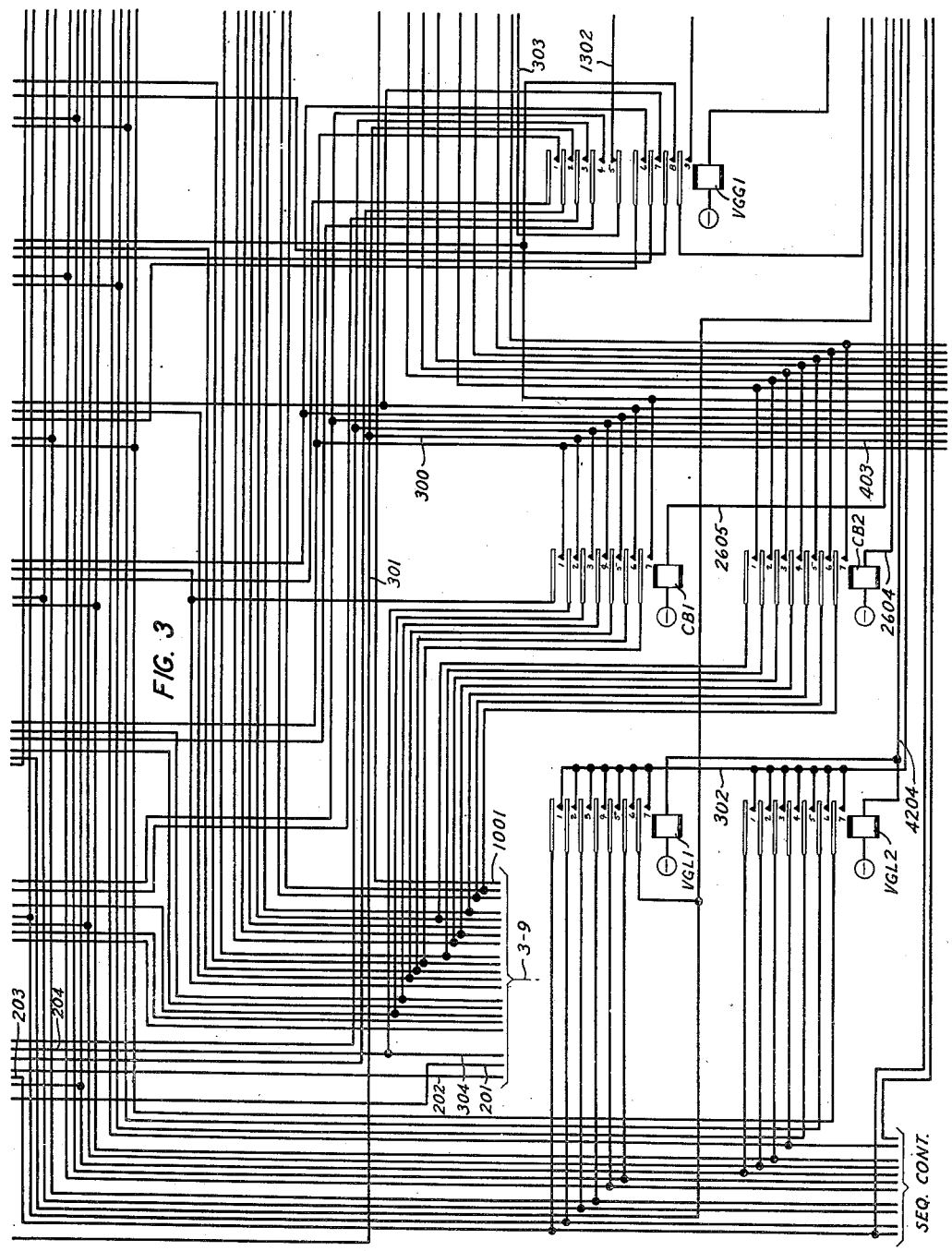
Figure 4:
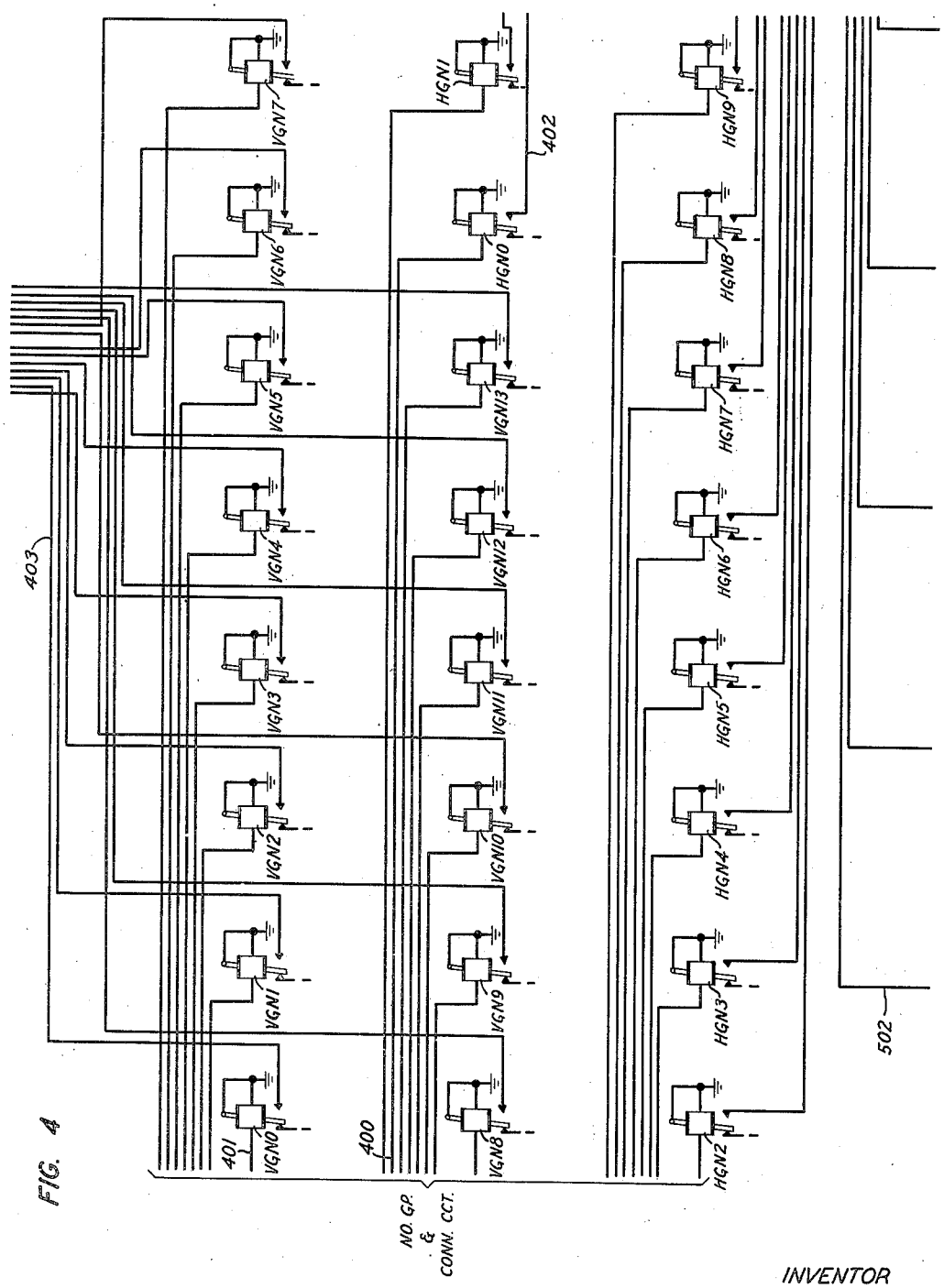
Figure 5:
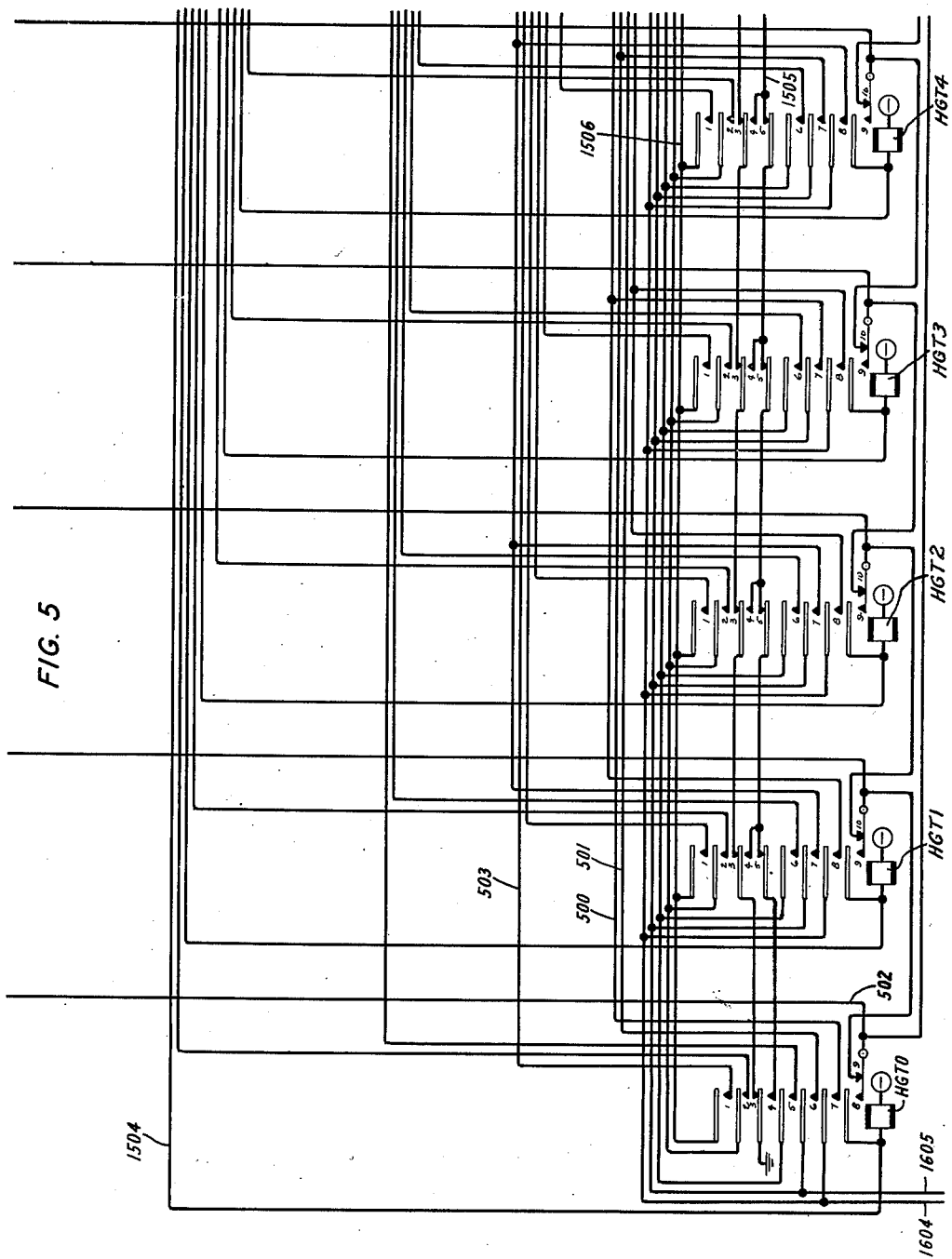
Figure 6:
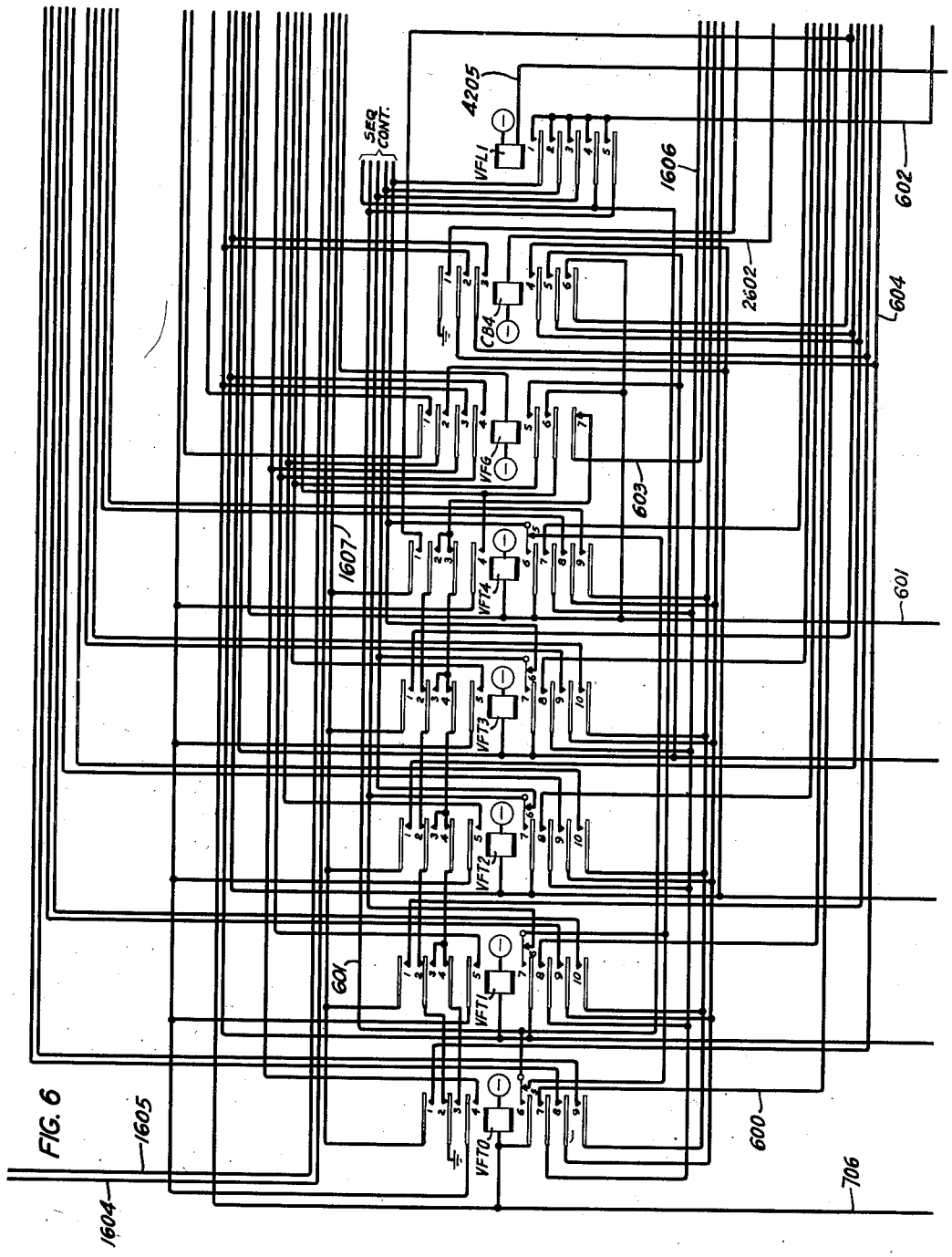
Figure 7:
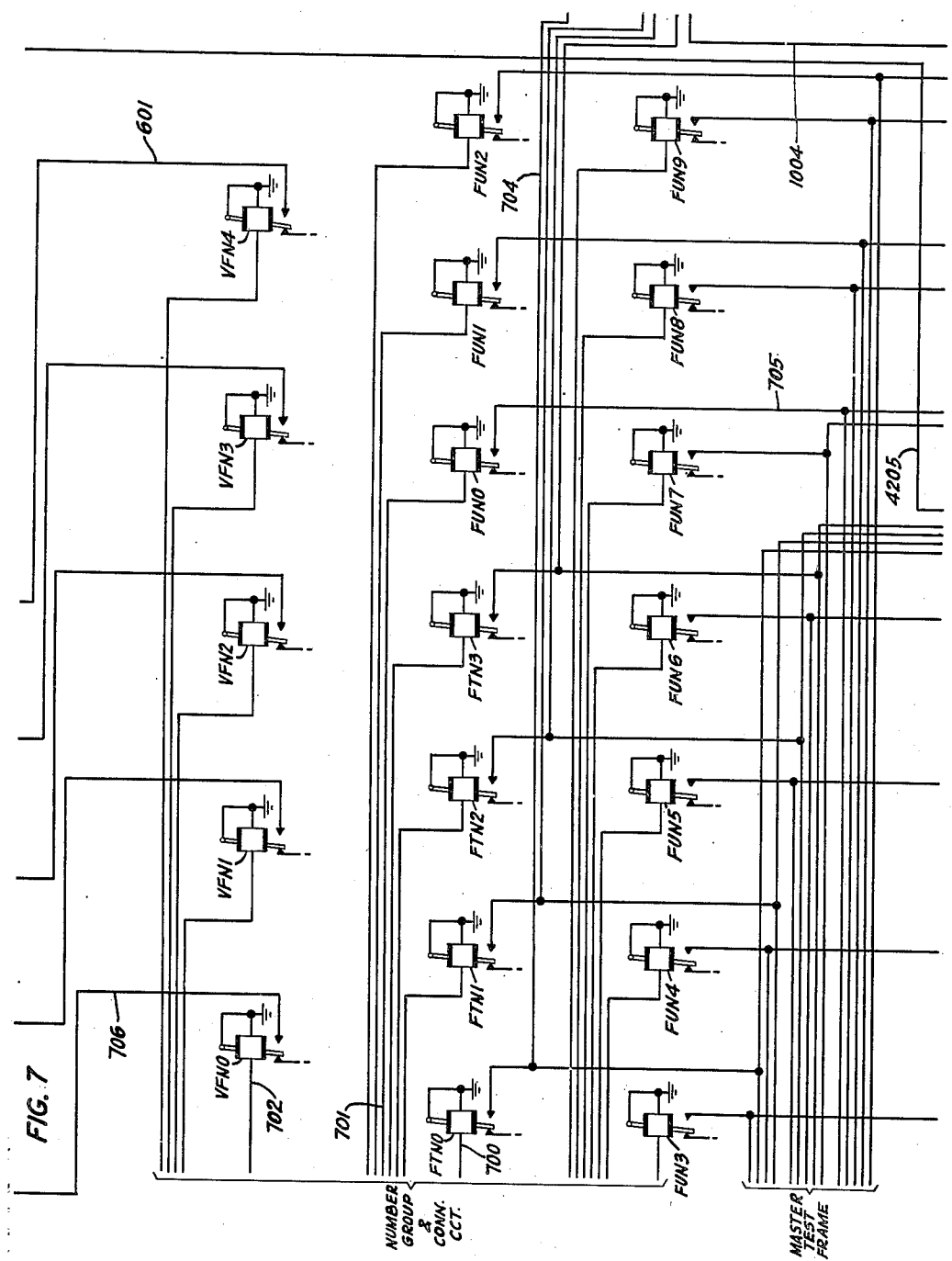
Figure 8:
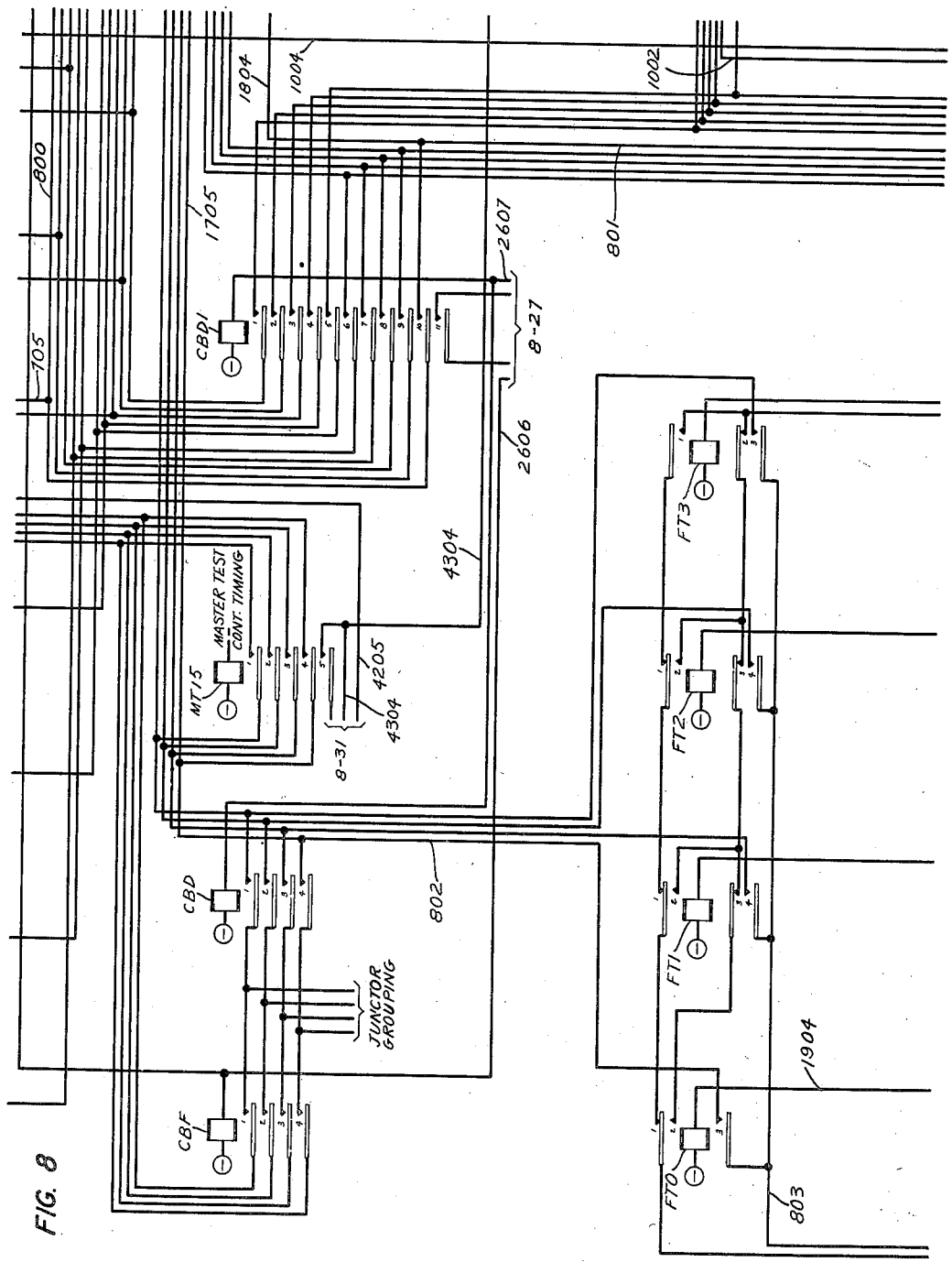
Figure 9:
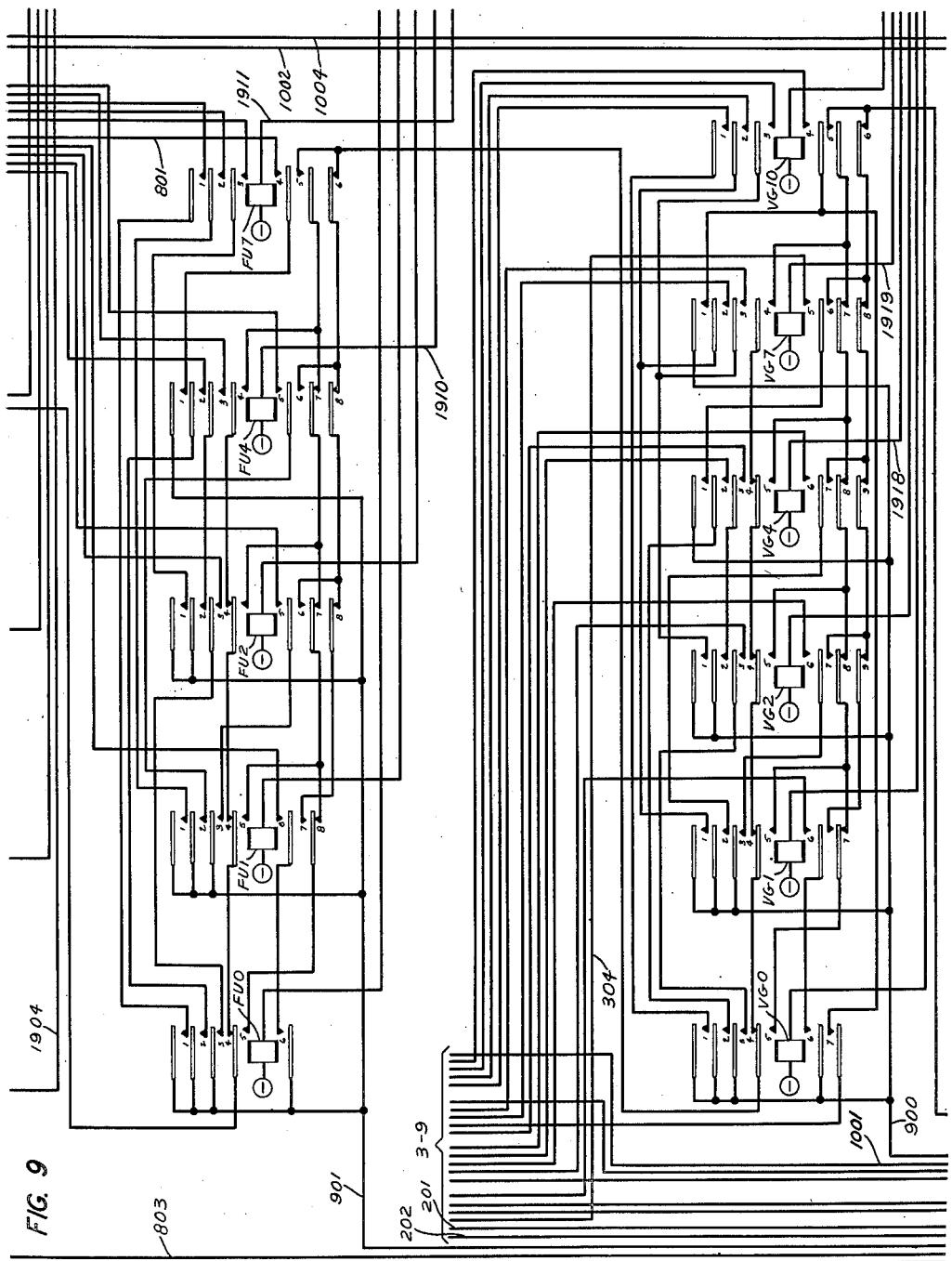
Figure 10:
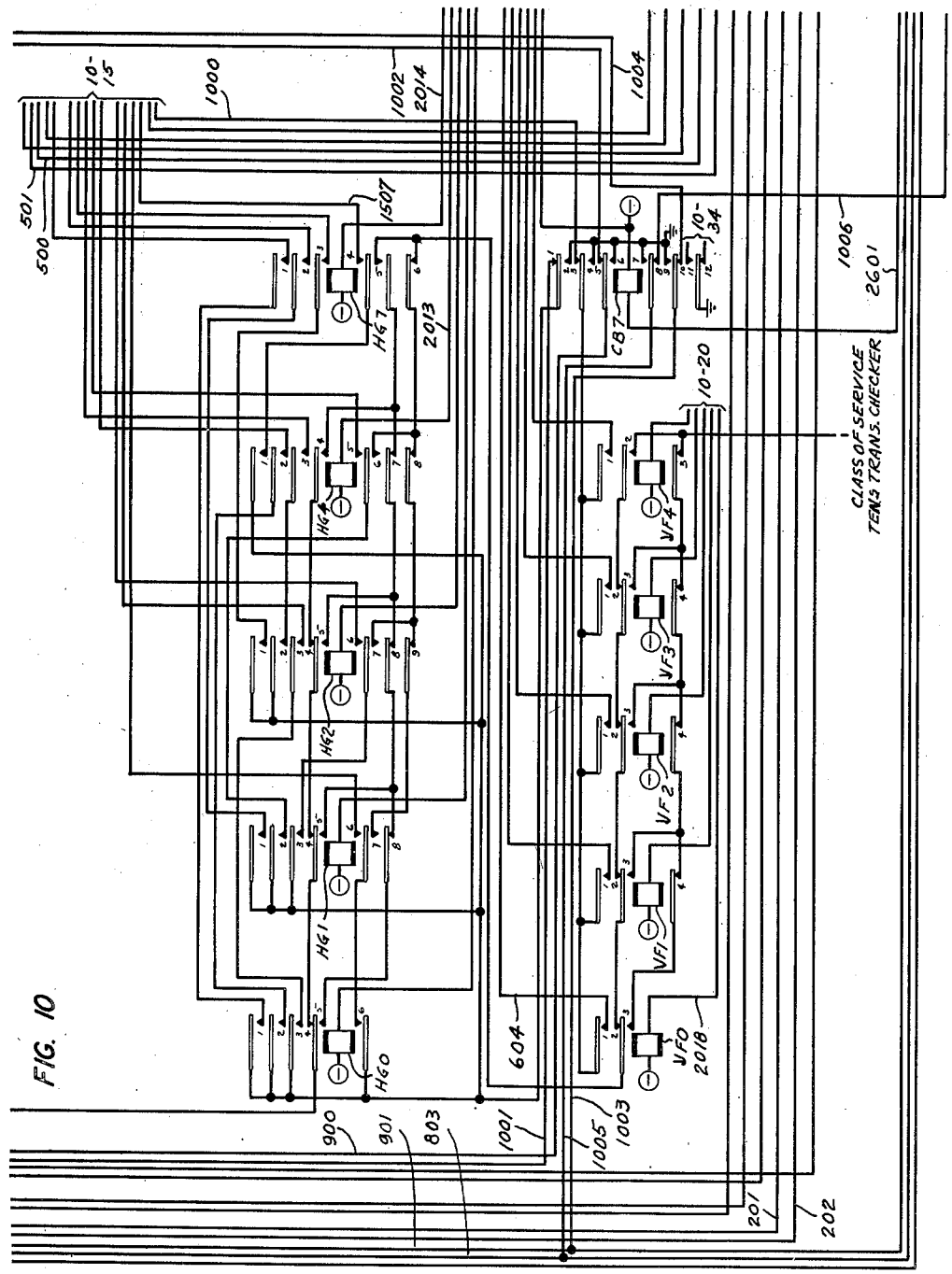
Figure 11:
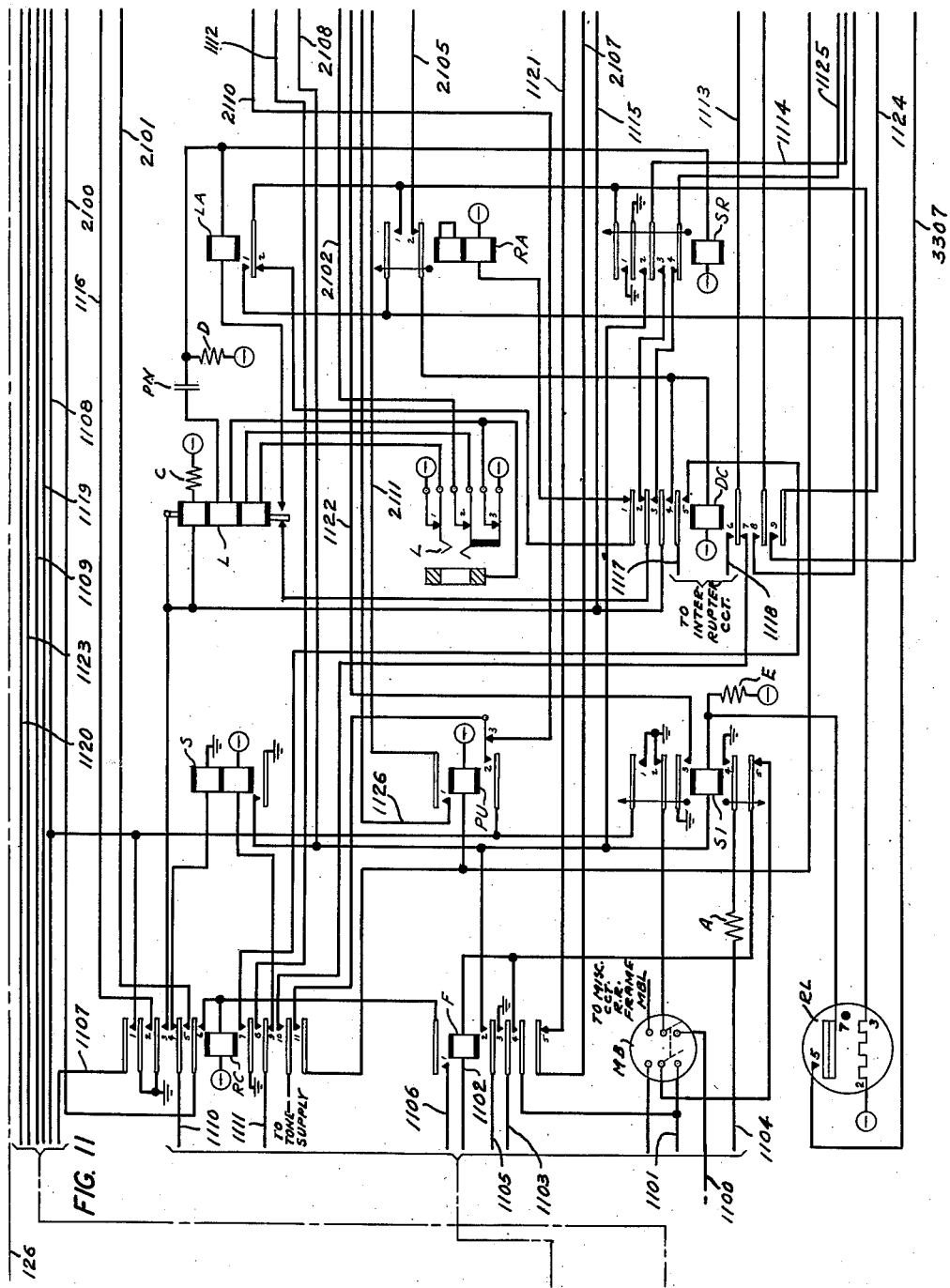
Figure 12:
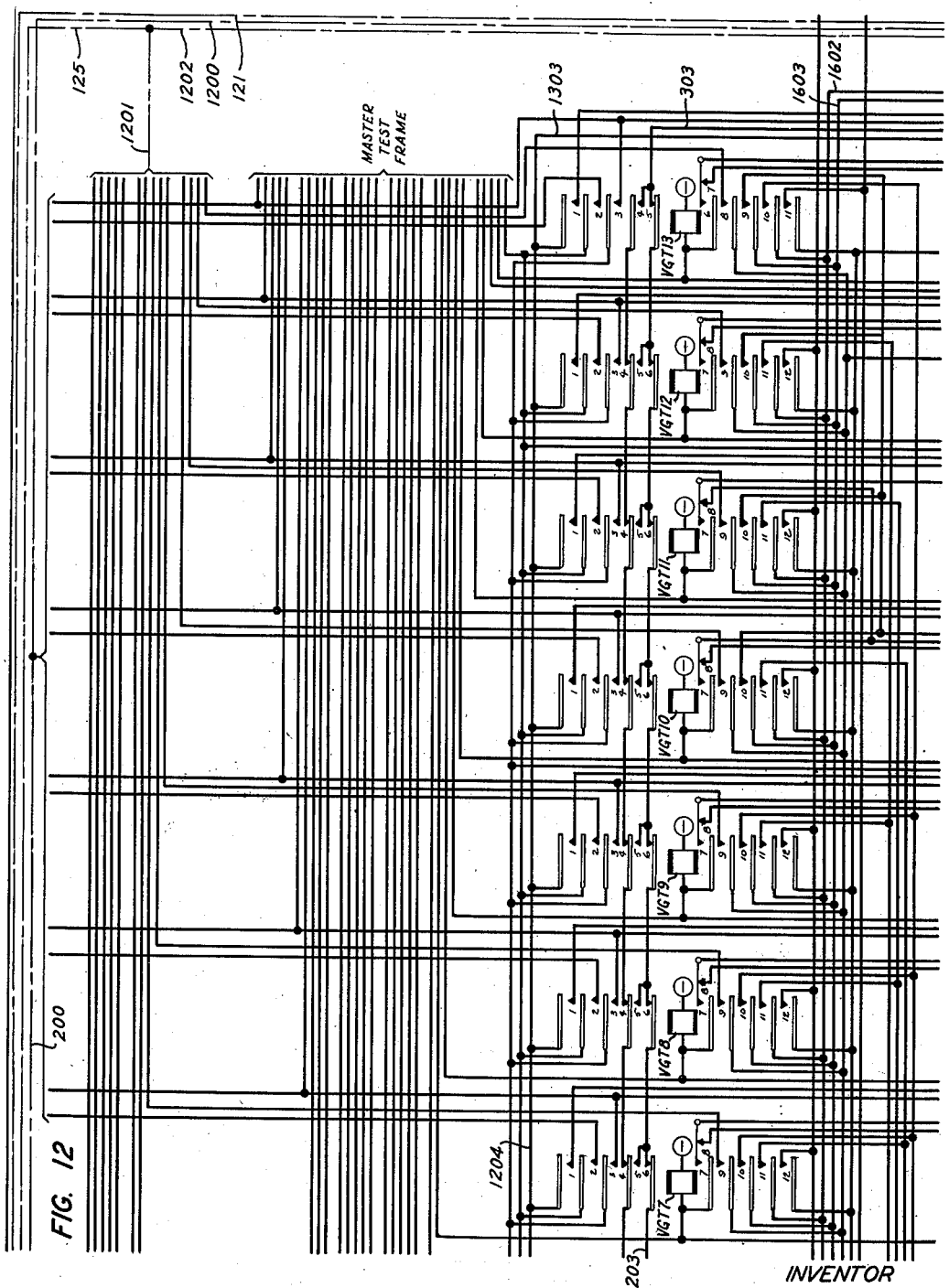
Figure 13:
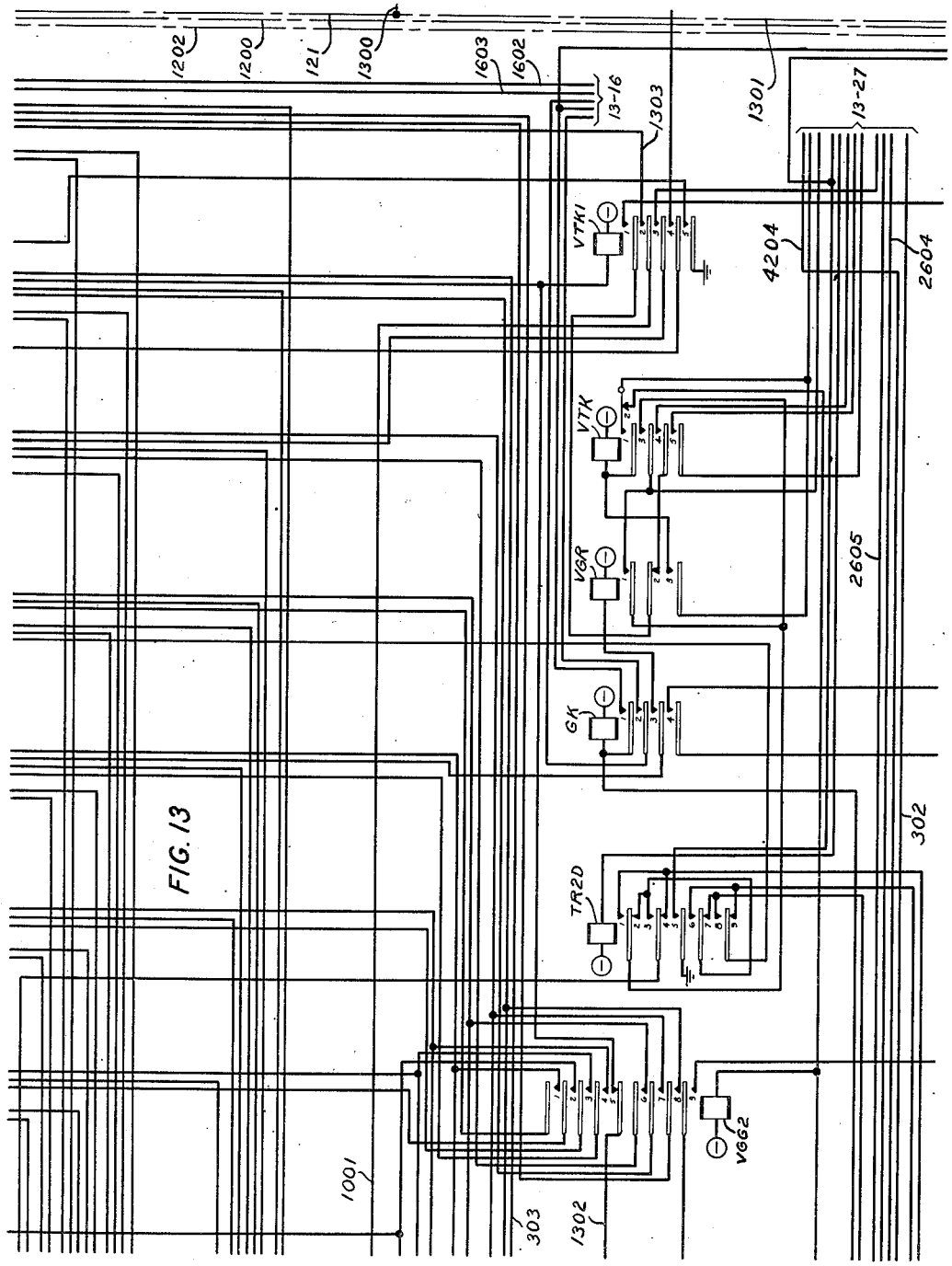
Figure 14:
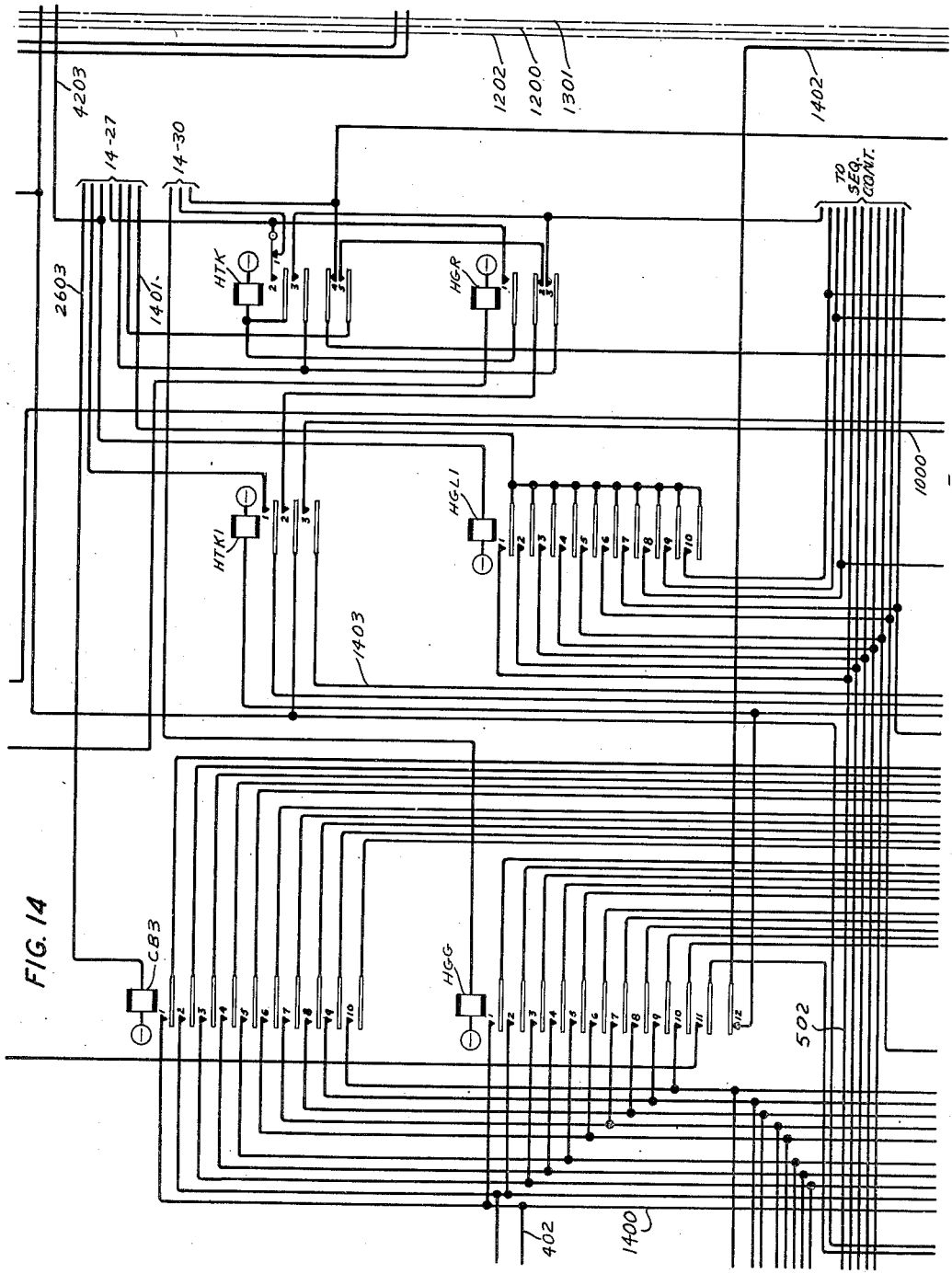
Figure 15:
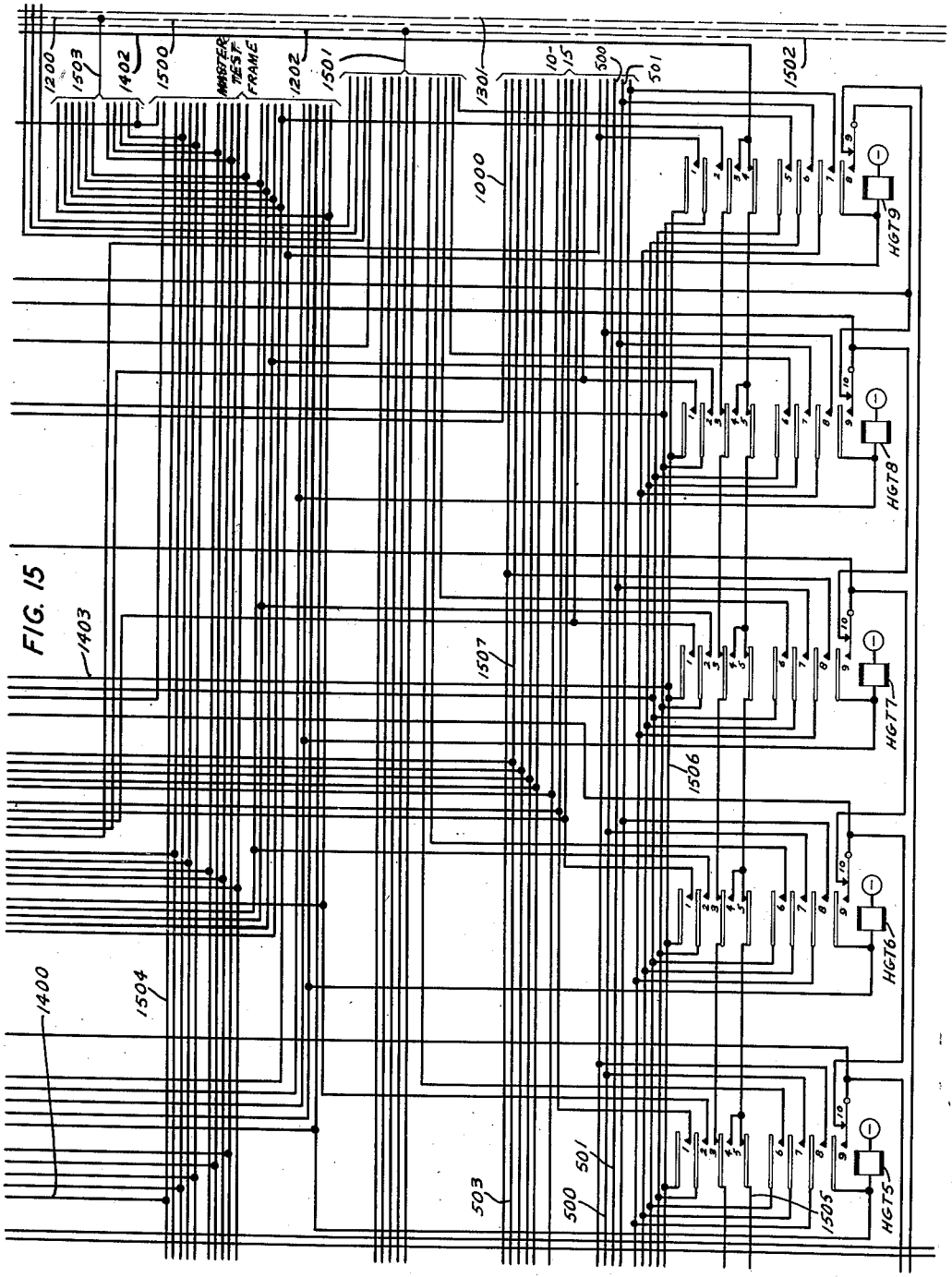
Figure 17:
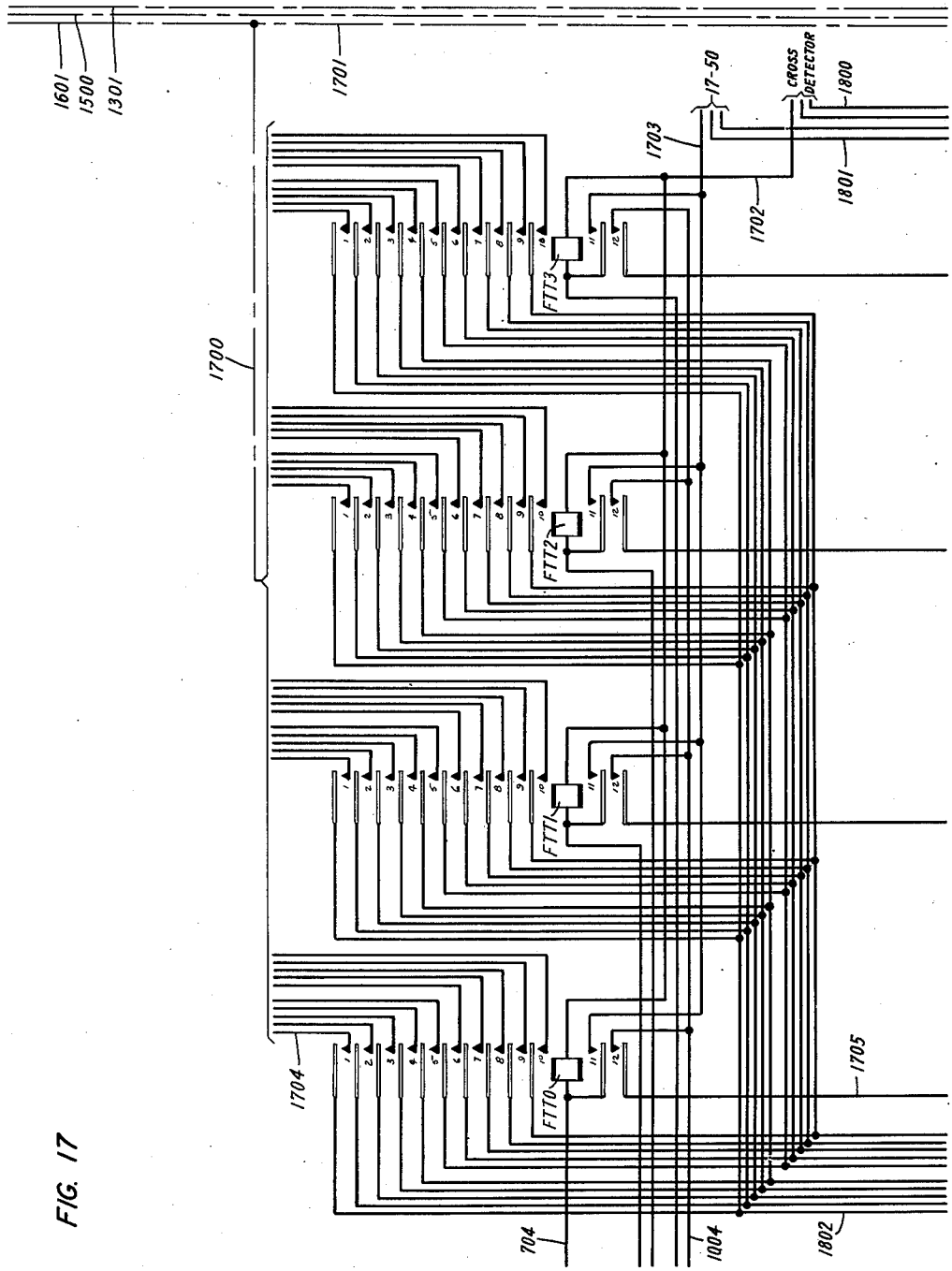
Figure 18:
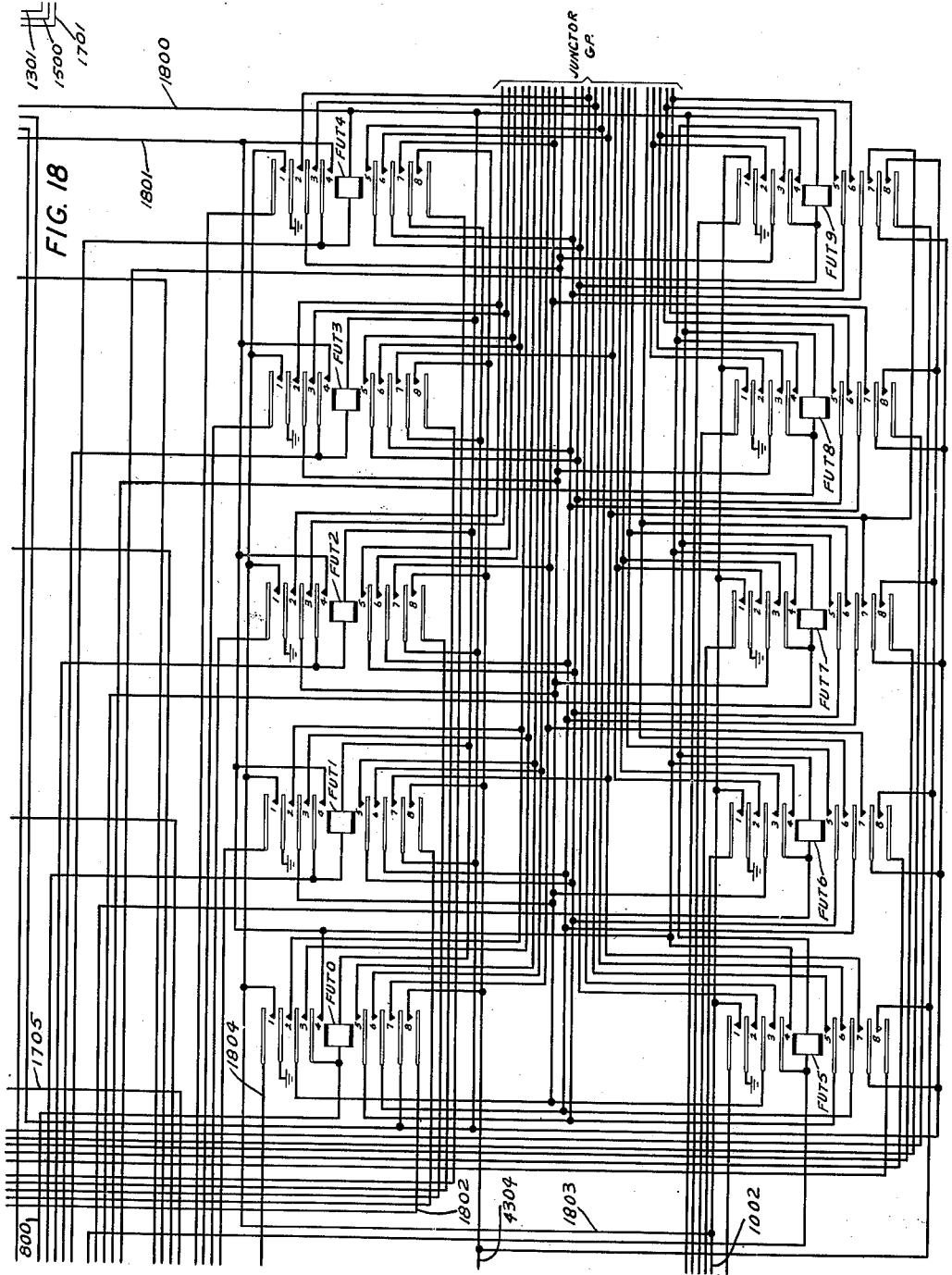
Figure 19:
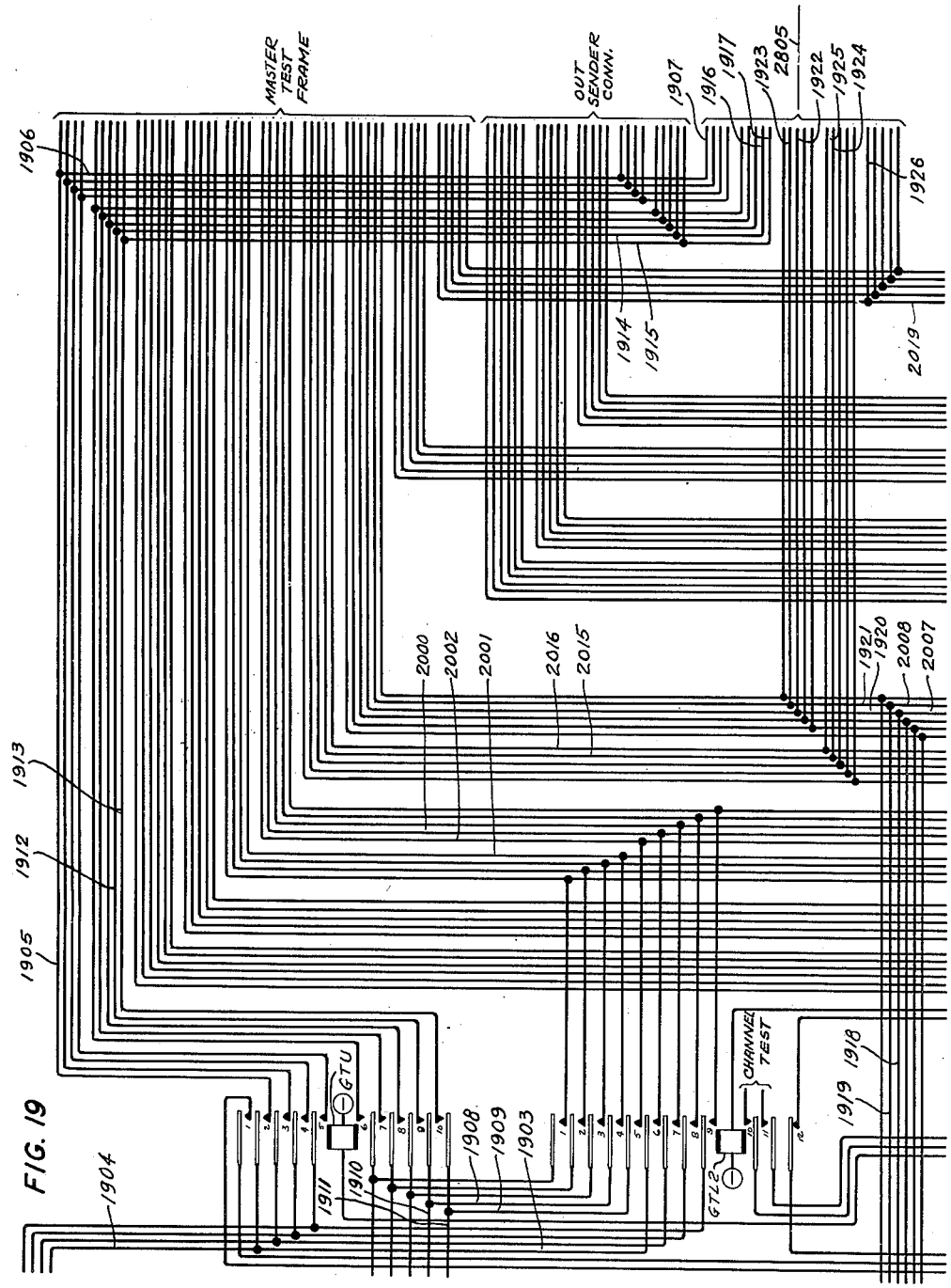
Figure 20:
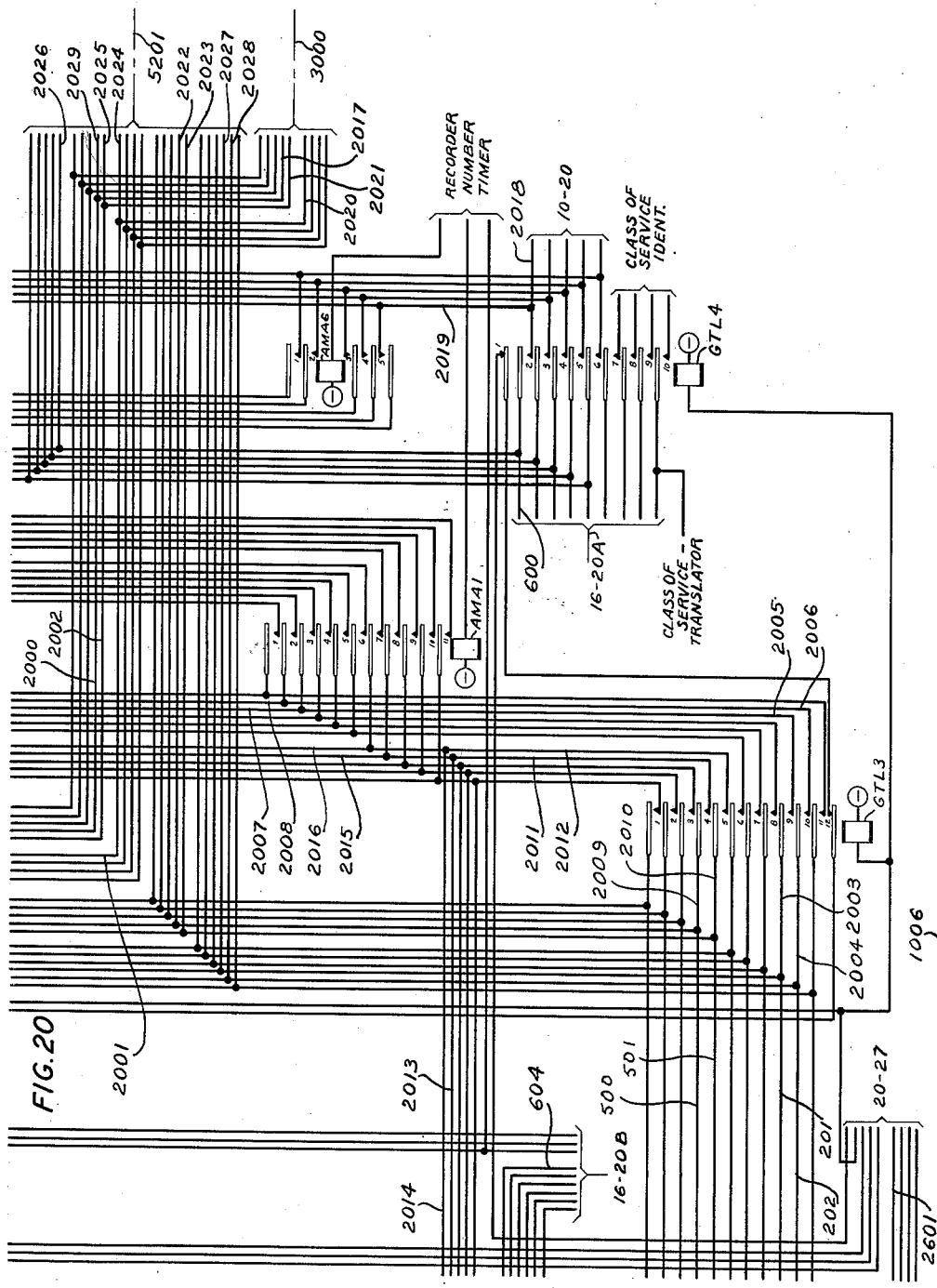
Figure 21:
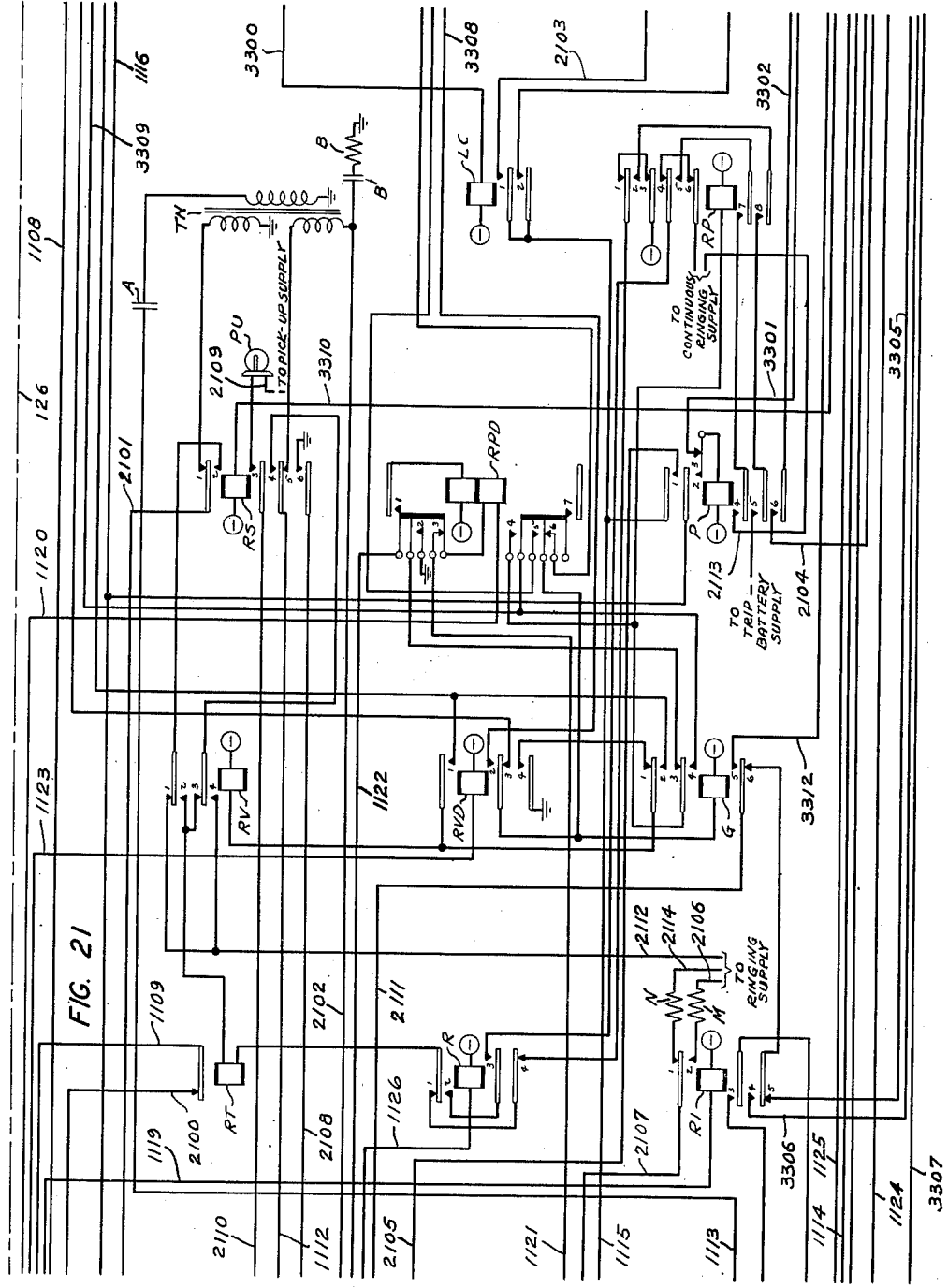
Figure 22:
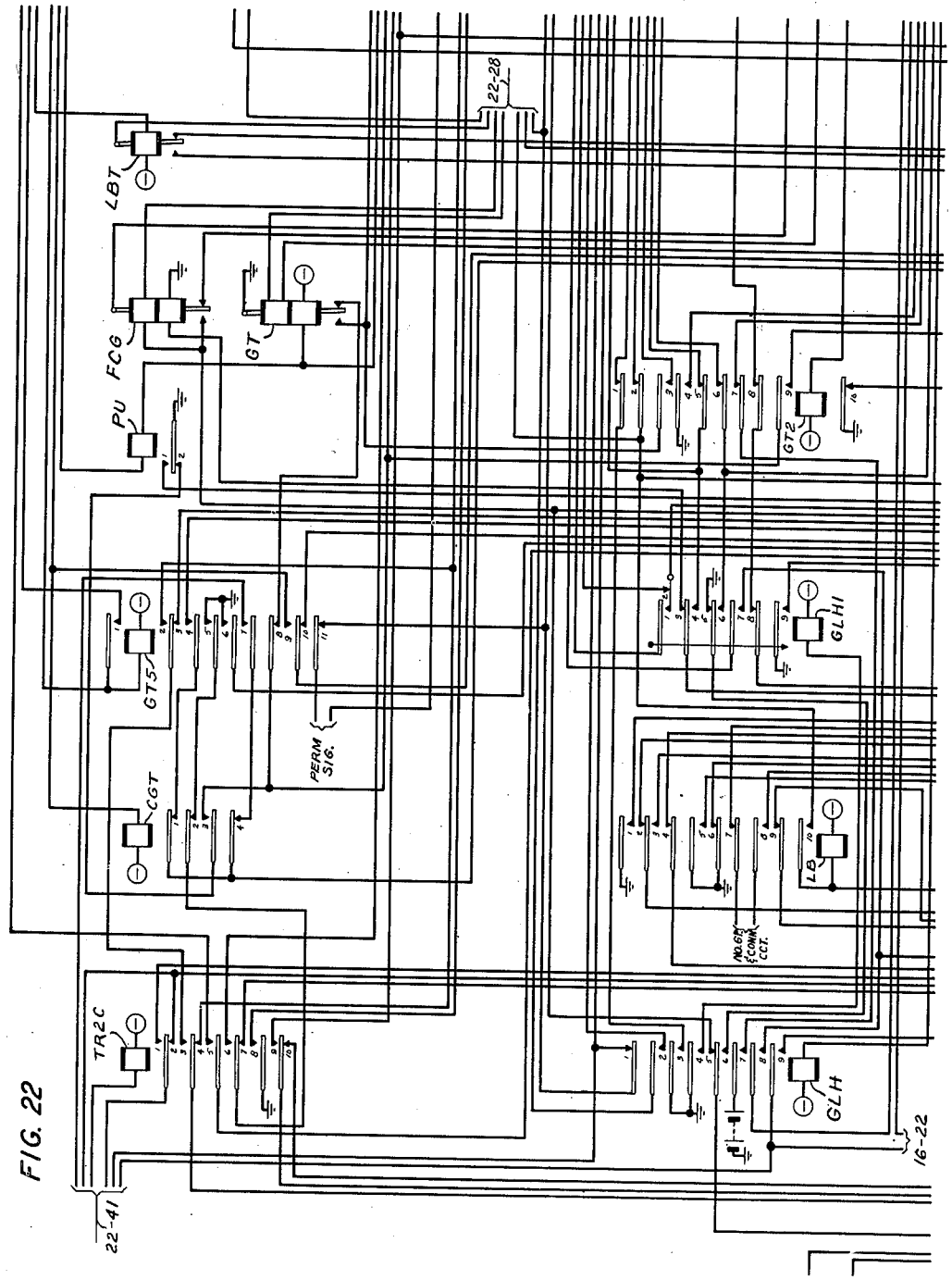
Figure 23:
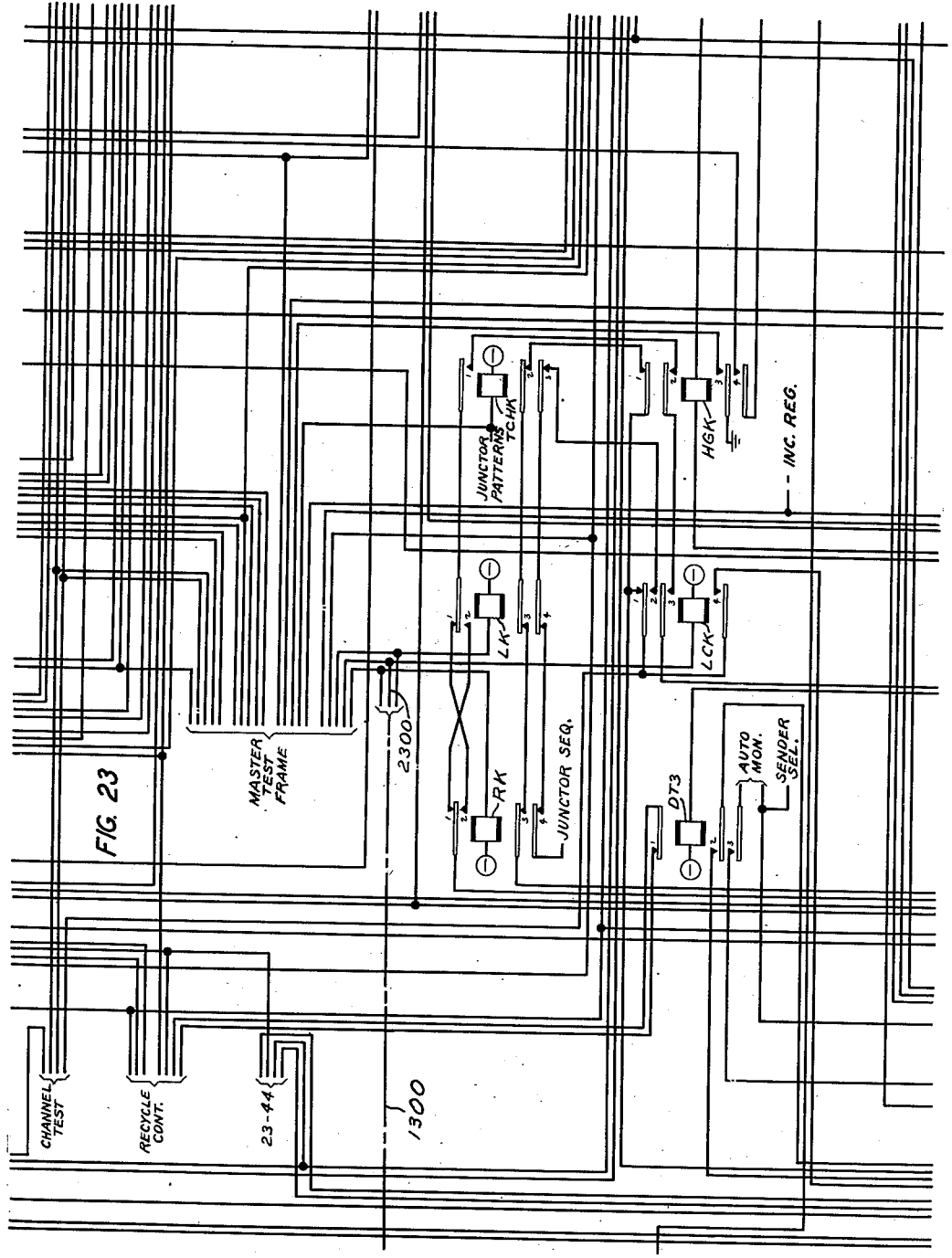
Figure 24:
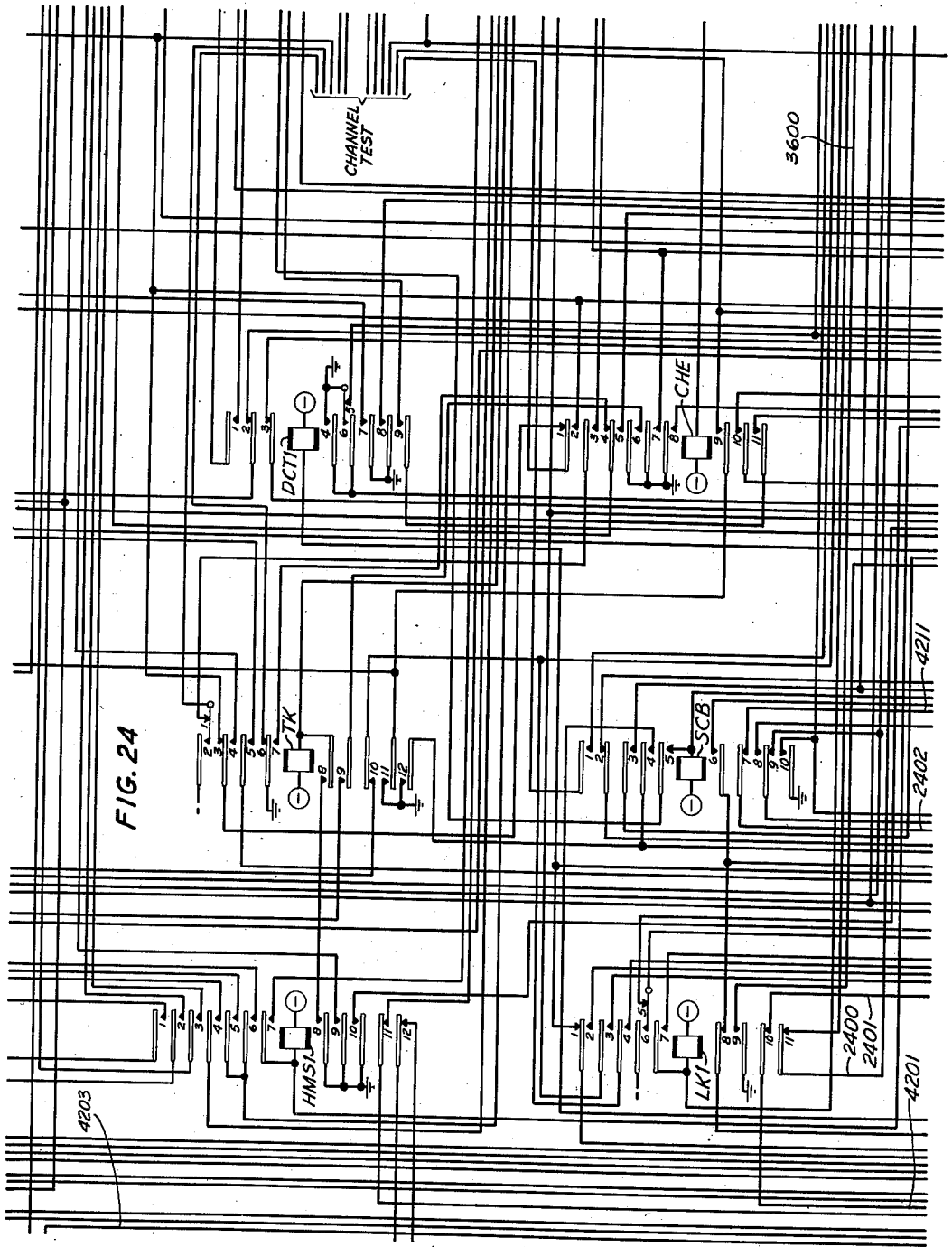
Figure 25:
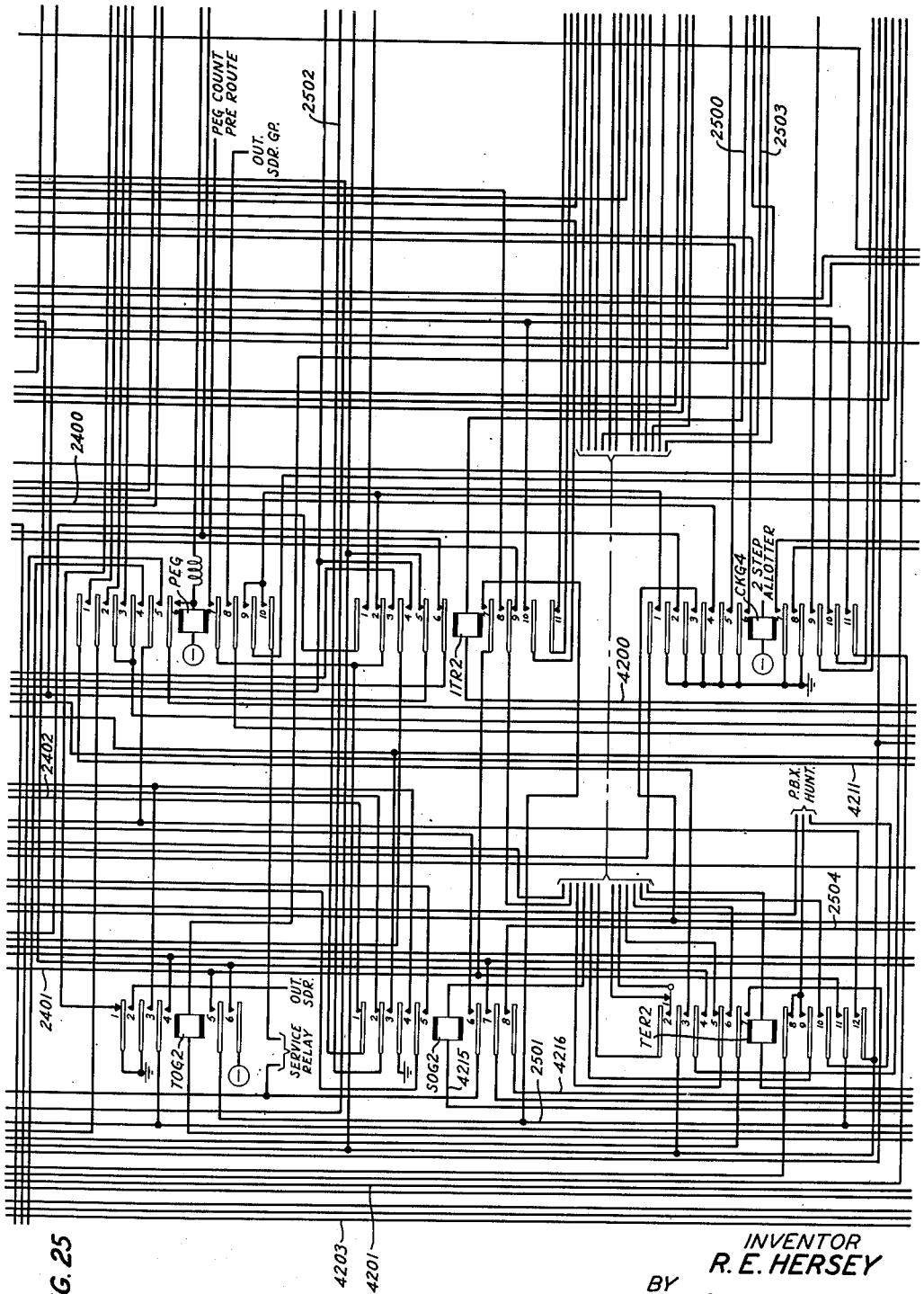
Figure 26:
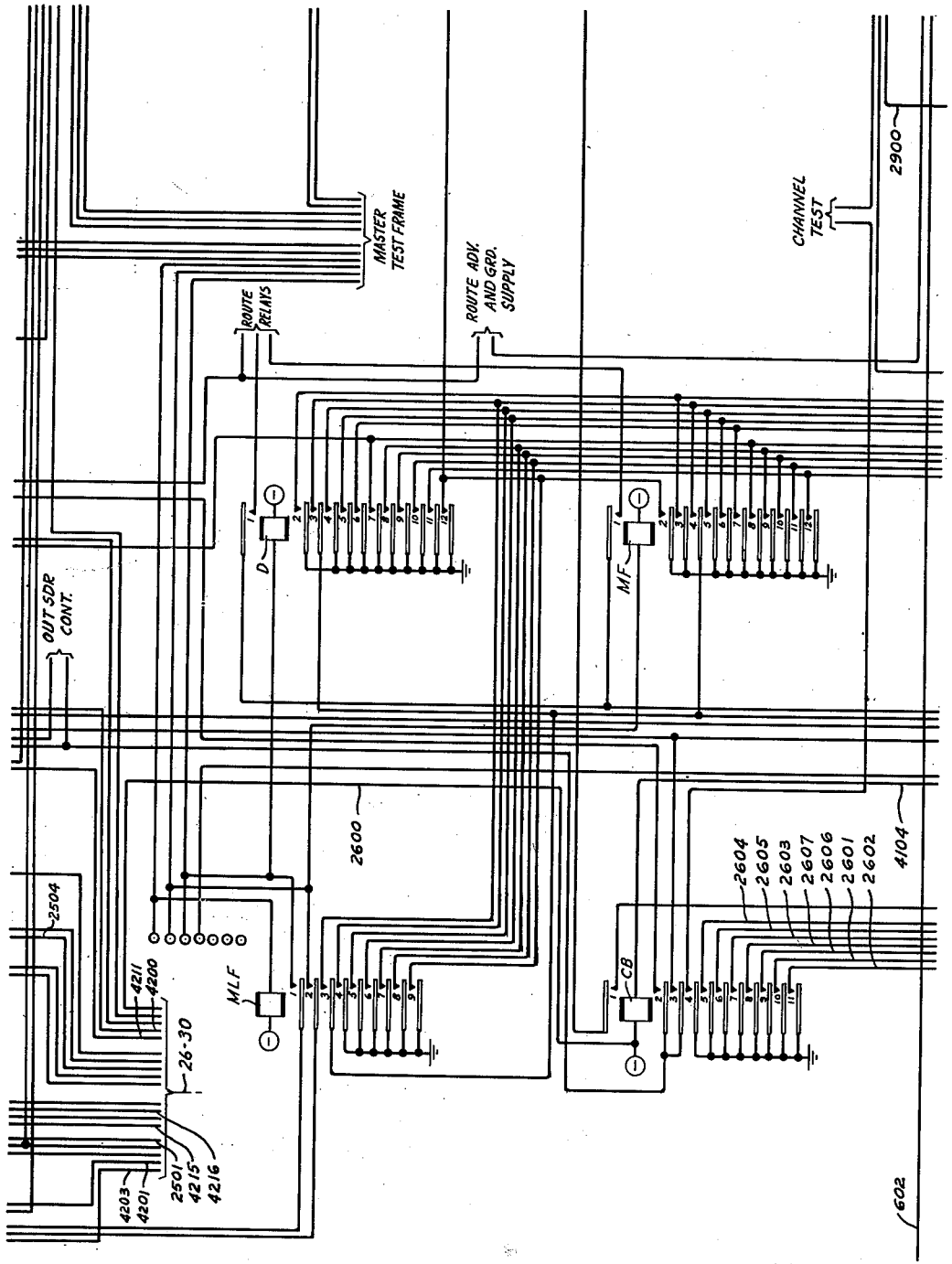
Figure 27:
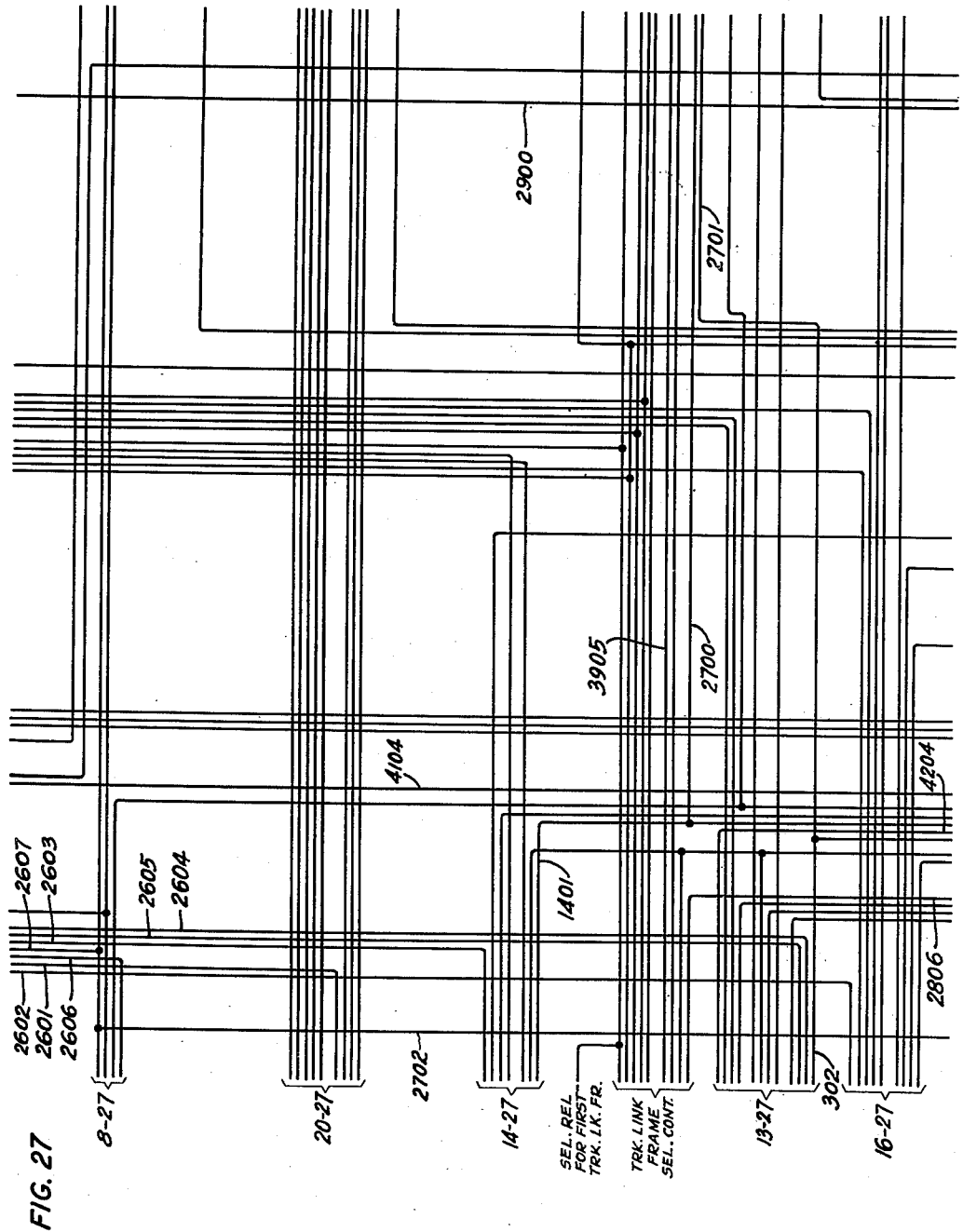
Figure 28:
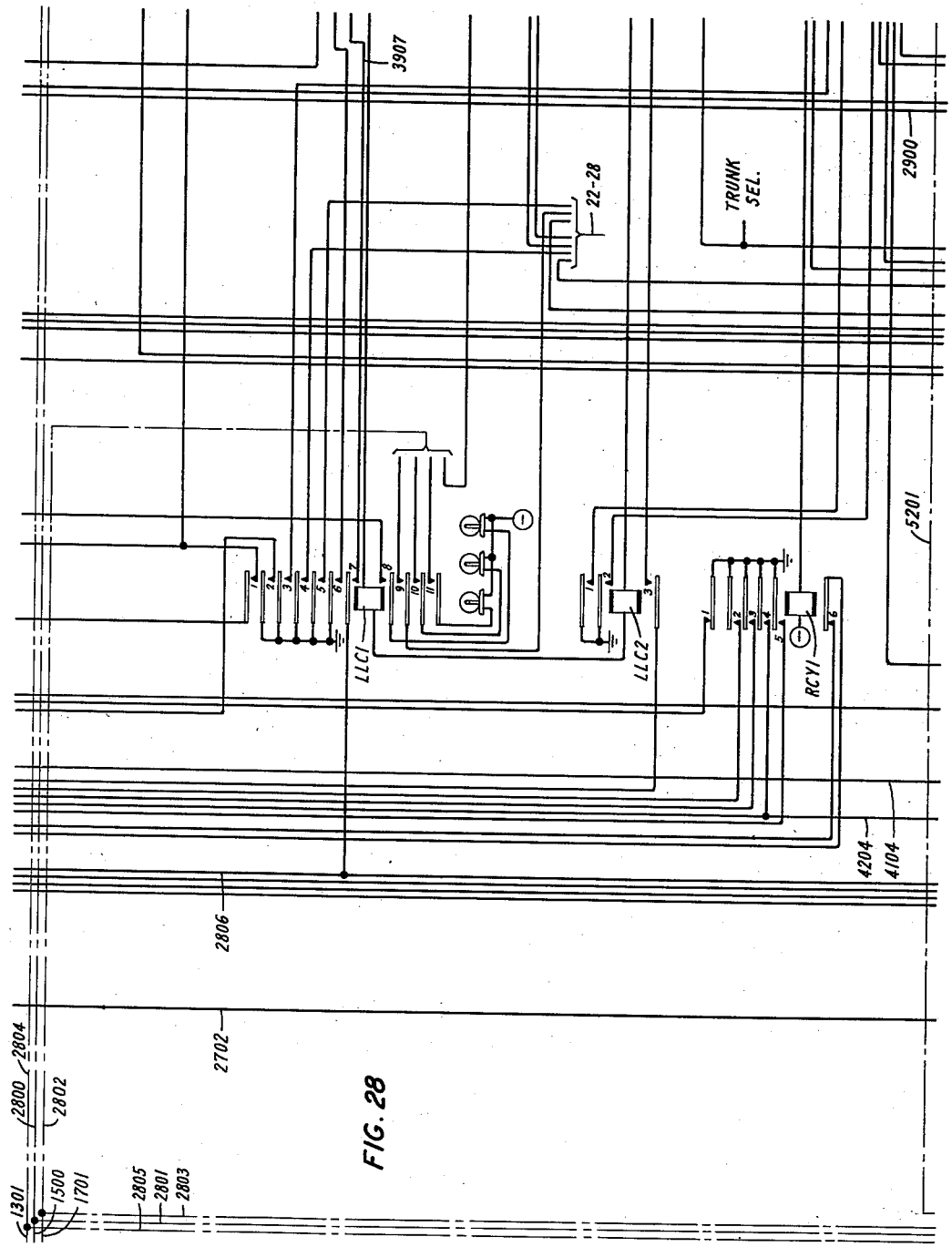
Figure 29:
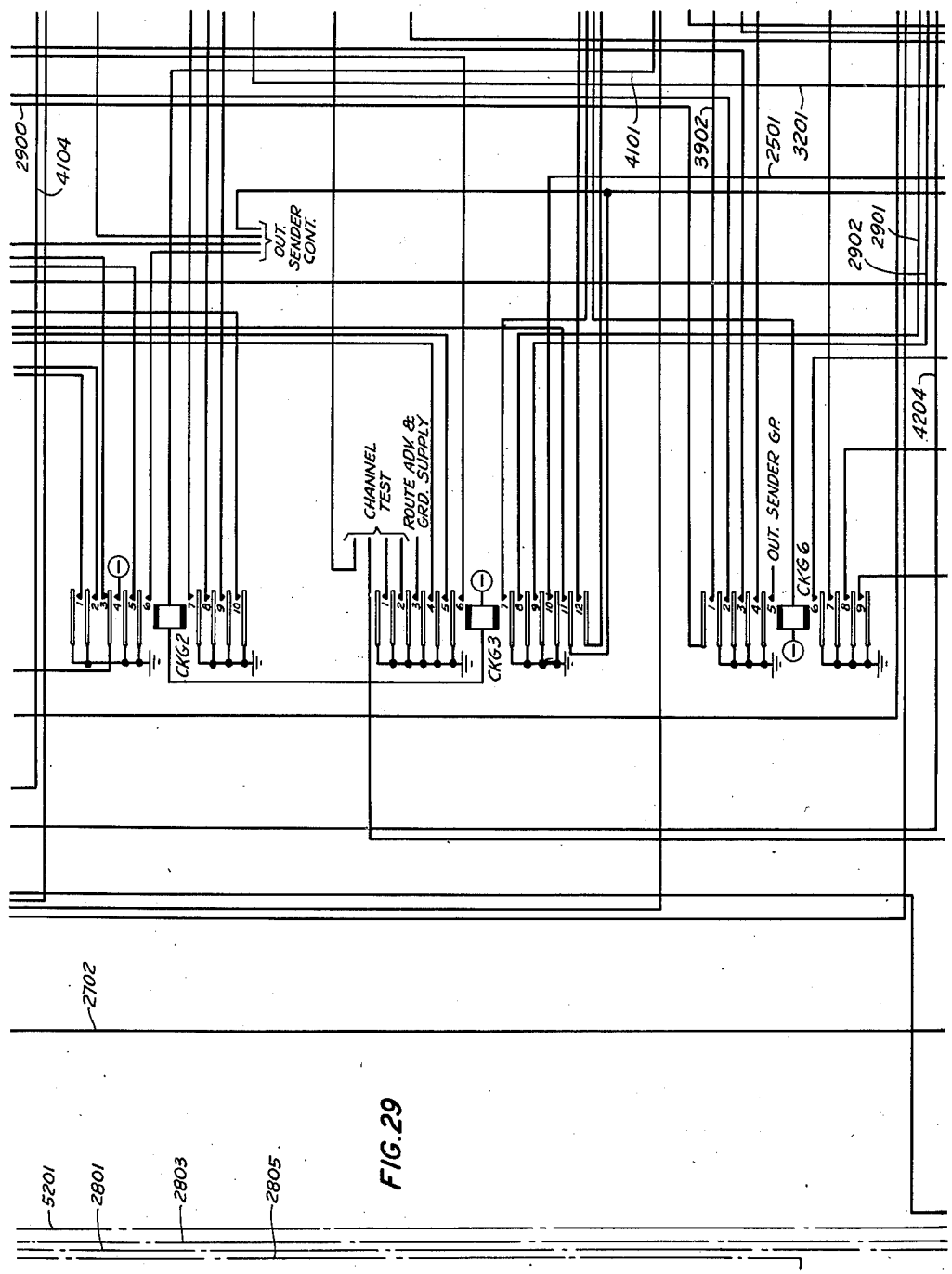
Figure 30:
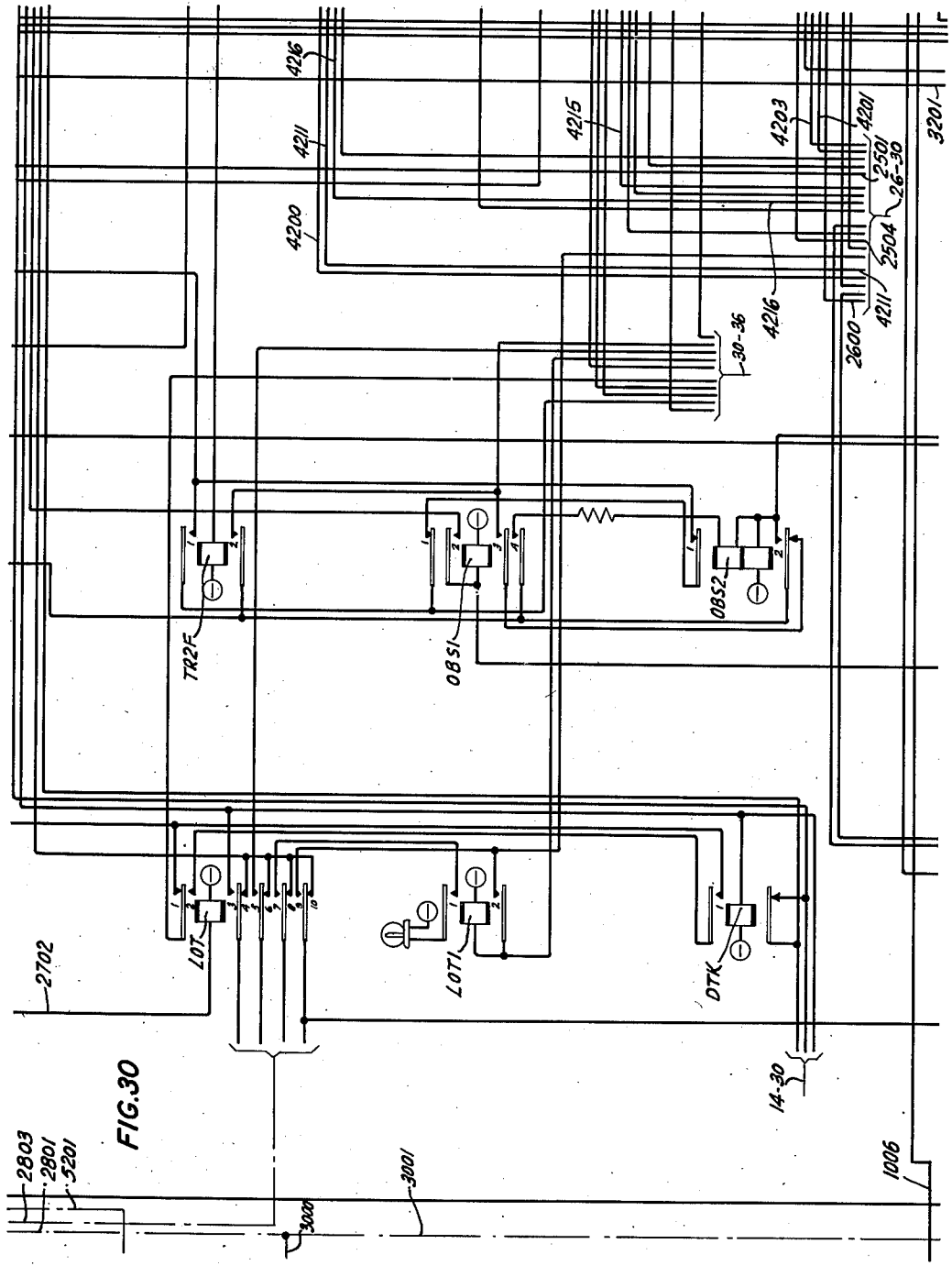
Figure 31:
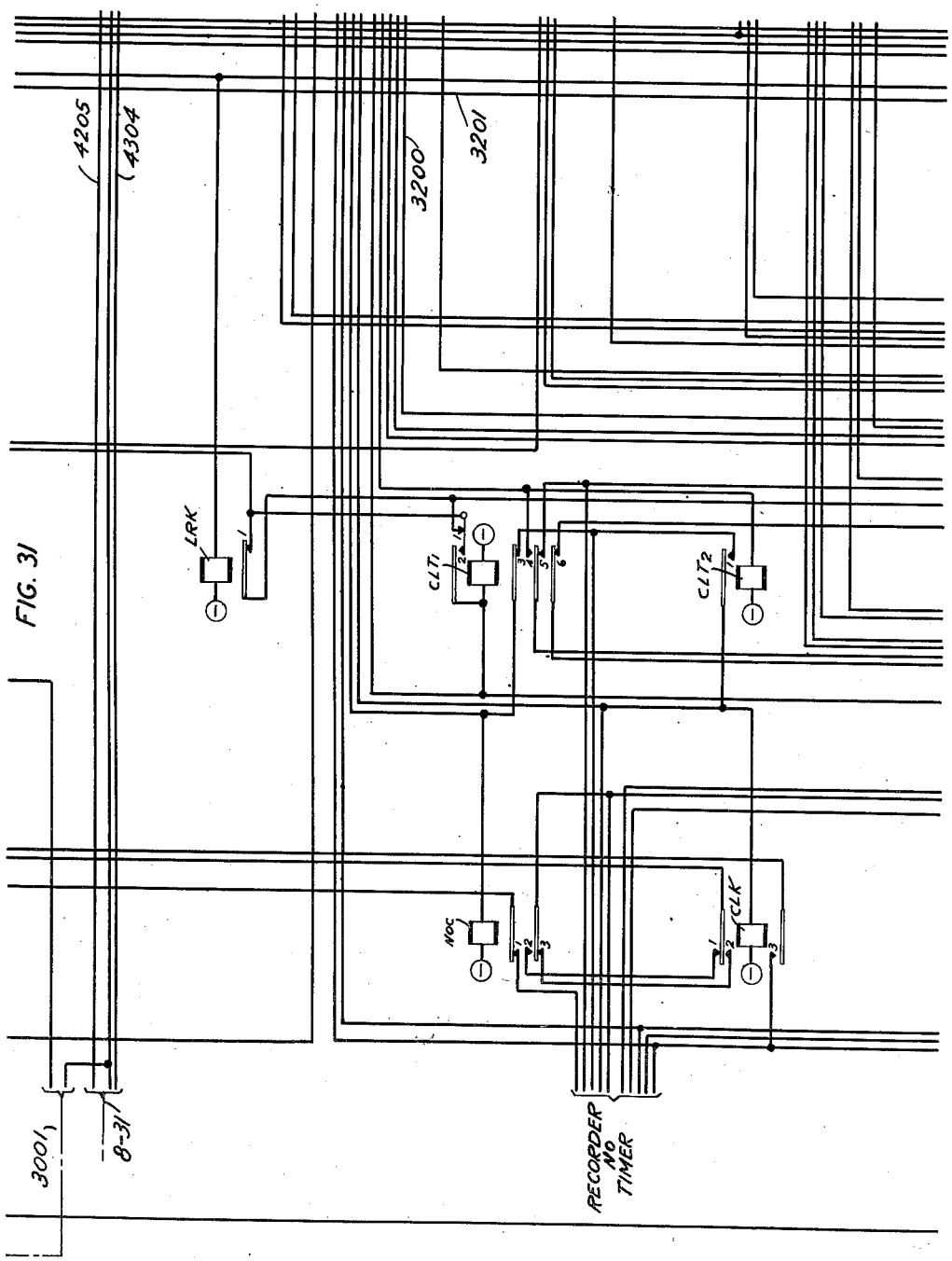
Figure 32:
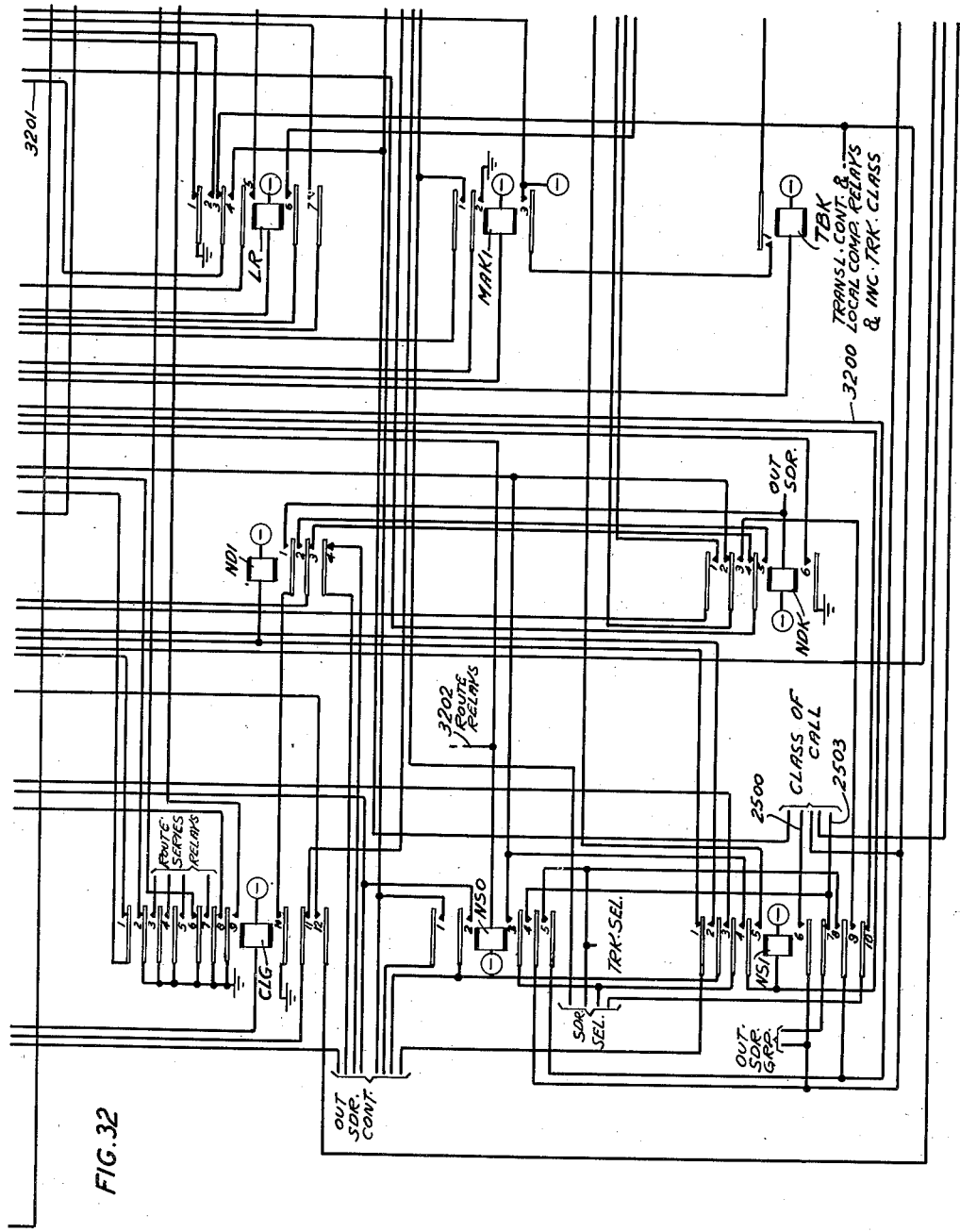
Figure 33:
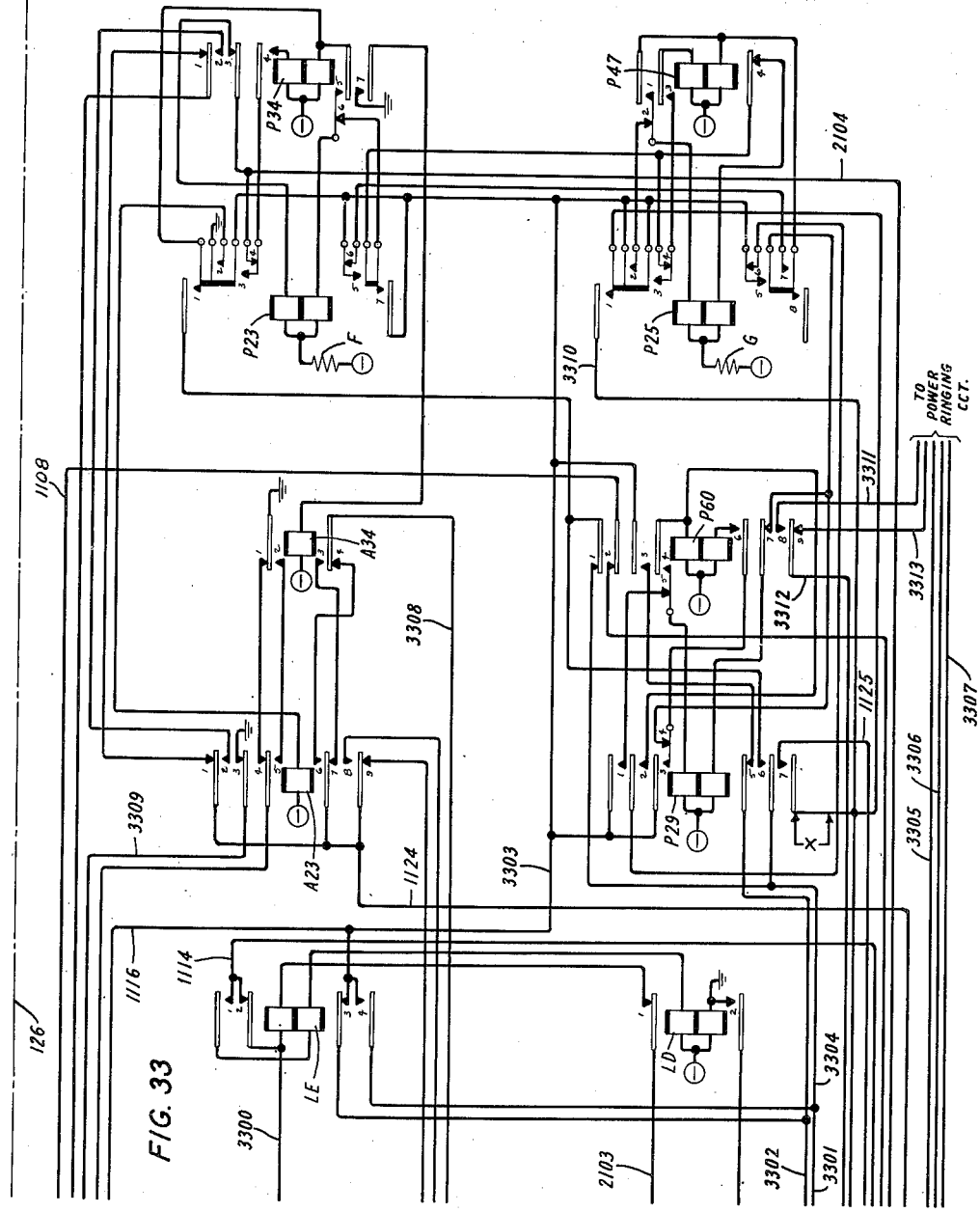
Figure 34:
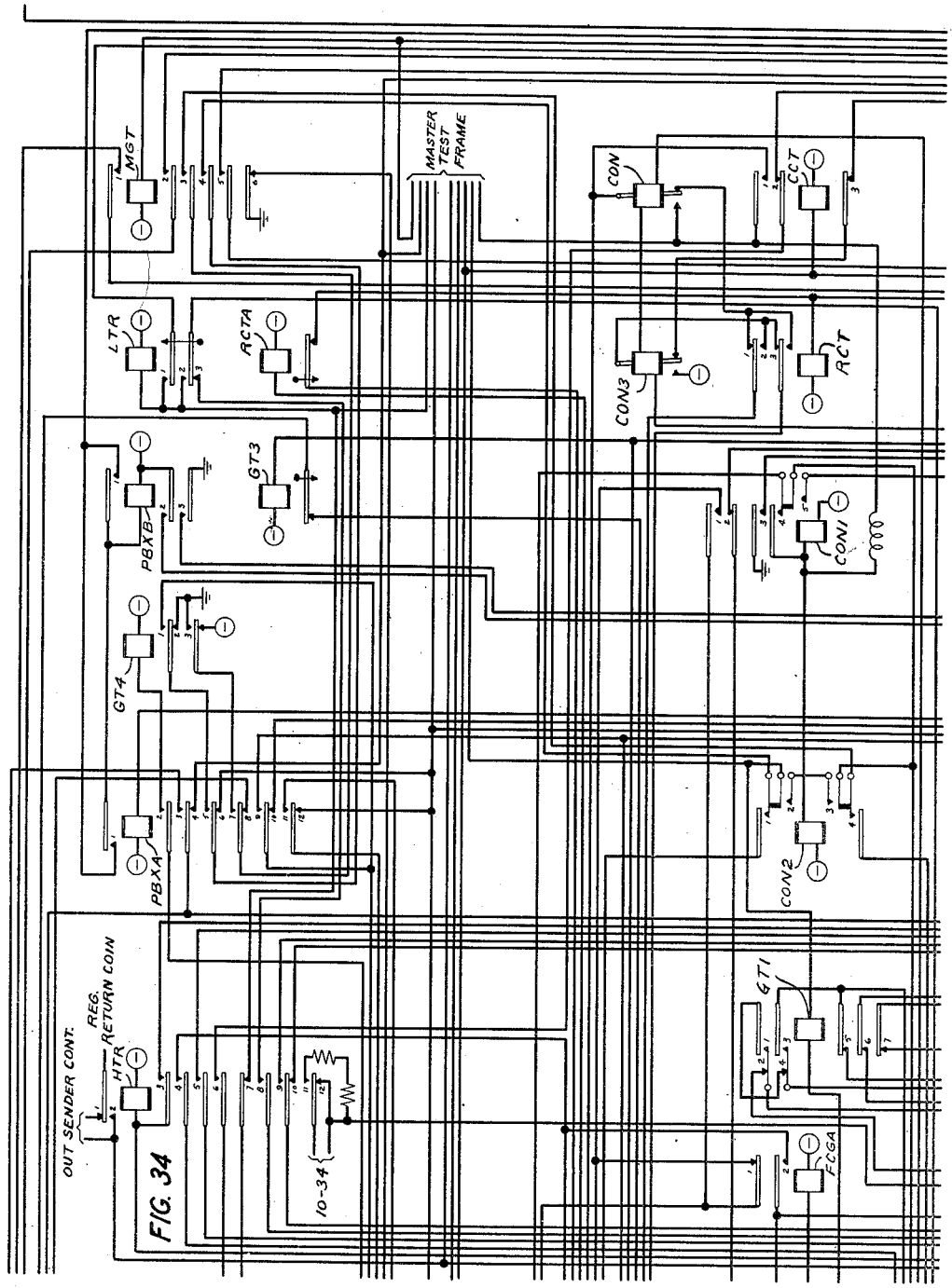
Figure 35:
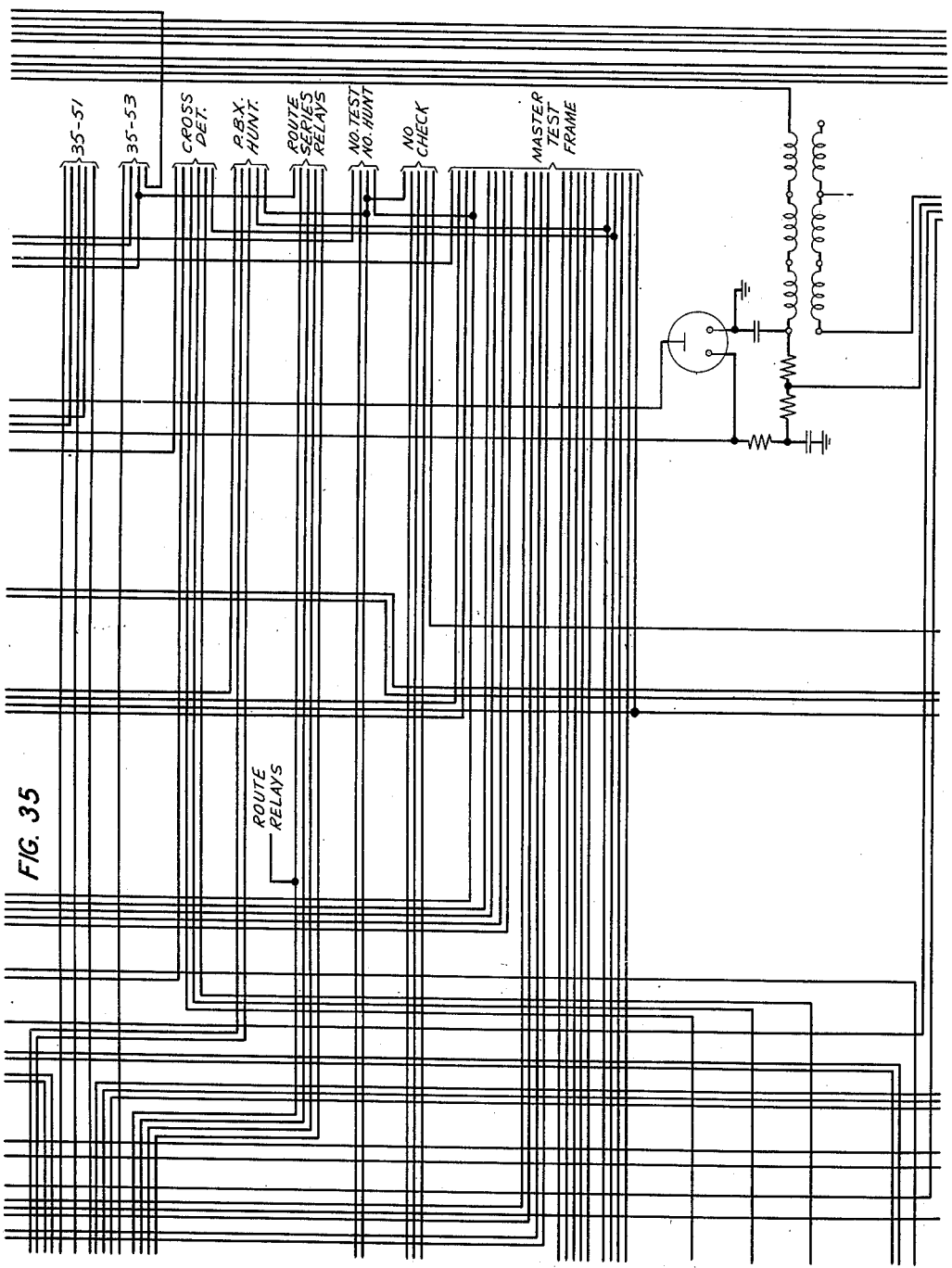
Figure 36:
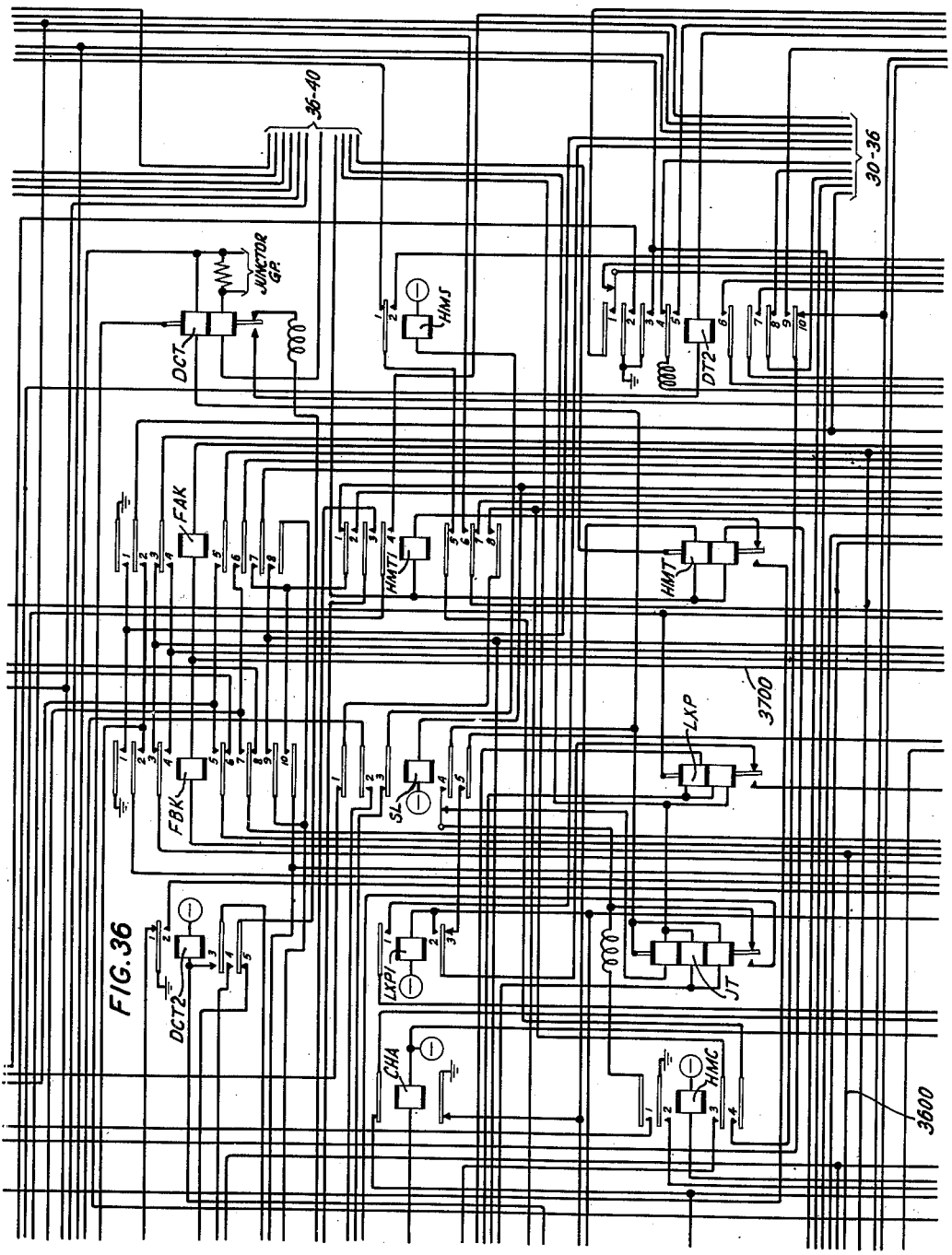
Figure 37:
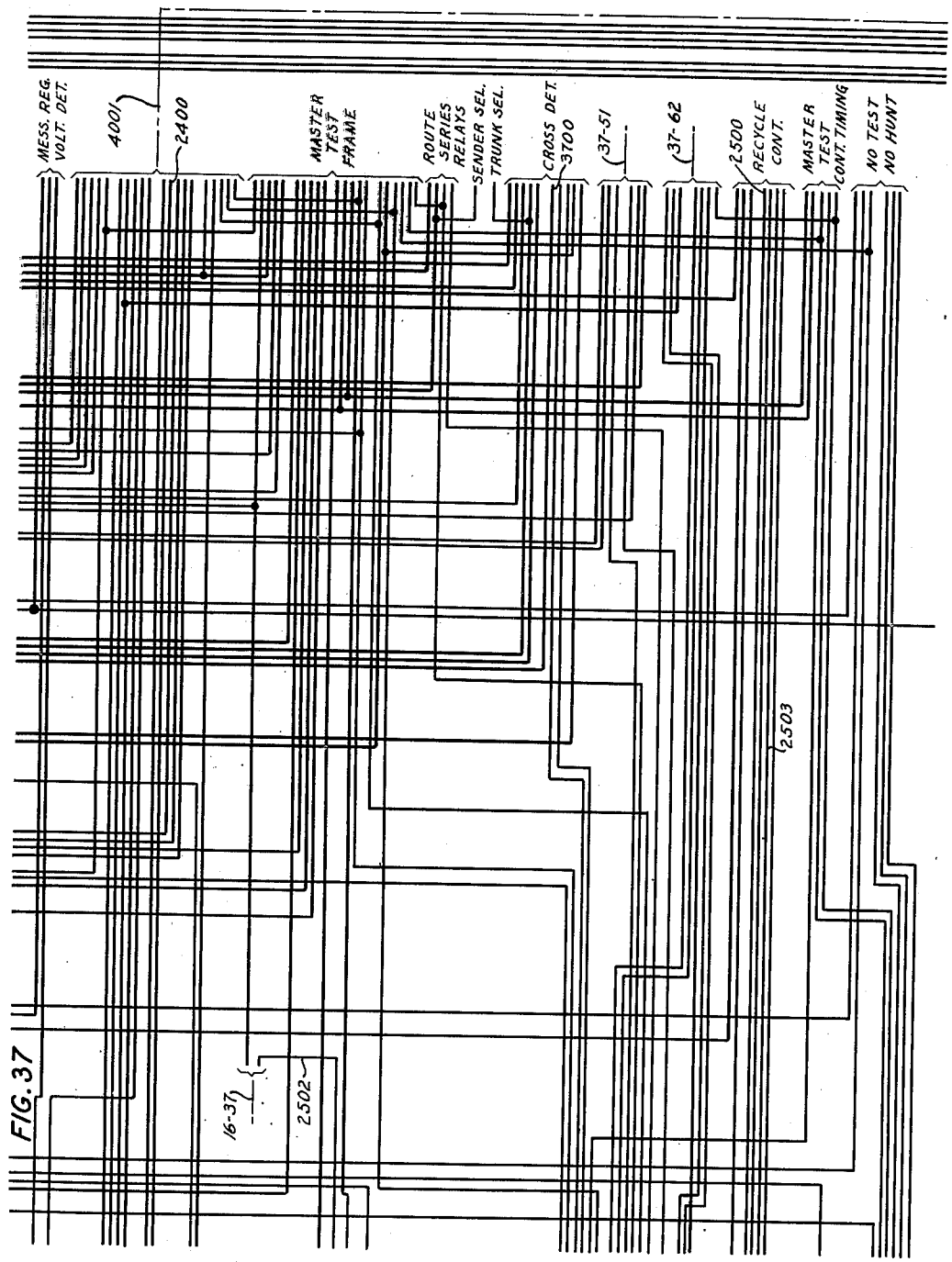
Figure 38:
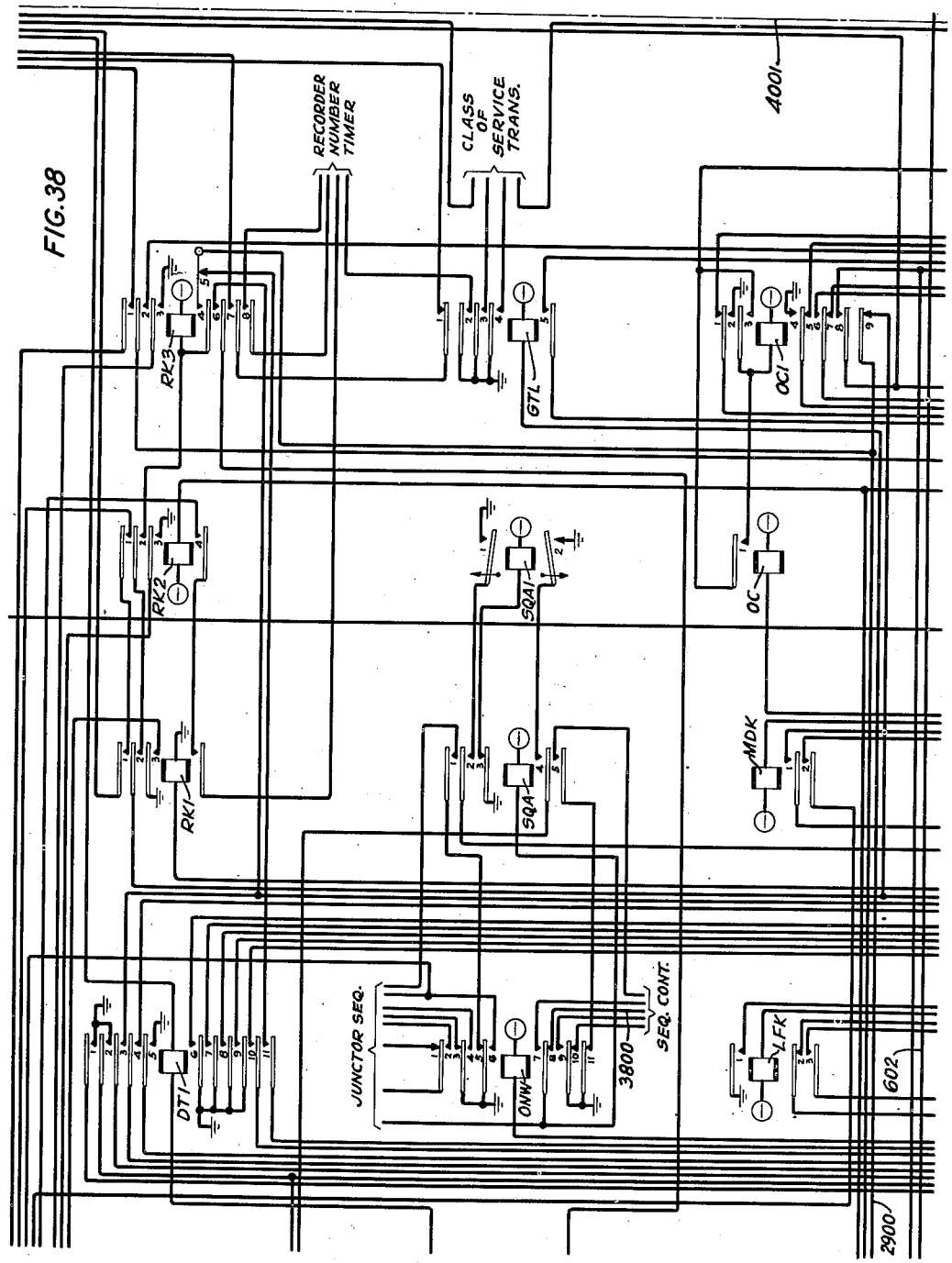
Figure 39:
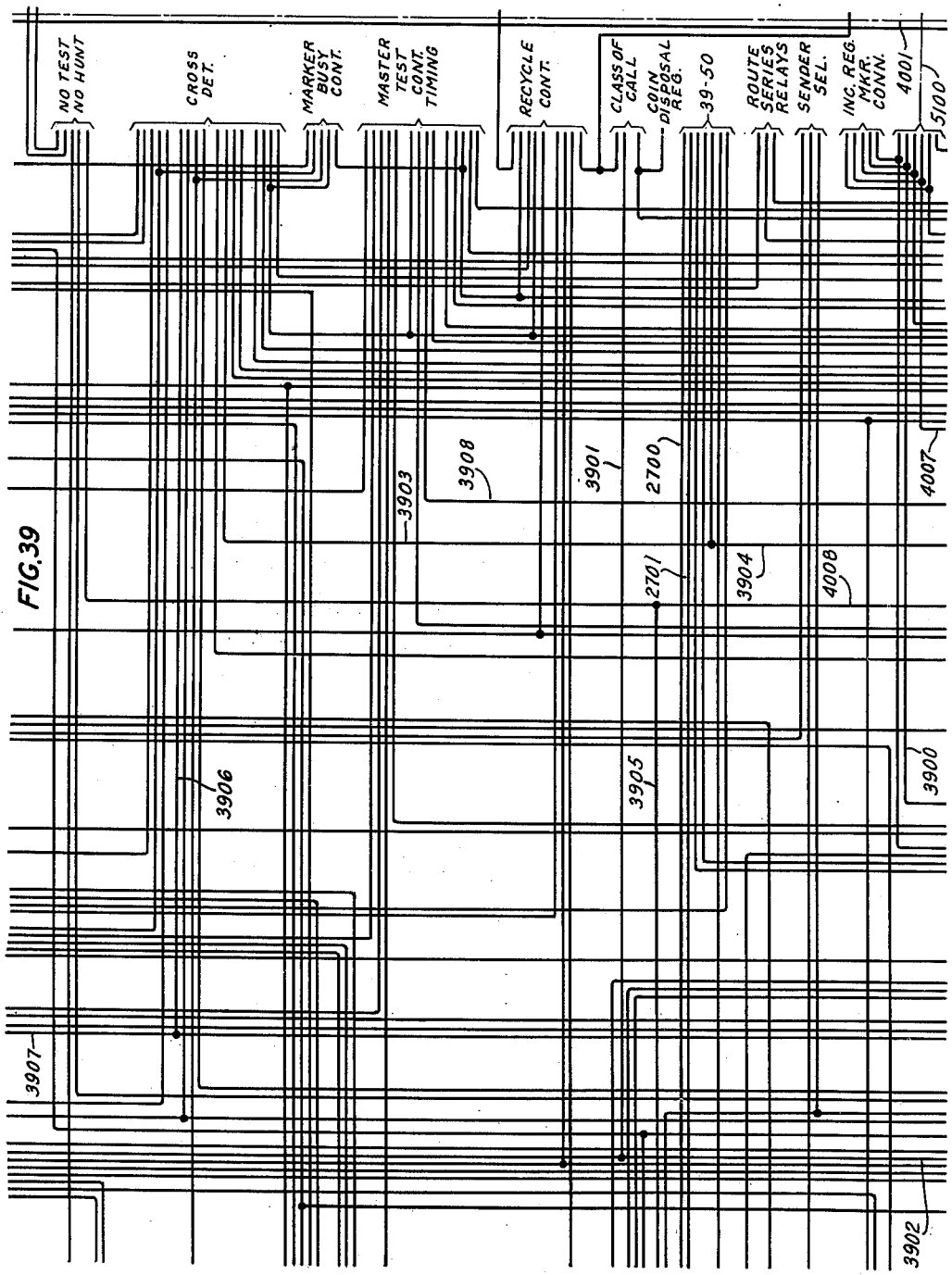
Figure 40:
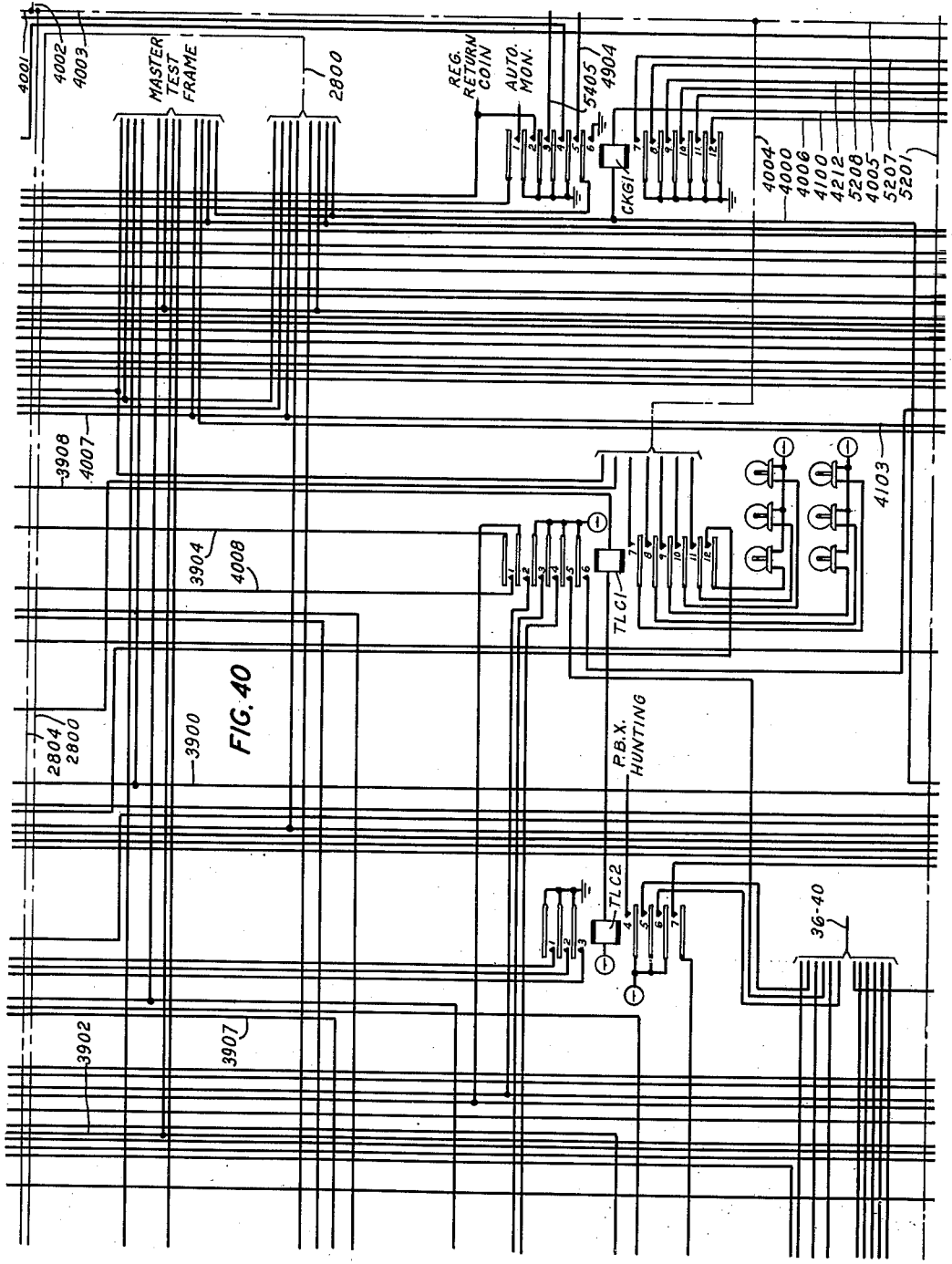
Figure 41:
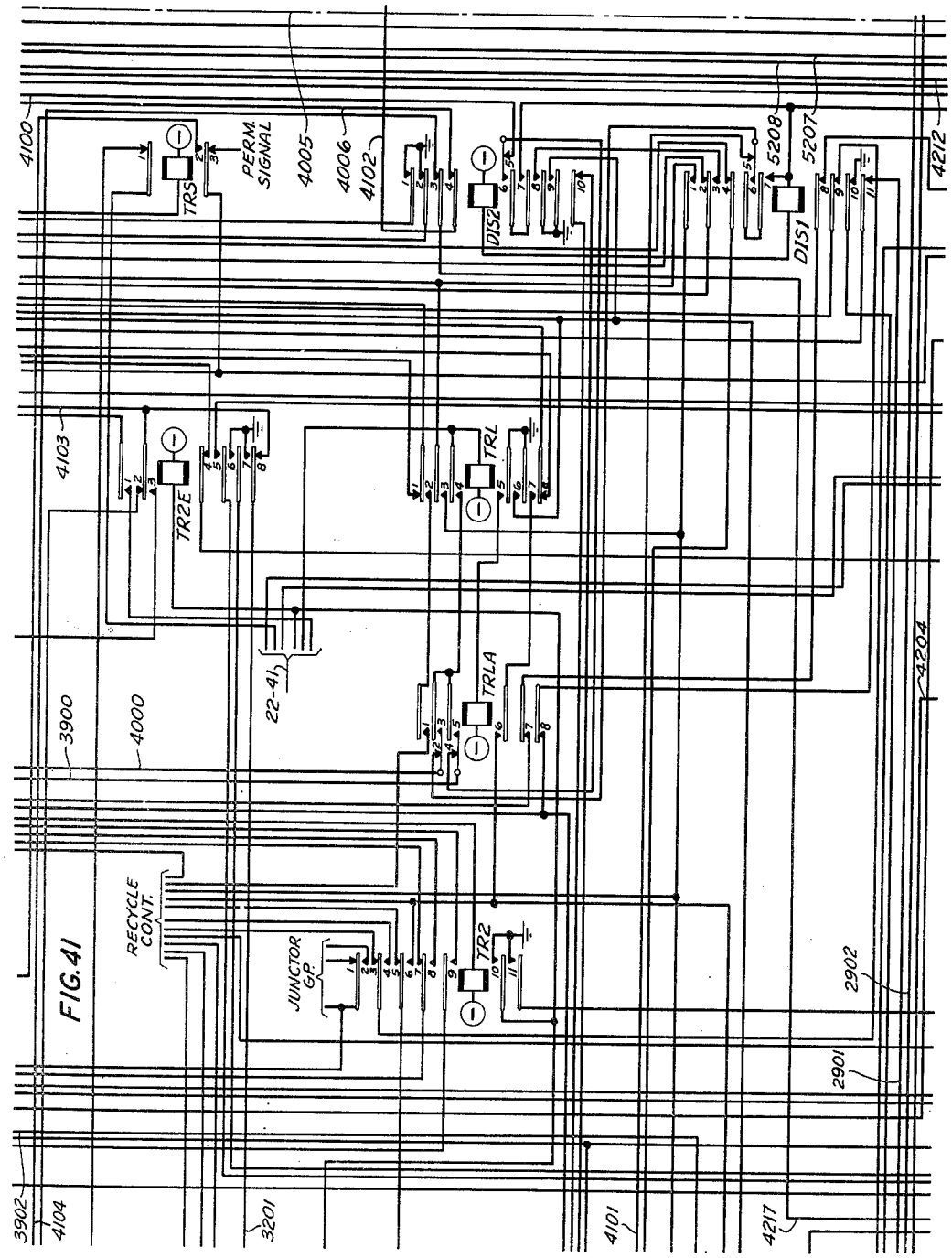
Figure 42:
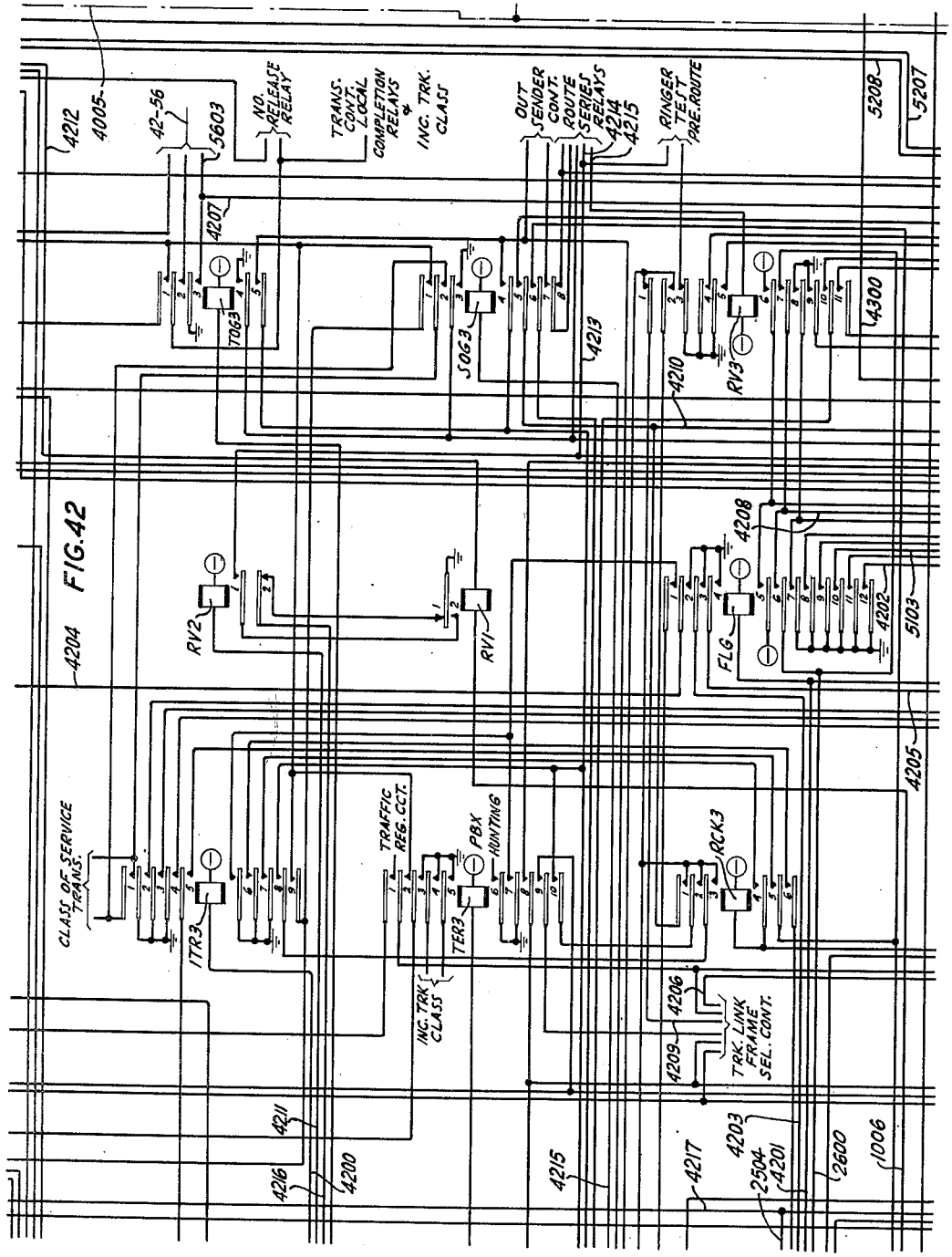
Figure 43:
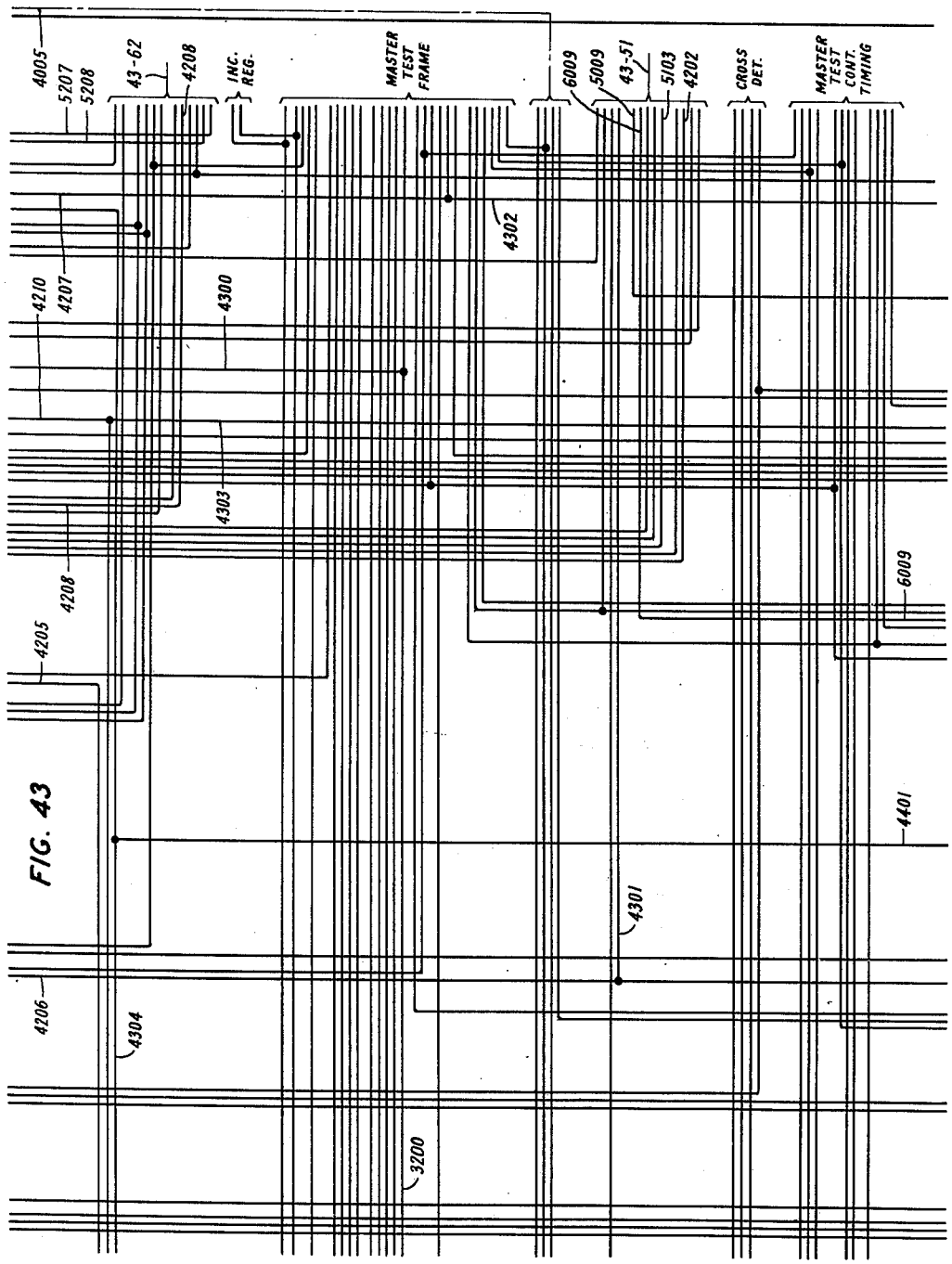
Figure 44:
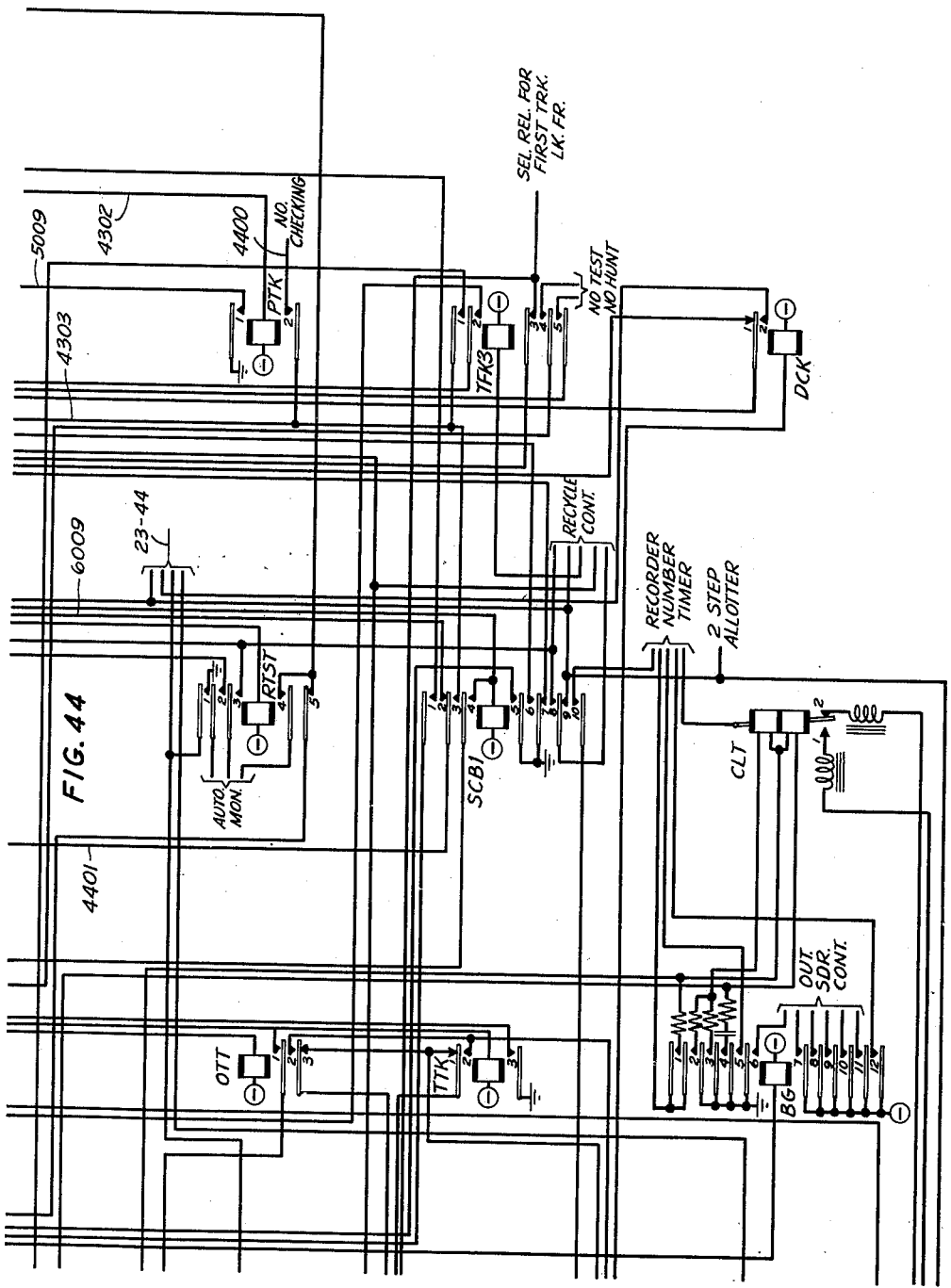
Figure 45:
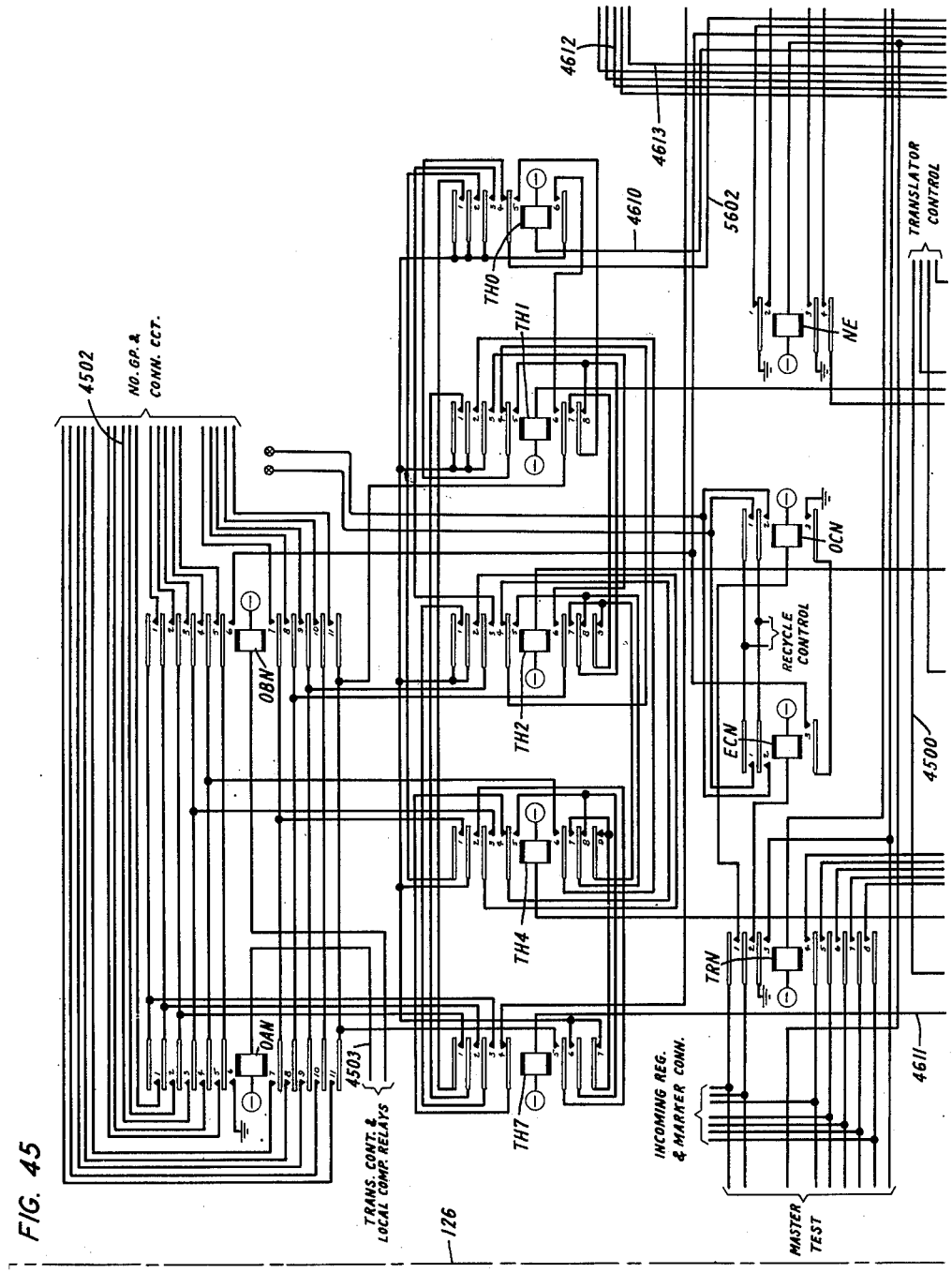
Figure 46:
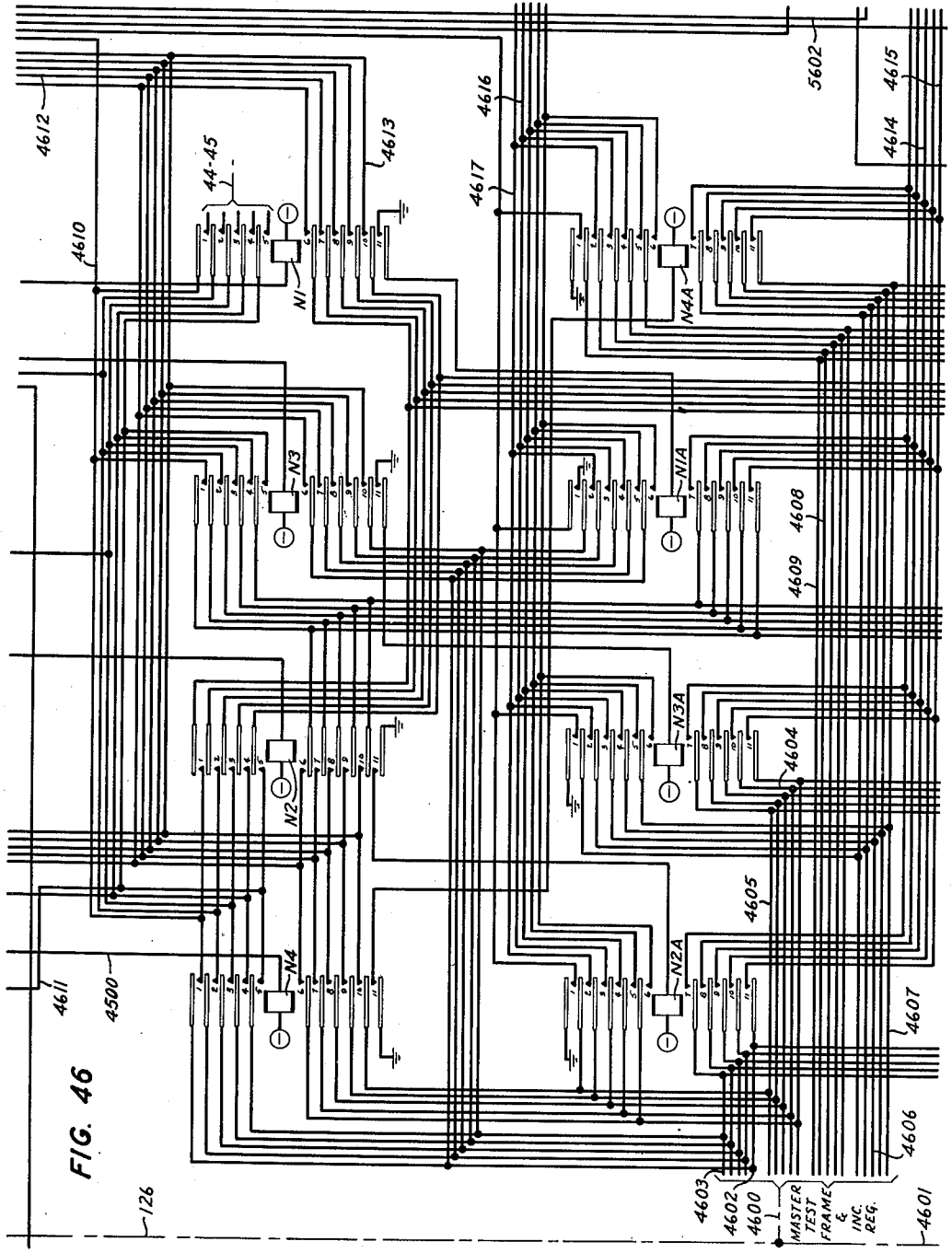
Figure 47:
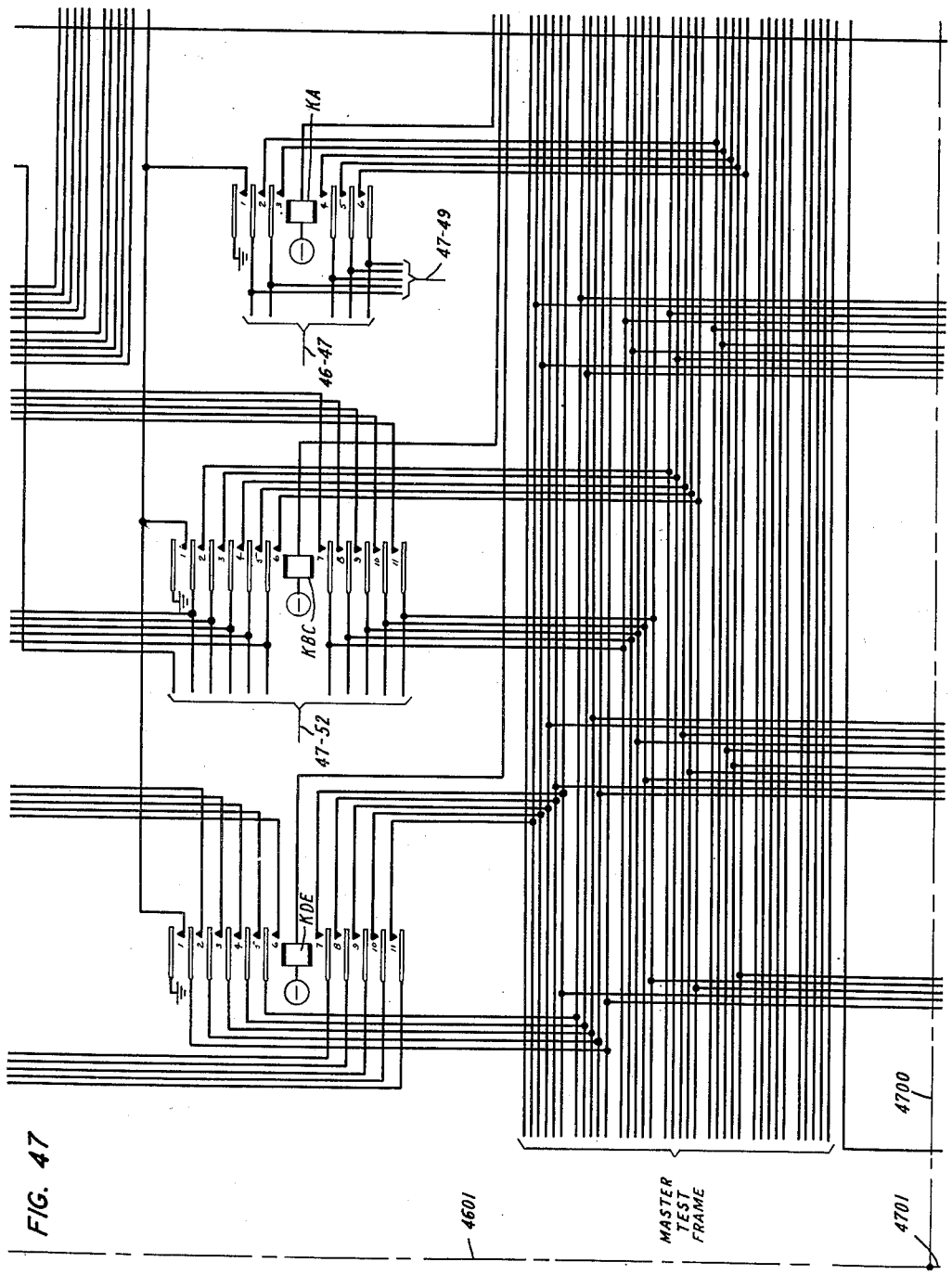
Figure 48:
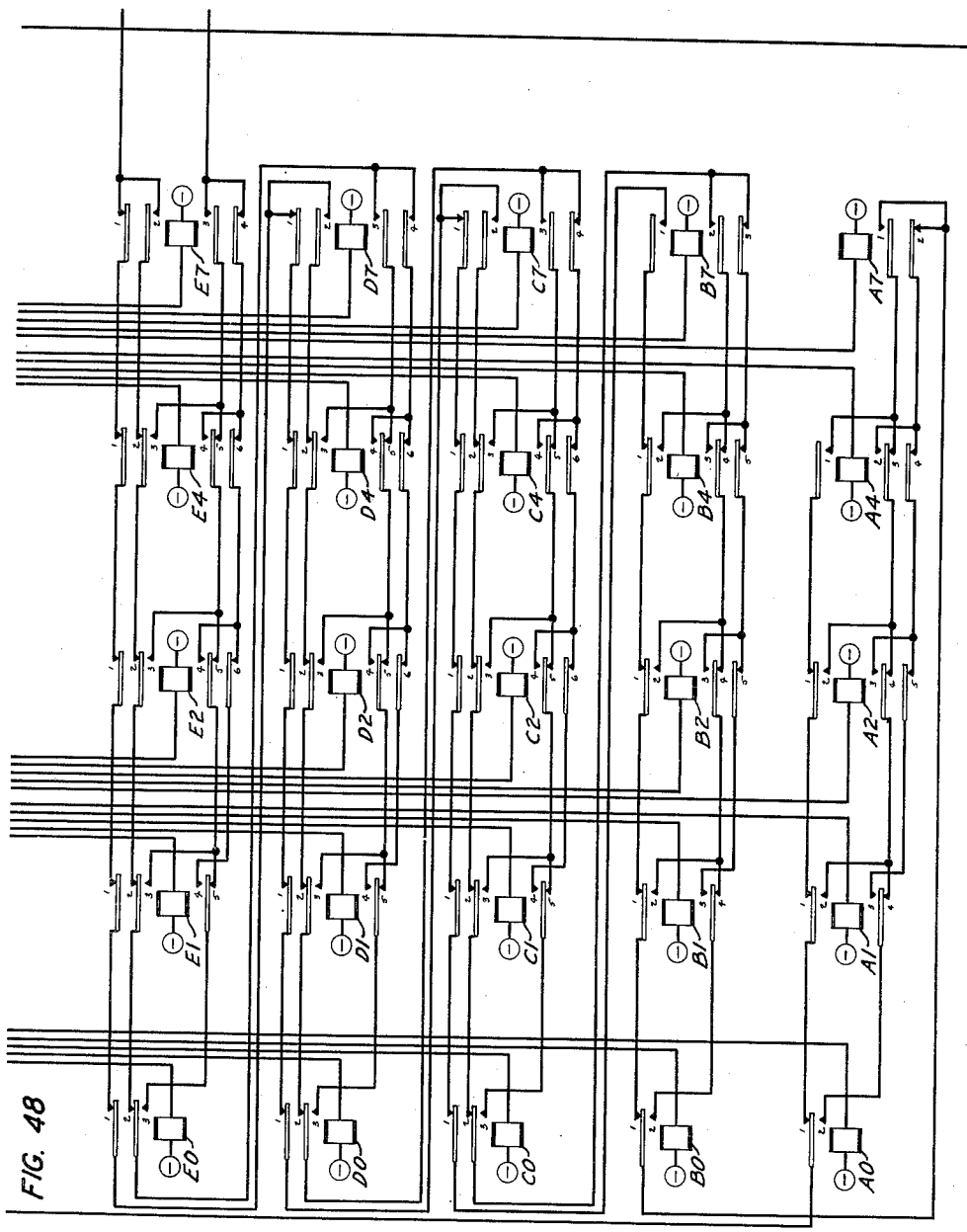
Figure 49:
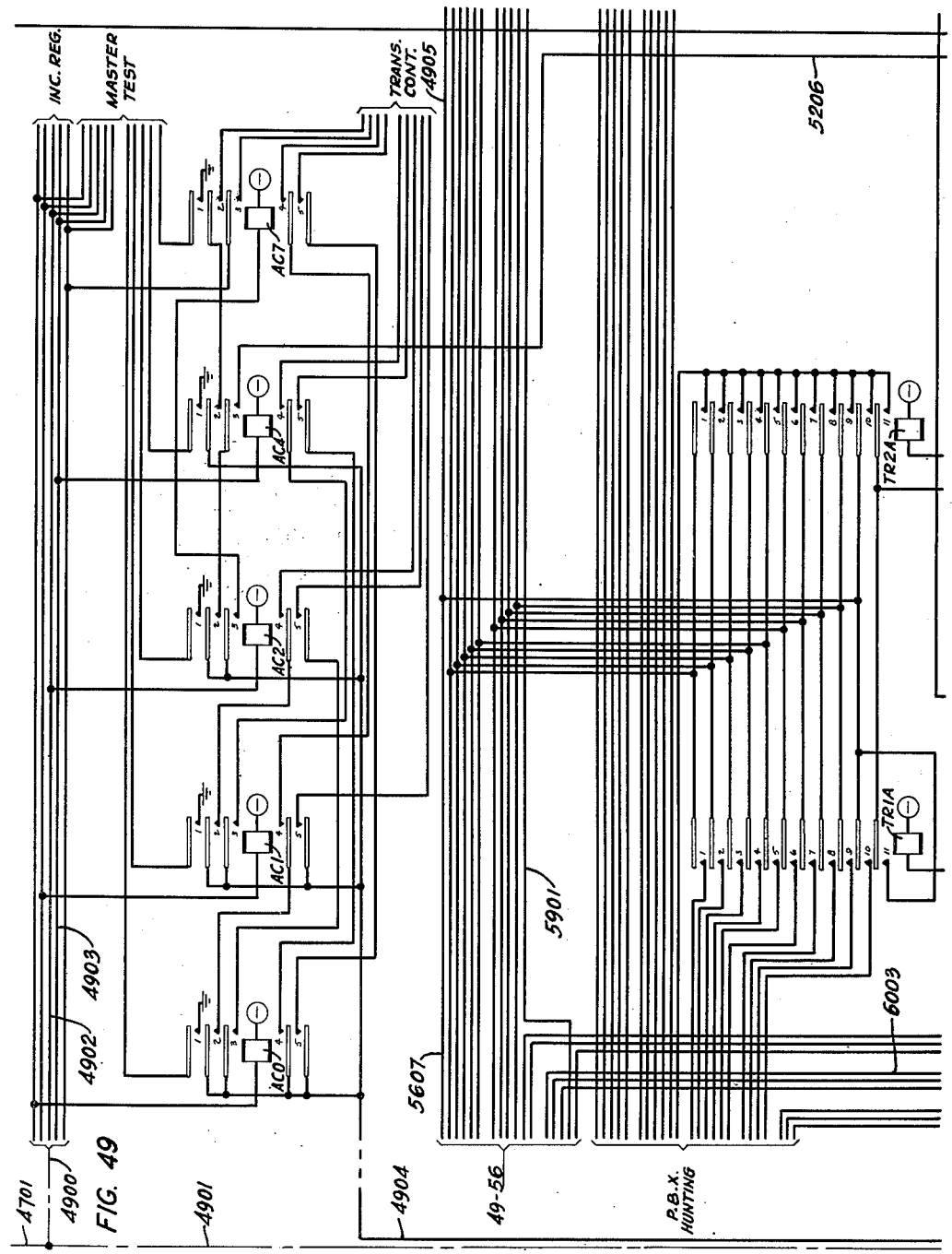
Figure 50:
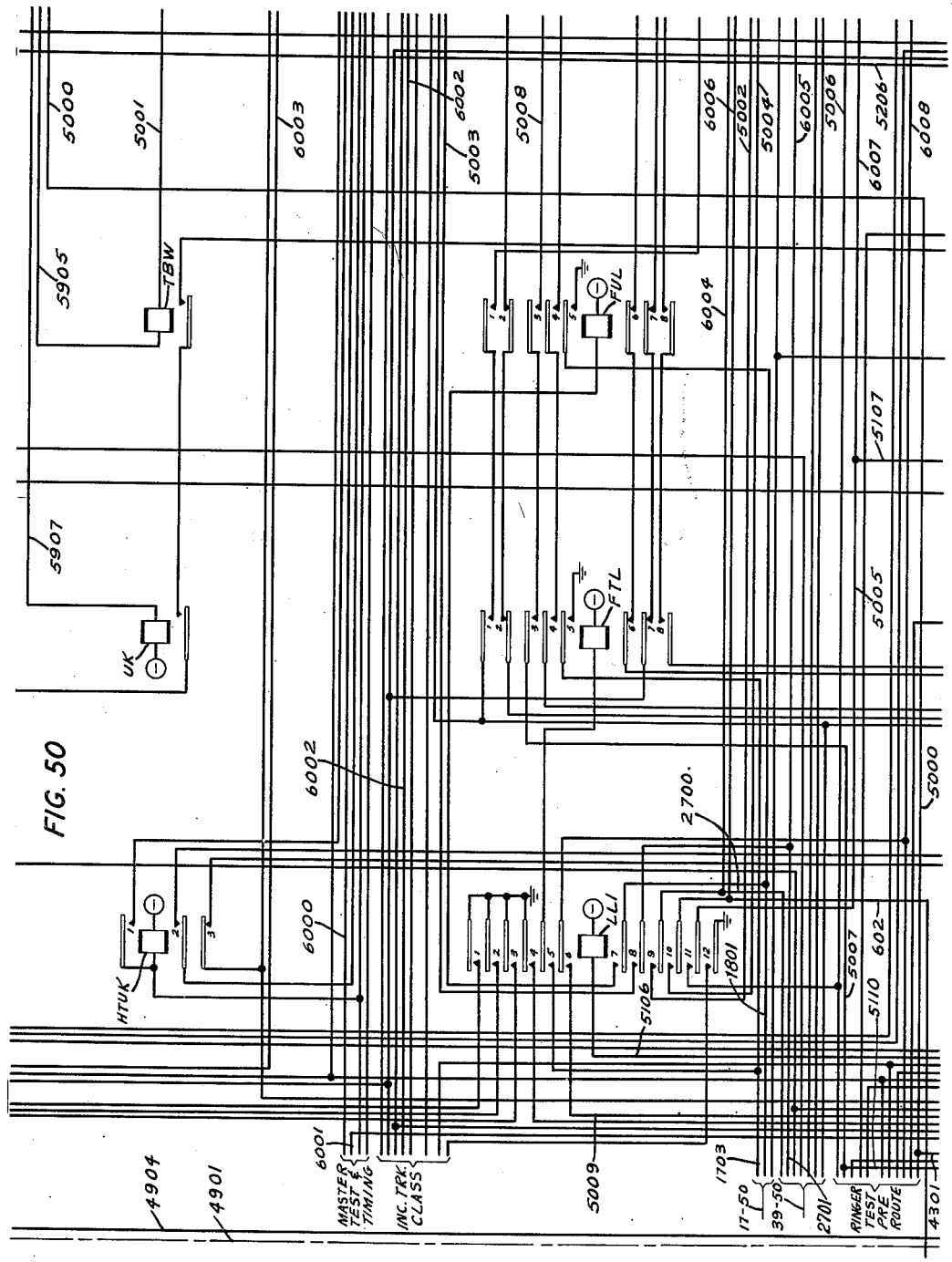
Figure 51:
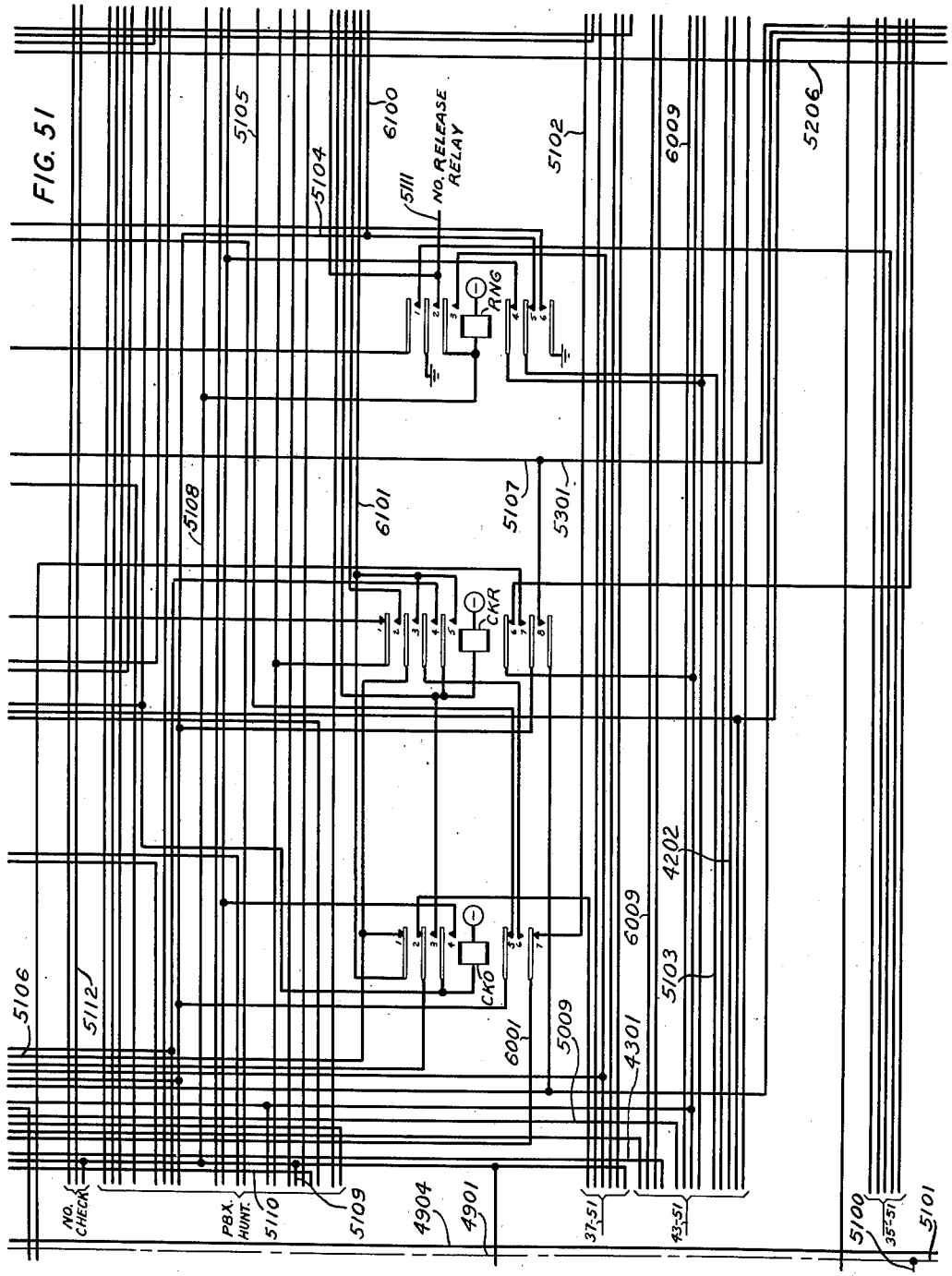
Figure 52:
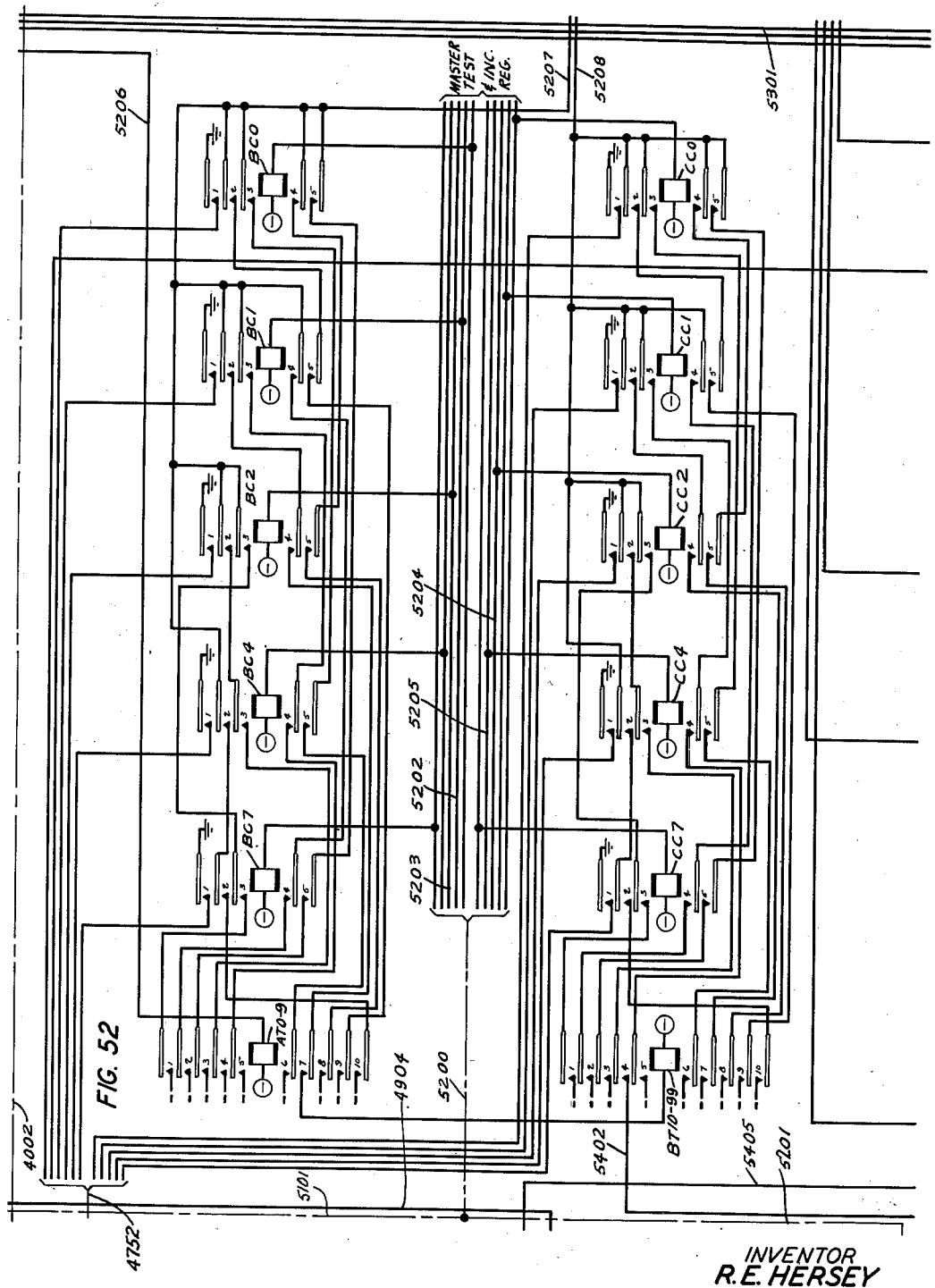
Figure 53:
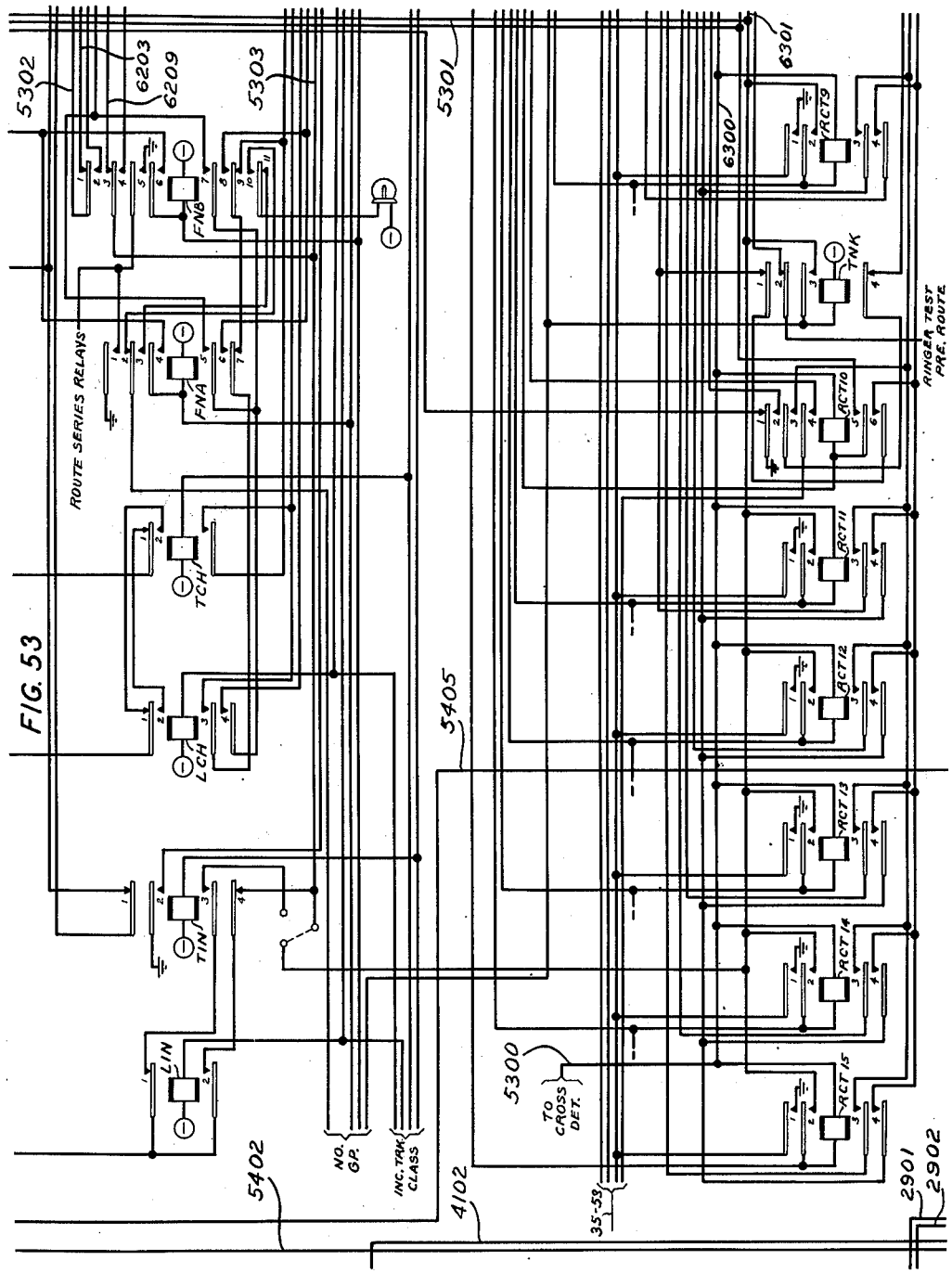
Figure 56:
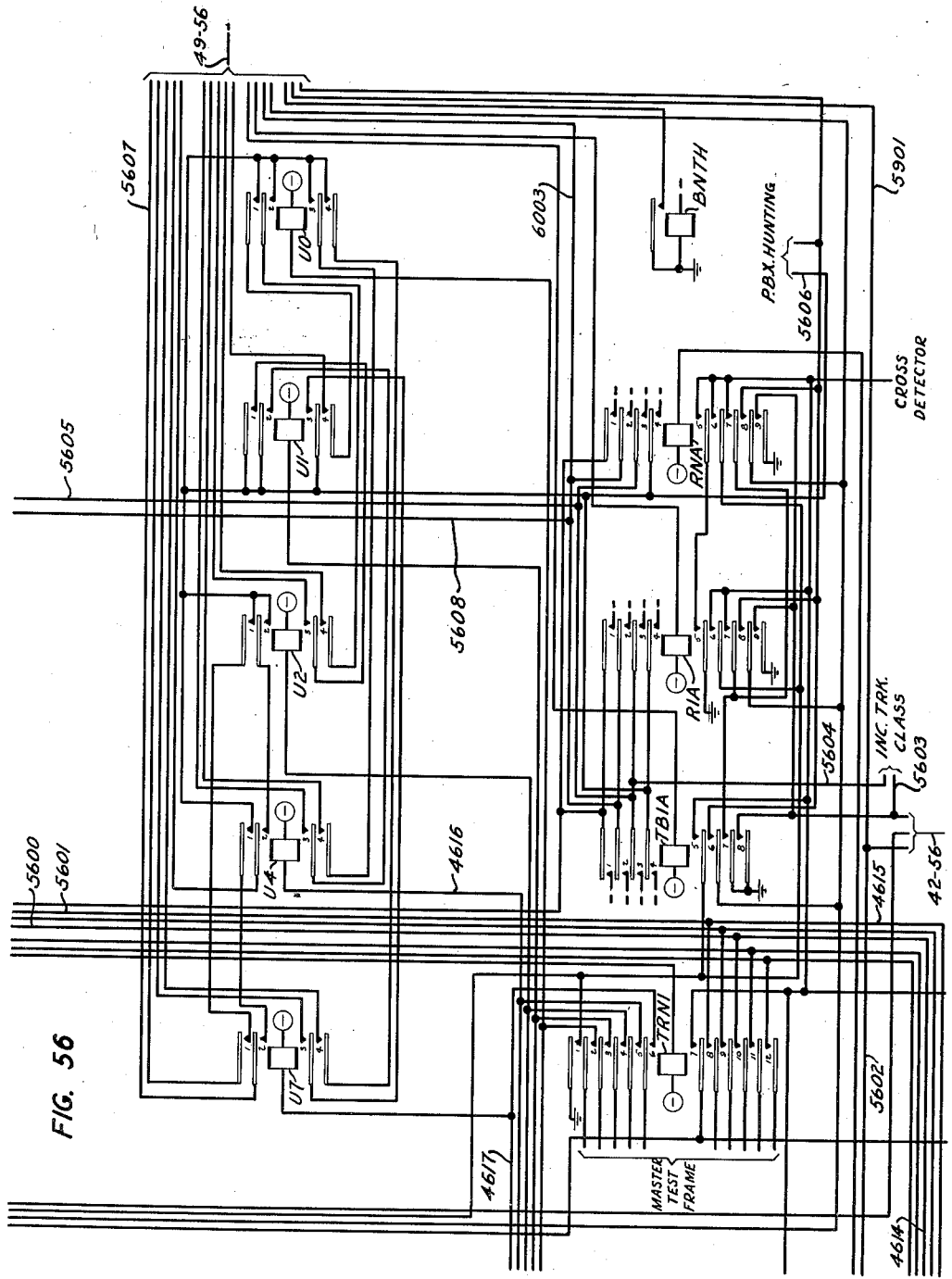
Figure 57:
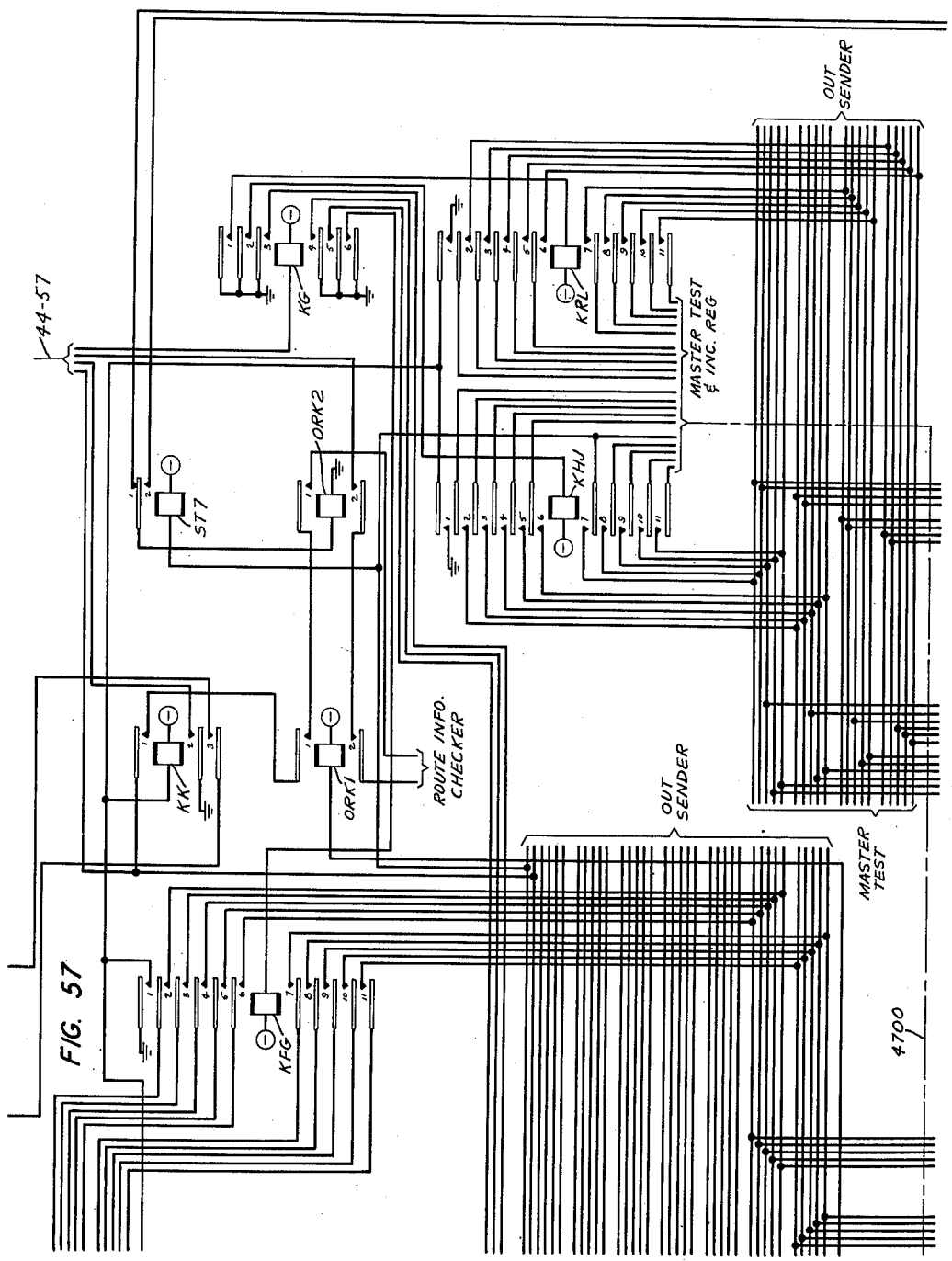
Figure 58:
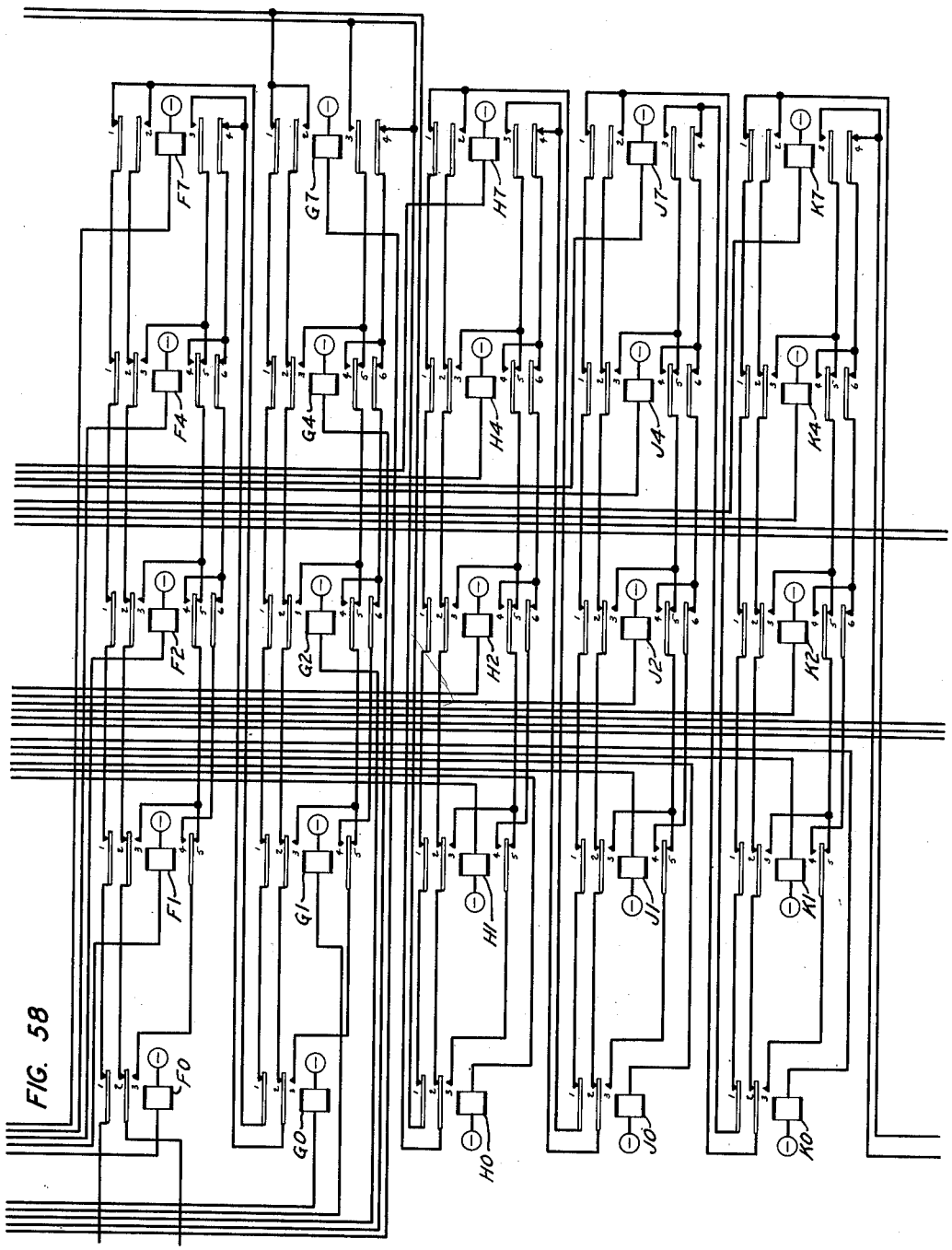
Figure 59:
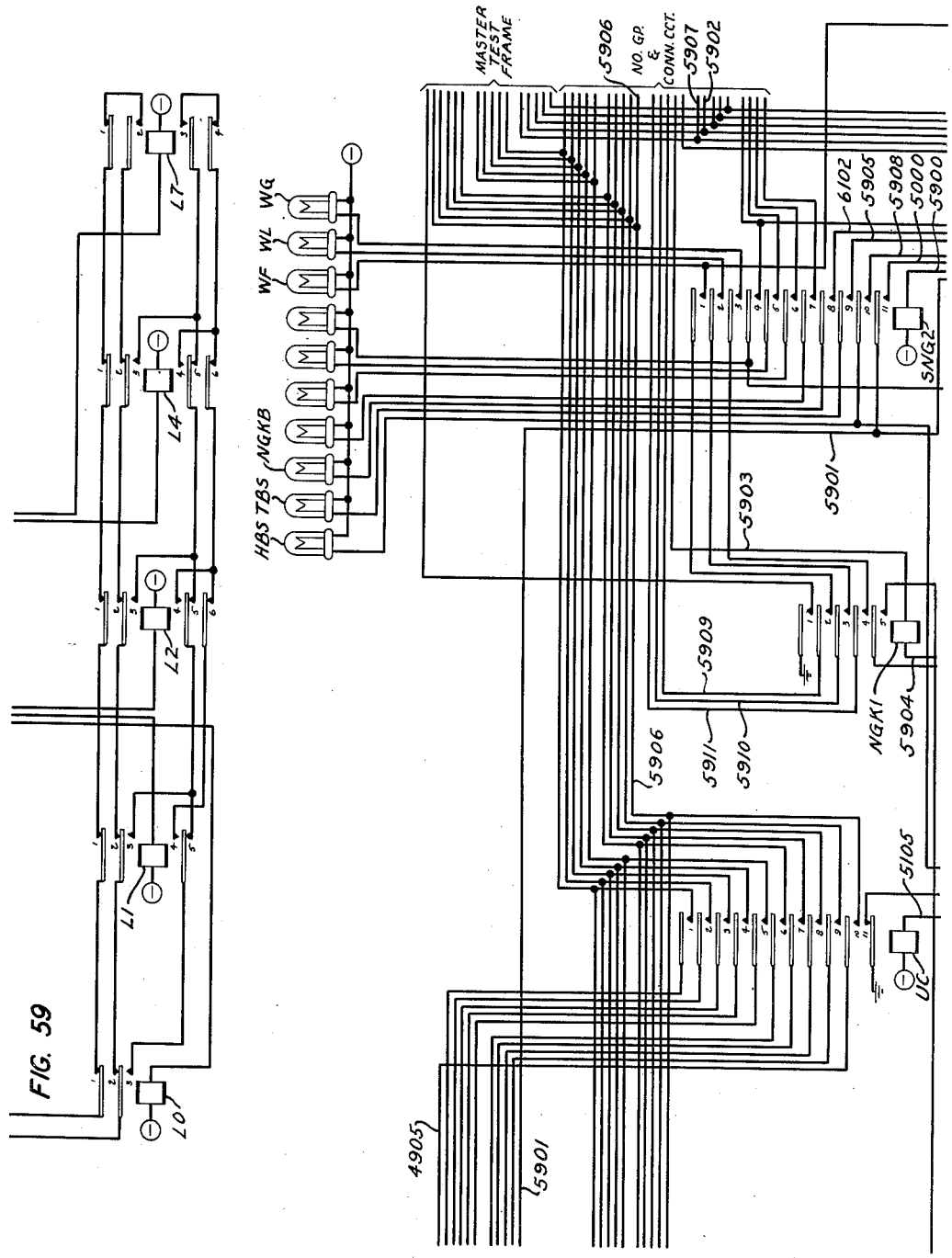
Figure 60:
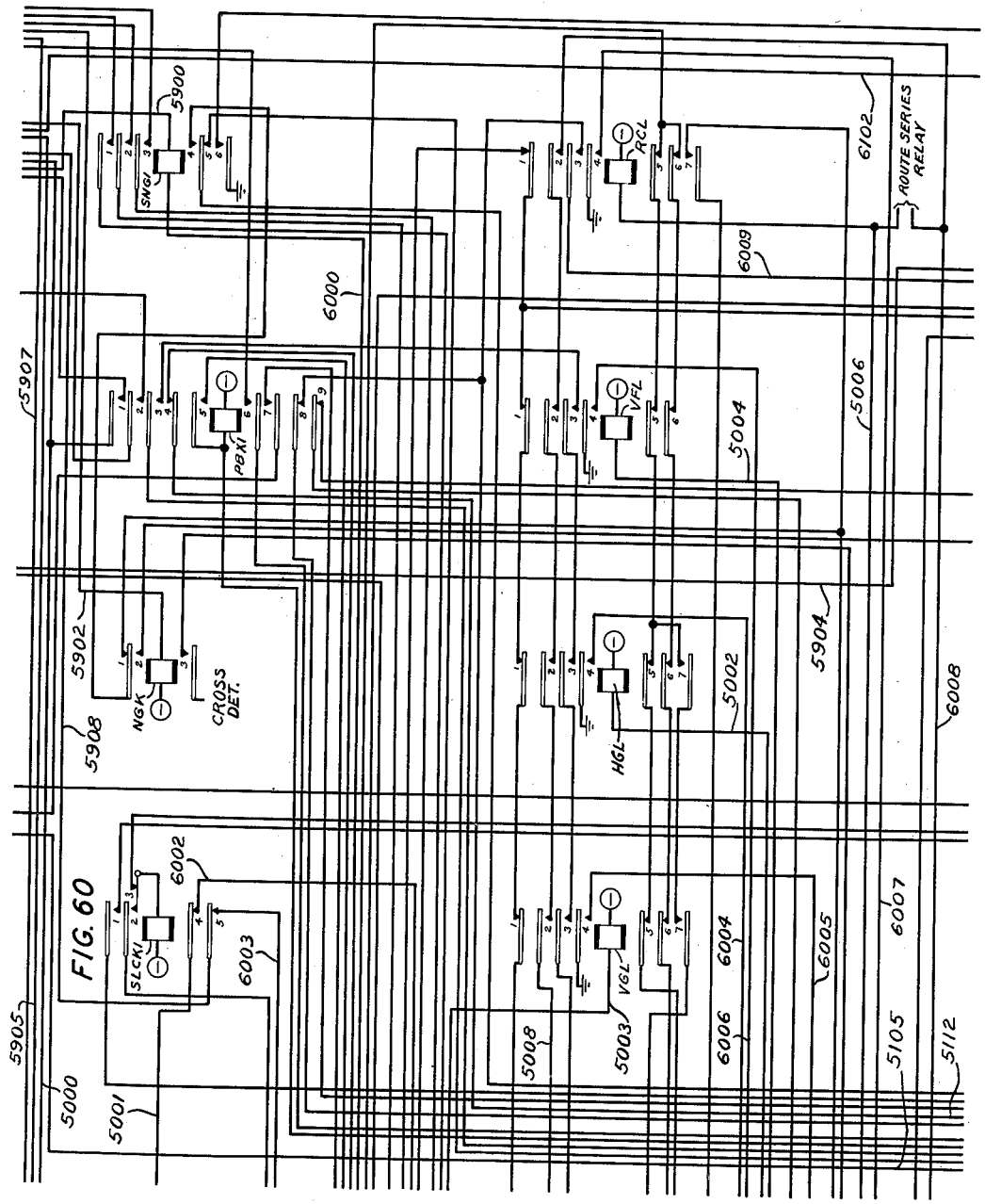
Figure 61:
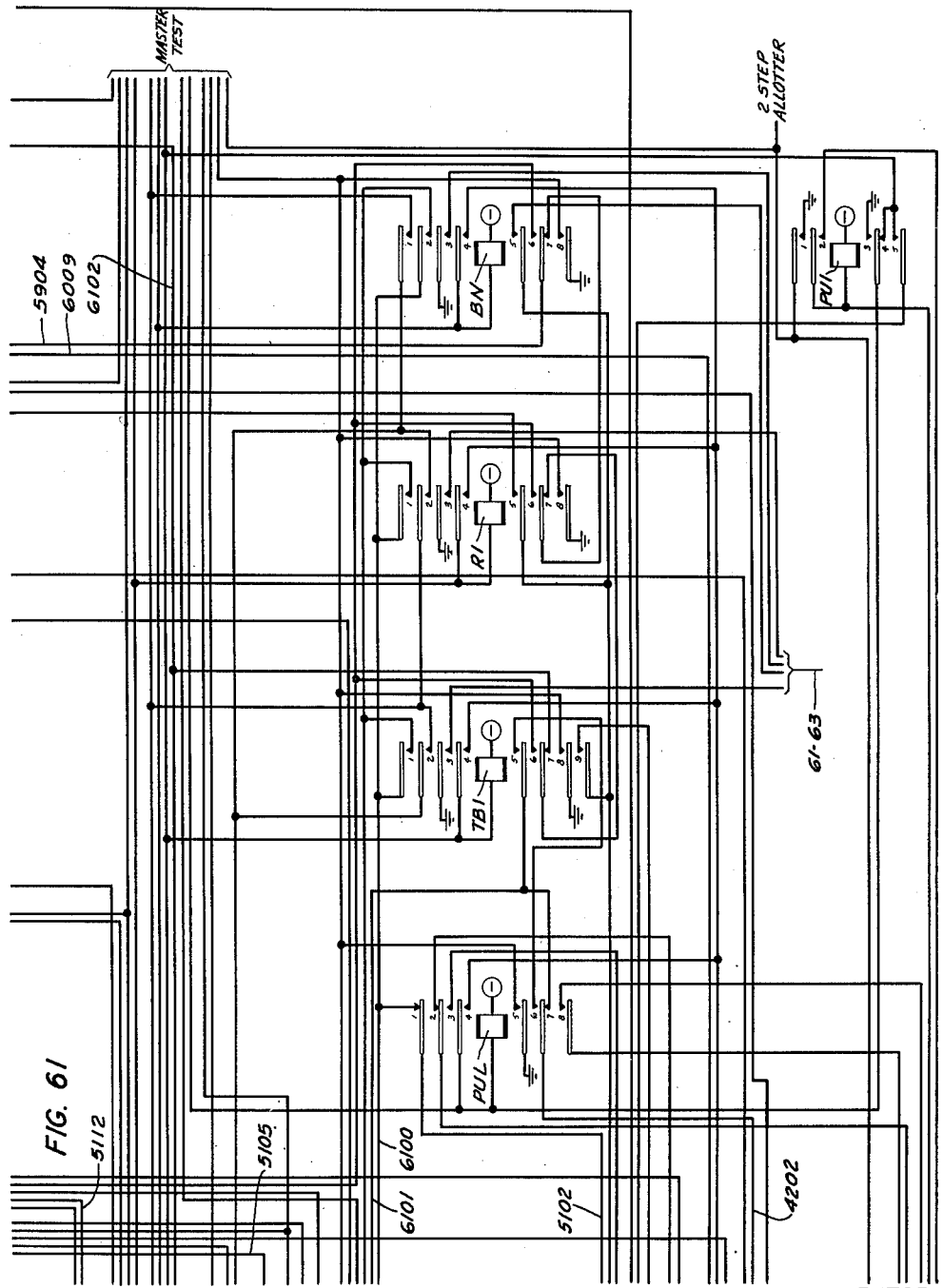
Figure 62:
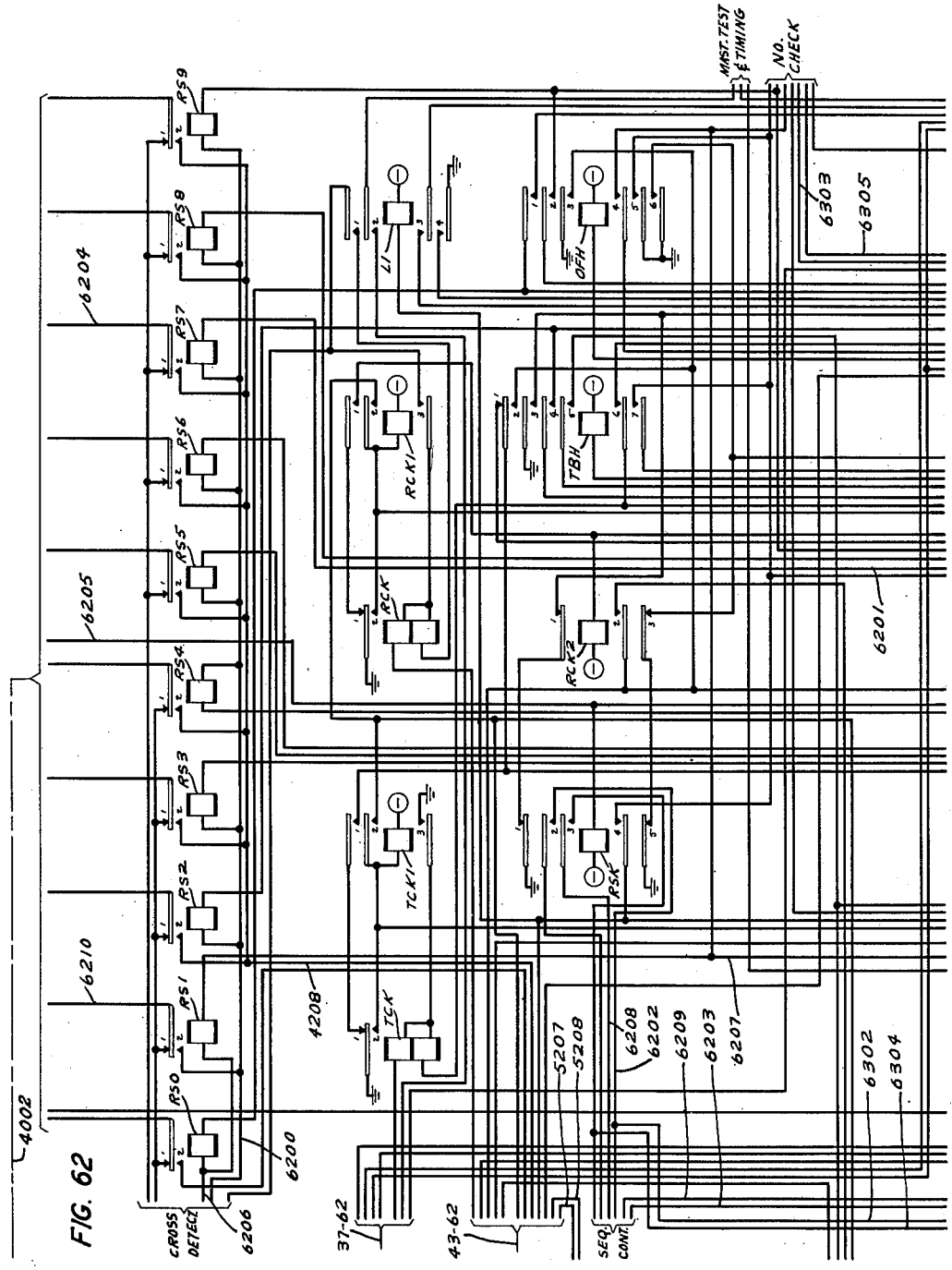
Figure 63:
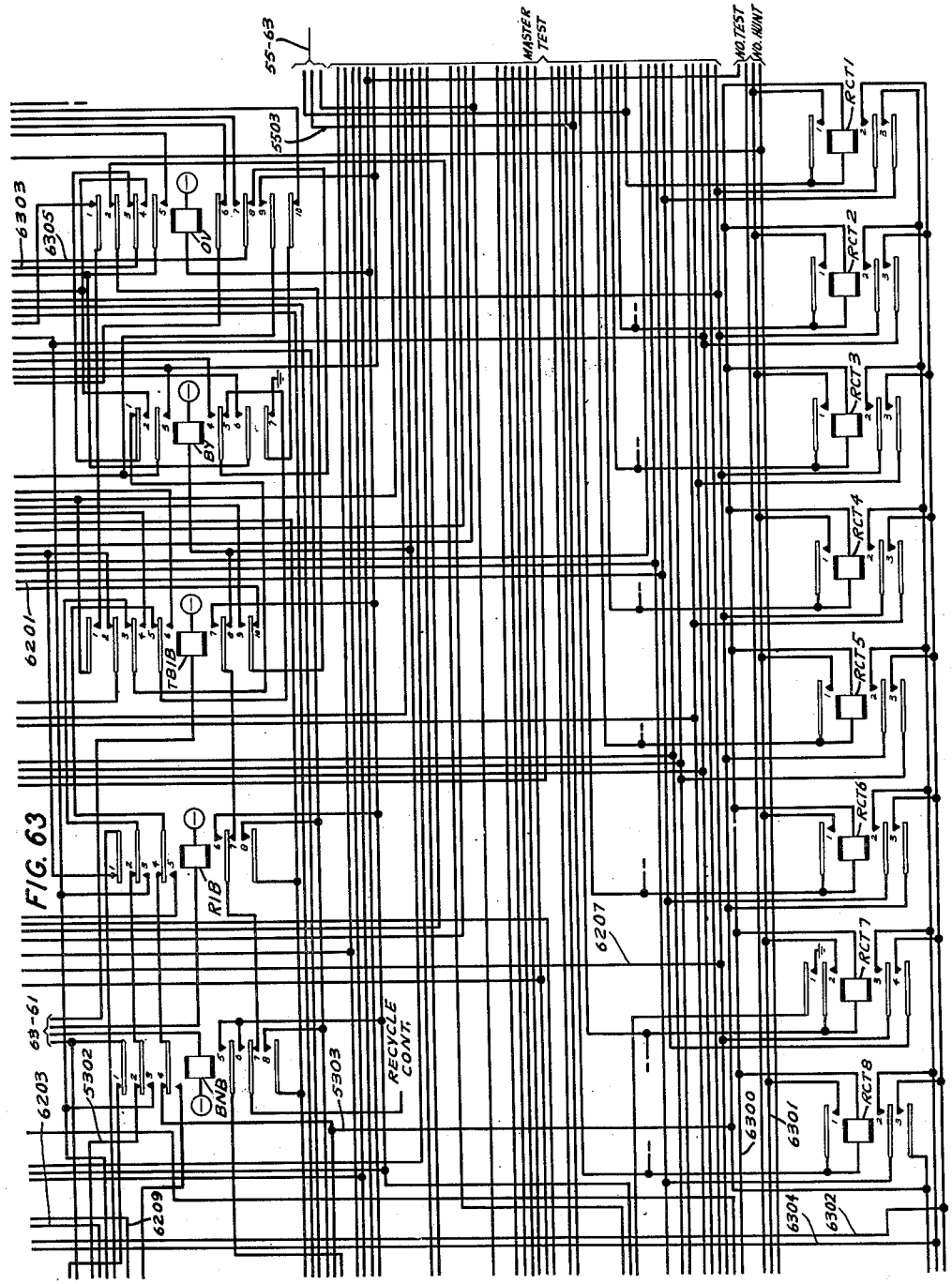

| FIG. 55 | FIG. 56 | FIG. 57 | FIG. 58 | FIG. 59 | FIG. 60 | FIG. 61 | FIG. 62 | FIG. 63 | |
| FIG. 45 | FIG. 46 | FIG. 47 | FIG. 48 | FIG. 49 | FIG. 50 | FIG. 51 | FIG. 52 | FIG. 53 | FIG. 54 |
| FIG. 33 | FIG. 34 | FIG. 35 | FIG. 36 | FIG. 37 | FIG. 38 | FIG. 39 | FIG. 40 | FIG. 41 | FIG. 42 | FIG. 43 | FIG. 44 |
| FIG. 21 | FIG. 22 | FIG. 23 | FIG. 24 | FIG. 25 | FIG. 26 | FIG. 27 | FIG. 28 | FIG. 29 | FIG. 30 | FIG. 31 | FIG. 32 |
| FIG. 11 | FIG. 12 | FIG. 13 | FIG. 14 | FIG. 15 | FIG. 16 | FIG. 17 | FIG. 18 | FIG. 19 | FIG. 20 |
| FIG. 1 | FIG. 2 | FIG. 3 | FIG. 4 | FIG. 5 | FIG. 6 | FIG. 7 | FIG. 8 | FIG. 9 | FIG. 10 |

FIG. 64

INVENTOR
R.E. HERSEY
BY
P. C. Smith
ATTORNEY

Patented May 6, 1952

2,595,944

UNITED STATES PATENT OFFICE 2,595,944

REVERTING CALL CIRCUITS

Ralph E. Hersey, Madison, N. J., assignor to Bell Telephone Laboratories, Incorporated, New York, N. Y., a corporation of New York Application October 29, 1948, Serial No. 57,397

8 Claims. (Cl. 179—17)

This invention relates to telephone systems in general and more particularly to automatic telephone systems wherein automatic switches are used under the control of common control circuits to extend control and conversational connections to and from various types of equipment in said systems.

The main object of the present invention is to improve the reliability, speed, and efficiency of such systems generally and particularly with respect to the successful completion of calls between subscribers on a common line circuit.

Another object of the invention is the provision of means in common control circuits for recognizing that a called subscriber has the same line equipment location in the central office as the calling subscriber and means for establishing a single channel connection between the party line and a special trunk circuit for the purpose of ringing, supervisory and transmission facilities for said party line subscribers.

Still another object of the present invention is an arrangement whereby a common control circuit which, in response to registration therein of the equipment location information pertaining to a called directory number, initiates connections for establishing an intraoffice connection over an intraoffice trunk circuit, and which, after comparing the called and the calling line locations and finding them identical, changes its operation to release the initiated intraoffice call over the intraoffice trunk circuit and proceeds to establish for the party line subscribers the necessary ringing, supervisory and transmission facilities by way of a reverting ringing trunk circuit.

INTRODUCTORY

A call to a subscriber on the same line as the calling subscriber is a reverting call and the talking connection in the office consists of a channel between the subscriber's line and a reverting ringing trunk which controls ringing and supervision.

A subscriber making a reverting call receives dial tone and dials the called directory number into registers of an originating register in the manner fully described in Patent 2,585,904 to A. J. Busch of February 19, 1952. The marker used in establishing the dial tone connection transfers to other registers in the originating register the calling line equipment location as a function of the dial tone connection job. After dialing, the originating register seizes a marker and transmits to it the calling line location, the called directory number and other necessary information.

The marker seizes the proper number group frame in order to determine, by a translation in the number group circuit, the called line equipment location and seizes a trunk link frame preparatory to selecting an intraoffice trunk. The progress up to this point is the same as for an intraoffice call, where the calling and the called subscribers are not on the same line circuit, as described by Busch.

The marker receives from the number group circuit the called line equipment location and determines, by checking this information against the calling line equipment location, that it is the same as the calling line location which it has received as above from the originating register. The two line locations being identical causes the marker to release the selected trunk link frame. The marker then selects a trunk link frame having at least one idle reverting ringing trunk thereon and proceeds to connect to one such idle trunk. The marker then connects a channel between the line and the trunk and then releases leaving the connection under the supervision and control of the trunk.

The reverting ringing trunk transmits busy tone to the calling subscriber who in some cases dials an identifying digit before hanging up. The trunk then applies the proper ringing conditions to the line. The called subscriber lifting his receiver trips the ringing to indicate to the calling subscriber that the call has been answered. The above operation, as described in more detail hereinafter, is for four-party selective or eight-party semiselective and other well known ringing conditions.

An automatic telephone system with which the present invention may be used is fully disclosed by A. J. Busch. Only sufficient of the Busch disclosure is disclosed herein to make the present invention understandable and reference is made to details of the Busch disclosure which may not be disclosed herein. Certain connector circuit functions of the Busch system which are involved in disclosing the present invention are disclosed and claimed in Patent 2,531,615 to E. L. Erwin of November 28, 1950. The disclosures of Busch and Erwin are to be considered as incorporated in the present disclosure by reference.

The present invention is described in detail hereinafter by way of an exemplary disclosure of which the drawings form a part, and which drawings may be described generally as follows:

Fig. 1 shows diagrammatically subscribers' lines terminating on line link frames, an intraoffice trunk terminating on a trunk link frame, an originating register terminating on a trunk link frame, marker and frame connector circuits, and a ringing selection switch;

Figs. 11, 21 and 33 disclose the full details of a ringing reverting trunk with its termination on a trunk link frame of Fig. 1 shown diagrammatically;

Figs. 2 through 10, 12 through 20, 22 through 32, 34 through 44, and 45 through 63, show parts of a marker circuit; and Fig. 64 illustrates how the first sixty-three figures of the drawings may be arranged to form a complete disclosure of the circuits hereinafter described.

GENERAL DESCRIPTION

When a calling subscriber on a party line initiates a call to another party on the same line, the removal from the subset switchhook of the calling subscriber's receiver actuates a line link marker connector for extending connections between the line link frame upon which the calling line is located and an idle marker circuit into which the calling subscriber's line location information is registered. The marker is informed that the calling subscriber desires a dial tone connection to an originating register of a type arranged to receive and register a called subscriber's number transmitted to it on a basis for which the calling subscriber is arranged to transmit. Such basis may be, for instance, dial pulsing or multifrequency pulsing. In the exemplary disclosure to follow, dial pulsing is assumed. The marker tests for trunk link frames whereon dial pulse originating registers terminate and determines those trunk link frames which each have at the moment at least one idle dial pulse originating register terminating thereon. The marker effects connections to one such trunk link frame over a trunk link frame connector and selects an idle originating register to which the marker than transmits the calling line location information which is registered on register relay in the selected originating register. The marker in the meantime has made connection to the line link frame over a line link frame connector. The marker tests for and selects an idle channel between the calling line on the line link frame and the selected originating register on the trunk link frame over available idle links and a junctor comprising a channel. The marker effects the operation of the select and hold magnets of the line link switches and the line junctor switches on the line link frame and of the trunk junctor switches and trunk link switches on the trunk link frame. The marker, the line link marker connector, the trunk link frame connector and the line link frame connector release, leaving the calling subscriber's line connected to a dial pulse originating register which thereupon transmits dial tone to the calling subscriber.

After the calling subscriber has transmitted to the originating register the office code and numericals of the called line number and after such called number has been registered in the originating register, the latter connects to an idle marker over an originating register marker connector and transmits the called directory number and the calling line location to register relays in the marker. The marker then tests for and connects to a trunk link frame having an idle intraoffice trunk terminating thereon, over a trunk link frame connector, and selects an idle intraoffice trunk having associated therewith a ringing switch for setting up the proper ringing condition for the called line. In the meantime, the marker circuit connects to and consults a number group circuit depending upon the thousands digit of the called line directory numericals, over a number group frame connector. The marker transmits the called directory numericals to the number group circuit which translates such numericals into called line equipment location of the called line and transmits back to the marker the line location of such called line. The marker, now having registered on relays therein the calling and the called line locations, releases the number group and releases the associated frame connector.

The marker proceeds to connect to the line link frame whereupon the called line location exists, over a line link frame connector. Before initiating channel selection to connect the called line with the selected intraoffice trunk, the marker checks the calling line location in some of its register relays against the called line location in others of such relays to determine whether the locations are identical, thereby to require a special trunk connection over a reverting trunk instead of an intraoffice trunk.

As is assumed, in order to exemplify the present invention, the marker discovers as a result of the above check, that the calling and the called lines have in fact the same physical equipment location on the line link frame. This necessitates that the marker change its intended job; namely, from an intraoffice trunk connection job, already initiated, to a reverting trunk connection job. The marker disconnects from the trunk link frame to release the previously selected intraoffice trunk, the associated ringing switch, and the trunk link frame connector over which such connections were effected. The marker also releases its connection to the line link frame containing the called line location by releasing the line link frame connector then in use.

Some trunk link frames will terminate the special reverting trunks and the marker now proceeds to test for such frames to select one such frame having thereon at least one idle such trunk and to select and connect to an idle reverting trunk over a trunk link frame connector. The marker also associates a ringing switch with the selected trunk and arranges such switch for the transmission of the proper reverting ringing condition.

In the meantime, the marker has made connection to the identical calling and called line locacations by connecting to the pertinent line link frame over a line link frame connector. The marker proceeds to select an idle channel between this line location and the reverting trunk over the line link switches, the line junctor switches, an idle junctor, the trunk junctor switches and the trunk link switches.

The marker passes supervision of the call at this stage to the reverting trunk after operating the necessary select and hold magnets associated with the selected channel to be used on the reverting trunk connection. At the passing of such supervision to the trunk, the marker effects the release to normal of itself and of the originating register.

The reverting trunk causes a busy tone to be transmitted to the calling and the called line, whereupon the calling subscriber replaces his receiver on the switchhook. The trunk thereupon causes ringing on both tip and ring conductors of the subscribers' line. When the called subscriber answers, the ringing will be tripped causing the release of the ringing switch and informing the calling subscriber of the answer by virtue of the cessation of ringing. The other subscriber may now remove the receiver from his switchhook and hold a conversation under the supervision of the trunk which will restore all operated equipment to normal upon disconnect of the subscribers.

When an intraoffice trunk connection is set up, there are two different sets of tip, ring and sleeve conductors which must be extended from two different line locations to the trunk circuit. Intraoffice trunks therefore have two appearances on a trunk line frame for connection of two subscribers' line locations to opposite ends of the trunk, requiring two separate junctor channels between line link frames or frame and the trunk link frame.

When a reverting trunk connection is desired, as herein described, there is of course only one set of tip, ring and sleeve conductors associated with both subscribers. Therefore, reverting trunks have only one appearance on a trunk link frame requiring only one junctor channel connection between the line link frame and the trunk link frame.

A full disclosure of a reverting type call must, of necessity, start with the calling subscriber's initiating such a call by removing his receiver from its switchhook to effect interconnection between the subscriber's line and a marker for the purpose of completing a dial tone connection to an originating register. Such dial tone connection results in the registration in said originating register of information pertaining to the calling line equipment location and the called directory number. The originating register seeks the service of an idle marker which is provided with both sets of information and which, in response to a knowledge of the office code of the called subscriber, which in the assumed instance may or may not be the same office code as the calling subscriber, proceeds to initiate an intraoffice trunk connection. The marker consults a number group circuit, depending upon the thousands digit of the called directory numericals, for the equipment location of the called subscriber preparatory to effecting the terminating connection to the trunk link frame upon which such called subscriber's line equipment is physically located.

Up to this point a reverting call is handled exactly like an intraoffice call and such preliminary circuit functioning is adequately described in the above-identified Busch and Erwin applications. The Busch application discloses full details of marker operation and the operation of connector circuits interconnecting a marker with trunk link frames and number group frames. The Erwin application discloses full particulars of the connector circuits interconnecting a marker with line link frames. The present disclosure is concerned particularly with the operation of the system subsequent to the time when the marker has received from the associated number group circuit the equipment location of the called subscriber and has determined that the calling and called subscribers have in fact the same equipment location in the office on the line link frames. Therefore, it is considered unnecessary to describe herein, other than by a disclosue of the necessary circuits, the system operation up to such time, since such description and disclosure may be found in the Busch and Erwin disclosures.

In the present system, although subscribers may be located on the same line circuit, there is no limitation upon what directory numbers they may be assigned, provided such numbers fall within the same marker group. A marker group may comprise as many as twenty number group circuits, each of which is capable of translating one thousand different sets of directory numericals. Thus, in one office of twenty thousand lines the subscribers may be assigned any directory numbers within that marker group. It will be assumed that the calling and called subscribers, 100 and 101 respectively, are two of a possible maximum of eight party line subscribers. The present system, with the trunk circuit shown in Figs. 11, 21 and 33, is capable of ringing such subscribers on a fully selective basis if no greater than four subscibers exist on the line. If five, six, seven or eight subscribers are on the line the system is capable of ringing such subscribers on a semiselective basis.

The calling subscriber's directory number will be assumed as Media 6-6851. This, in numerical digits means 636-6851 which specifies the office code as 636, the number group as the seventh number group which translates numericals 6001-6999 into corresponding equipment locations, and the directory numericals as 6851. The calling subscriber will be assumed to be a ring party which requires ringing on the ring side of the line with positive direct current superimposed on the alternating ringing current for two rings.

The called subscriber's directory number will be assumed as Media 6-7890. This, in numerical digits, means 636-7890 which specifies the office code as 636, the number group as the eighth which translates numericals 7001-7999 into corresponding equipment locations, and the directory numericals as 7890. The called subscriber will be assumed to be a tip party which requires ringing on the tip side of the line with positive direct current superimposed on the alternating ringing current for one ring.

Furthermore, it is assumed that the subscribers' line circuit is located on line link frame 00 out of a possible forty such line link frames 00—39. This location designation will be designated as frame tens 0 and frame units 0. Each frame comprises ten cross bar switch levels arranged in a vertical stack such that the switch levels are numbered 0 to 9 from the bottom to the top. Each switch level can terminate, in the verticals thereof, as many as seventy subscriber line circuits or as little as thirty line circuits. For the maximum arrangement the seventy vertical positions are divided into fourteen vertical sets numbered 0 to 13 and containing five verticals each. The same vertical sets on all switch levels of a frame comprise what is called a vertical group of as many as fifty lines. All of the lines terminating on the same switch level make up a horizontal group. Each vertical group, as above mentioned, contains five verticals the full height of the frame. Each of these verticals is called a file and such vertical files are numbered 0 to 4. The identification of a particular vertical file in a particular vertical group and in a particular horizontal group on frame 00 will identify a particular line circuit. In the description to follow, as will be apparent, the calling subscriber's line location information is registered eventually in a marker circuit preparatory to the marker setting up the originating connection to a trunk. Likewise the number group consulted by the marker will translate the called directory number into an equipment location also registered in the marker. It is the determination by the marker that these two line locations are identical which results in the releasing of the intraoffice trunk connection in favor of the desired reverting trunk connection.

It will be apparent from the previous discussion that the called and calling line locations will be identical. The information will be assumed as frame tens 0, frame units 0, vertical group 0, horizontal group 0 and vertical file 0. In addition to the physical location information required from the number group to identify the called line, it is necessary for the marker to know the type of ringing required. Such information will be furnished to the marker along with the line location information from the number group circuit. Furthermore, for charging purposes when required, the marker must know what class of service the calling line is entitled to. All subscribers terminating in the same vertical file will have the same class of service. Such class information, therefore, is provided, when required, to the marker when it is supplied with the vertical file designation of the calling line.

When the calling subscriber 100 initiates a call to subscriber 101, the removal of the receiver at substation 100 initiates a series of circuit operations whereby subscriber 100 is interconnected with an idle marker circuit over a line link marker connector 106 which extends numerous control conductors between line link frame 103 and the marker. These conductors are represented by cables 116, 117, 118, 200, 1200, 1503, 1500, 2800, 2801, 3000 and 3001. These interconnections will inform the marker that an originating register of a particular type (dial pulse register or multifrequency pulse register, for example) is required to be interconnected with the calling line for supplying dial tone thereto. Furthermore, these interconnections will effect the operation in the marker circuit of the following relays which indicate the above-assumed line location of the calling line: frame tens relay FT0(8) indicating that the tens digit of the line link frame upon which the calling line is located is zero; frame units relays FU4(9) and FU7(9) indicating that the units digit of the frame is zero on a two-out-of-five register relay basis; vertical group relay VGT0(2) indicating that the calling line is located in vertical group zero on the designated frame; horizontal group relay HGT0(5) indicating that the calling line terminates in a vertical on the zero level of switches on the designated frame; and vertical file relay VFT0(6) indicating that the calling line is the zero vertical file.

The marker, in the meantime, will have gained access to a trunk link frame having thereon at least one idle originating register of the required type. The marker gains access to a frame such as 104 through a trunk link frame connector circuit such as 108 of Fig. 1 over conductors represented by cables 119, 120, 121, 1300, 1301, 2805 and 2804 which extends further to cables 4001, 4002, 4003, 4004 and 4005. An idle originating register, such as 105 of Fig. 1 is selected. In the meantime, the marker will have been setting up similar interconnections with the line link frame 103 upon which the calling line 100 terminates. The marker, in order to connect to the particular frame 103, effects the operation through the line link marker connector circuit 106 then in use and over cable 122 of the line link frame connector circuit 107 which connects the marker to the line link frame 103 over cable 123. By means of its connection with trunk link frame 104 and originating register 105 over connector 108 and its connection with line link frame 103 and subscriber's line 100 over connector 123, the marker effects the interconnection of line 100 to originating register 105 over the frames 103 and 104. It is to be understood that the use of line link frame connector circuit 107 extends further control conductors between the marker and the frame 103. Such additional conductors are represented by cables 124, 125, 1201, 1202, 1501, 1502, 1600, 1601, 1700, 1701, 2802 and 2803.

The marker releases from its connection to the line link frame 103 by releasing the connector circuits 106 and 107 after the hold magnet operation has been placed under the control of the register 105.

In the meantime, the register 105 has transmitted dial tone to subscriber 100 who thereupon dials into register relays of the originating register 105 the directory number, Media 6-7890 (636-7890), of the called subscriber 101.

Furthermore, the marker, after having made connection with the register 105 over conductors represented by the above cables, transfers to register relays in the originating register 105 the calling line location information which, as heretofore mentioned, had been registered in the marker circuit.

Relays GTL1(16) and GTU(19) will be operated to provide respective grounds for transmitting the line identification and the frame identification to the originating register. The frame tens digit relay FT0(8), which indicated the frame tens digit of zero, was operated by ground on conductor 2017 in Fig. 20 from the line link marker connector 106 over cable 3000, etc., over conductor 2000, contact 6 of operated relay GTL2(19), conductors 1903 and 1904, to battery through the winding of relay FT0(8). Upon the operation of the relay GTU(19), the ground on conductor 1903 was extended over contact 2 of relay GTU(19), conductors 1905, 1906 and 1907 to originating register 105 over cables 2805, 1301, 121 and 120, through connector 108, cable 119 and frame 104 to operate a corresponding relay FT0 (not shown) in the register 105. Likewise, the frame units digit relays FU4(9) and FU7(9), which indicated the frame units digit of zero, were operated by grounds on conductors 2020 and 2021 in Fig. 20 from the line link marker connector 106 over cable 3000, etc., over conductors 2001 and 2002, contacts 4 and 5 of relay GTU(19), conductors 1908 and 1909, conductors 1910 and 1911 to battery through the windings of relays FU4(9) and FU7(9). Upon the operation of relay GTU(19), the grounds on conductors 1908 and 1909 were extended over contacts 9 and 10 of relay GTU(19), conductors 1912 and 1913, conductors 1914 and 1915, and conductors 1916 and 1917 to originating register 105 over cables 2805, 1301, 121 and 120, through connector 108, cable 119 and frame 104, to operate corresponding relays FU4 (not shown) and FU7 (not shown) in register 105. The relays FT0, FU4 and FU7 (not shown) operate in the register 105 and lock locally.

When relay GTL1(16) operated, it closed circuits for operating relays VG4(9) and VG7(9) in the marker and corresponding relays VG4 and VG7 (not shown) in the register circuit 105. These circuits comprise grounds over contacts 4 and 3 of relay GTL1(16), conductors 1602 and 1603, cable 13—16 to Fig. 13, conductors 1602 and 1603, contacts 10 and 9 of relay VGT0(2), conductors 201 and 202, cable 3—9 to Fig. 9, conductors 201 and 202, conductors 2003 and 2004 over contacts 9 and 10 of operated relay GTL3(20), conductors 2005 and 2006, conductors 2007 and 2008, and conductors 1918 and 1919 to battery through the windings of relays VG4(9) and VG7(9) in the marker, and in parallel over conductors 1920 and 1921, and conductors 1922 and 1923 to originating register 105 over cables 2805, 1301, 121 and 120, through connector 108, cable 119 and frame 104 to operate corresponding relays VG4 and VG7 (not shown) in register 105. The relays VG4 and VG7 (not shown) operate in register 104 and lock locally.

Relay GTL1(16) also closes circuits for operating relays HG4(10) and HG7(10) in the marker and corresponding relays HG4 and HG7 (not shown) in the register 105. These circuits comprise grounds over contacts 1 and 2 of relays GTL1(16), conductors 1604 and 1605, contacts 7 and 6 of relay HGT0(5), conductors 500 and 501, cable 10—15 to Fig. 10, conductors 2009 and 2010, contacts 4 and 5 of relay GTL3(20), conductors 2011 and 2012 and conductors 2013 and 2014 to battery through the windings of relays HG4(10) and HG7(10) in the marker, and in parallel over conductors 2015 and 2016 and conductors 1924 and 1925 to originating register 105 over cables 2805, 1301, 121 and 120, through connector 108, cable 119 and frame 104 to operate corresponding relays HG4 and HG7 (not shown) in register 105. The relays HG4 and HG7 (not shown) operate in register 105 and lock locally.

Relay GTL1(16) completes a circuit for operating relay VF0(10) in the marker and the corresponding relay VF0 (not shown) in the register 105. The circuit comprises ground over contact 12 of relay GTL1(16), conductor 1606, contact 7 of relay VFT0(6), conductor 600, cable 16—20A to Fig. 20, conductor 600, over contact 2 of the operated relay GTL4(20), conductor 2018, cable 10—20 to Fig. 10, conductor 2018, to battery through the winding of relay VF0(10), and in parallel over conductor 2019, and conductor 1926 to the originating register 105 over cables 2805, 1301, 121 and 120, through connector 108, cable 119 and frame 104 to operate a corresponding relay VF0 (not shown) in register 105. The relay VF0 (not shown) operates in register 105 and locks locally.

When the relays FT0, FU4 and FU7, HG4 and HG7, VG4 and VG7, and VF0 (not shown) in the register 105 have operated and locked locally and the dial tone connection above described is completed, the marker releases along with the frame connector 108 and connectors 106 and 107 if same have not released by this time.

The called number, Media 6–7890 (636–7890), will be registered in register relays in the originating register 105 which record the A digit 6, the B digit 3, the C digit 6, the thousands or D digit 7, the hundreds or E digit 8, the tens or F digit 9, and the units or G digit 0. These registers, i. e. the A through G registers, each comprise five relays such as A0, A1, A2, A4 and A7, etc., which are operated on a two-out-of-five basis to register the digits. Relays A2 and A4 in the register 105 will be operated to register the A digit 6. Relays B1 and B2 will operate to register the B digit 3. Relays C2 and C4 will operate to register the C digit 6. Relays D0 and D7 in the originating register 105 will be operated to register the thousands or D digits 7. Similarly, relays E1 and E7 will register the hundreds or E digit 8; relays F2 and F7 will register the tens or F digit 9; and relays G4 and G7 will register the units or G digit 0.

At the end of dialing the called number, when such digits have been registered in the register 105, such register makes connection with an idle marker over an originating register marker connector 127. The interconnection is effected by means of numerous control conductors represented by cables 128, 126, 4600, 4601, 4700, 4701, 4900, 4901, 5100, 5101, 5200, and 5201 to the marker circuit. As a result of this interconnection a relay OR (not shown) in the marker is operated to inform the marker that it has been called in by an originating register.

The marker connector 127 connects ground through cables 126, 4601, 4701, 4901 and 5100 to conductor 3900 completing a circuit which extends over contact 4 of relay TRLA(41), contact 5 of relay DIS2(41), conductor 4100, winding of relay CKG1(40), conductor 4000, contact 2 of relay TRLA(41), contact 5 of relay DIS1(41), conductor 4101 through the windings of the relays CKG2(29) and CKG3(29) to battery.

Relays CKG2(29) and CKG3(29) prepare the marker for operation as described in the Busch application in regard to the dial tone connection. Relay CKG2(29) operates relay GT3(34). Relay CKG3(29) operates relays CKG4(25), CKG6(29), TLC1(40) and TLC2(40). Relay CKG4(25), when operated, in turn operates relays ONW(38), LLC1(28), LLC2(28) and HMC(36). Relay CKG6(29) operates relay BG(44). Relay TLC1(40) operates relay HMT1(36).

Relay LLC1(28) operates relay CHE(24) which in turn operates relay LXP1(36). Relay LLC2(28) operates relay FCGA(34).

All of the foregoing operations take place in connection with the seizure of the marker for a dial tone connection as described in the Busch application.

Relay OR (not shown) in operating provides an operating circuit for a ground transmitting relay GTL(38) by closing a circuit from ground on conductor 3901 in Fig. 39, conductor 3902, contact 1 of relay CKG6(29), conductor 2900 to battery through the winding of relay GTL(38). Relay GTL(38) closes circuits for operating relay GTL2(19), GTL3(20) and GTL4(20).

When the multicontact relays of the originating register marker connector have operated, as above outlined, a plurality of circuits are closed for transferring the calling line location designation and the called line directory number designation from the originating register to the marker. It will be remembered that as a result of the transfer of the calling line designation to the originating register during the dial tone connection, the following relays (not shown) in the originating register were operated to identify the location of the calling line. Frame tens relay FT0, frame units relays FU4 and FU7, horizontal group relays HG4 and HG7, vertical group relays VG4 and VG7 and vertical file relay VF0.

As a result of dialing the called line designation register relays (not shown) in the originating register, A2 and A4, B1, B2, C2 and C4 were operated to record three digits of the office designation of the wanted line, while relays D0, D7, E1, E7, F2, F7, G4 and G7 (not shown) were operated to record the four digits of a numerical designation of the wanted line. Each of these relays grounds a conductor individual thereto which is extended through the originating register marker connector to the marker to operate the corresponding register relay in the marker. In addition, the originating register grounds one of three conductors to inform the marker whether the call was a permanent signal, a partial dial or a regular call and one of three conductors to inform the marker whether a coin has been returned, a stuck coin has been encountered or that no coin return attempt has been made.

Specifically, relays HG4, HG7, FU4 and FU7 in the originating register connect ground to conductors 2022, 2023, 2024 and 2025, respectively, through cables 5201, etc. Conductors 2022 and 2023 extend to conductors 2009 and 2010 over contacts 4 and 5 of relay GTL3(20), conductors 2011 and 2012 and conductors 2013 and 2014 to the windings of horizontal group relays HG4(10) and HG7(10). Conductors 2024 and 2025 extend to conductors 2001 and 2002 over contacts 4 and 5 of relay GTL2(19), conductors 1908 and 1909 and conductors 1910 and 1911 to the windings of the frame units relays FU4(9) and FU7(9).

Also in the originating register, relays FT0, VG4, VG7 and VF0 connect ground to conductors 2029, 2027, 2028 and 2026, respectively, through cable 5201, etc. Conductor 2026 extends over contact 2 of relay GTL4(20), conductor 2018, through cable 19—20 to the winding of relay VF0(10) and battery. Conductors 2027 and 2028 extend to conductors 2003 and 2004 over contacts 9 and 10 or relay GTL3(20) to conductors 2005 and 2006, 2007 and 2008, 1918 and 1919 and to battery through the windings of relays VG4(9) and VG7(9). Conductor 2029 extends to conductor 2000 over contact 6 of relay GTL2(19), conductors 1903 and 1904 to the winding of relay FT0(8) and battery.

In the originating register the relays which were operated to register the digits representing the office in which the called line is located, namely, relays A2, A4, B1, B2, C2 and C4 (not shown) connect ground to conductors 4902, 4903, 5202, 5203, 5204 and 5205, respectively. Conductors 4902 and 4903 extend from cable 4900, etc. to battery through the windings of relays AC2(49) and AC4(49); conductors 5202, 5203, 5204 and 5205 extend through cable 5200, etc. to the windings of relays BC1(52), BC2(52), CC2(52) and CC4(52).

The A code register of Fig. 49 operates one of a plurality of A translator relays in accordance with the setting of that register. One such translation relay, namely relay AT0—9(52) has been shown, the circuit for which may be traced from battery through the winding of relay AT0—9(52), conductor 5206, contact 3 of relay AC4(49), contact 2 of relay AC2(49), conductor 4904 to ground at contact 5 of relay CKG1(40). With the A translator relay operated, the B code register of Fig. 52 operates one of a plurality of B translation relays in accordance with the joint setting of the A and B code registers. One such B translation relay, namely, BT10—99(52) has been shown, and this relay is operated in a circuit extending from battery through its winding, contact 7 of relay AT0—9(52), contact 4 of relay BC2(52), contact 2 of relay BC1(52), conductor 5207, cable 43—52 to Fig. 43, conductor 5207 to ground at contact 7 of relay CKG1(40). With the B translation relay operated, the C code register of Fig. 52 grounds a code point corresponding to the joint setting of the A, B and C code registers. Since the code registers have been set in accordance with the code of the same local office and that office is assumed to have only physical numbers, the code point so grounded is connected to the winding of a local physical office relay LPA(54). The circuit for relay LPA(54) may be traced from battery through the winding of relay LPA(4), conductor 5402, contact 4 of relay BT10—99(52), contact 3 of relay CC4(52), contact 2 of relay CC2(52), conductor 5208, cable 43—62 to Fig. 43 to ground at contact 8 of relay CKG1(40) over conductor 5208.

Relay LPA(54), in operating, closes a circuit for the proper route relay to control the operation of the marker in the selection of an idle trunk leading to the office identified by the office code. In this case the selected trunk will be an intra-office trunk. However, the functions of the marker differ in accordance with the class of the calling subscriber. Therefore, relays S1(54) and S3(54) will have been operated from ground on conductor 5400 in Fig. 54 as a result of calling line class of service identification (not shown). When relay S1(54) operated a circuit for the route relay is completed, which circuit may be traced from ground at contact 12 of relay CKG1(40), conductor 4006, contact 4 of relay DIS2(41), conductor 4102, over a contact of the relay OR (not shown), contact of relay LPA(54), contact of relay S1(54), winding of route relay R2(54) to battery through the windings of the route relay R2(54) and the no-change, non-coin relay NCNC(54); relays R2(54) and NCNC(54) operate in this circuit.

Relay LPA(54) also prepares the marker to receive and register the numerical designation of the called line. In a seven-digit area such as has been assumed for the present disclosure, the office code digits are registered as above described on the A, B and C registers of the originating register and the four numerical digits are registered on registers D, E, F and G. However, certain areas may include offices employing one or two code digits or may employ no code digit whatsoever for local calls. Where only two office code digits are employed, the numerical digits will be registered on registers C, D, E and F. Where only one office code is registered, the numerical digits will be registered on registers B, C, D and E and if no code digit is registered the numerical digits will be registered on registers A, B, C and D. Since the marker is designed to function with any one of such areas, or with an area connecting with a plurality of such areas, means is required for connecting the proper registers in the originating register with the numerical digit registers of the marker. For this purpose, relays N1(46), N2(46), N3(46), N4(46) and their associated relays N1A(46), N2A(46), N3A(46) and N4A(46) are provided. Relays N1(46) to N4(46) have their windings under the control of the translator control circuit indicated in Fig. 45. Under the assumed condition of a simple seven-digit area relay N4(46) is operated under the control of the translator control circuit by ground on lead 4500, under further control of relays LPA(54) and CKG1(40) as described in the Busch application. Relay N4(46) operates in this circuit, closing an obvious circuit for relay N4A(46).

It will be remembered that in the originating register, relays D0, D7, E1, E7, F2, F7, G4 and G7 (not shown) were operated to register the numerical designation 7890. These relays connect ground through cable 4600, etc. over conductors 4602, 4603, 4604, 4605, 4606, 4607, 4608 and 4609, respectively, and to the armatures of the relays of Fig. 46. With relay N4(46) operated, conductors 4602, 4603, 4604 and 4605 are extended over contacts 1, 5, 7 and 10 of relay N4(46), conductors 4610, 4611, 4612 and 4613 to battery through the windings of the thousands register relays TH0(45) and TH7(45) and the hundreds register relays HN1(55) and HN7(55). With relay N4A(46) operated, conductors 4606 and 4607 are extended over contacts 9 and 11 of relay N4A(46), conductors 4614 and 4615, conductors 5600 and 5601 to battery through the windings of tens register relays T2(55) and T7(55) and conductors 4608 and 4609 are extended over contacts 3 and 2 of relay N4A(46), conductors 4616 and 4617 to battery through the windings of the units register relay U4(56) and U7(56). These numerical register relays operate in the circuits above traced.

Since it has been determined that this is a local call, the numerical registration will be transmitted to the number group circuit which will inform the marker as to the location and type of calling line and the nature of the ringing current required. However, since the connection cannot be completed unless an idle trunk is available, the seizure of the number group circuit is delayed until the trunk link frame has been seized.

When route relay R2(54) operates as above described, it closes a circuit from battery through the winding of relay NSI(32), conductor 3200, conductor 4300, contact 5 of relay R2(54), contact 4 of ground supply relay GS4(54) to ground. Relay NSI(32) operates to indicate that this appears to be an intraoffice call which does not require the services of a sender. With relay NSI(32) operated, the intraoffice call relays ITR2(25) and ITR3(42) are operated in a circuit which may be traced from battery, through the winding of relay ITR3(42), conductor 4200, through cable 26—30 to Fig. 26, conductor 4200, winding of relay ITR2(25), conductor 2500, through the recycle controller (not shown) indicated in Fig. 37, through the class of call circuit (not shown) indicated in Fig. 32, conductor 2500, contact 6 of relay NSI(32), contact 3 of relay LR(32), conductor 3201, contact 8 of relay TR2E(41), conductor 4103 and conductor 4097 to cable 5100, etc. to ground through the originating register connector circuit. Relays ITR2(25) and ITR3(42) assist in controlling the operation of the marker in making an intraoffice call.

The marker is now ready to seize a trunk link frame having at least one idle intraoffice trunk appearing thereon. Frame-busy test leads are connected to the windings of frame-busy relays (not shown) as in the case of a dial tone connection, the frame-busy test leads of those frames which are unavailable to the marker being marked with ground by the associated multi-contact relay. Relay R2(54) operates a pair of frame connector relays (not shown) which connect a frame test lead from each trunk line frame having intraoffice trunks associated therewith to the frame test relays (not shown) in the marker.

The intraoffice trunk connected with trunk link frame 112 is shown as 113 in Fig. 1. This trunk, when idle, connects ground to the frame-busy test conductor of the associated trunk link frame together with the corresponding conductors of other intraoffice trunks of the same type and appearing on the same trunk link frame.

The marker now tests for an idle intraoffice trunk. In a manner similar to that described for the dial tone connection in the Busch application, route relay R2(54) identifies the twenty-block route within which intraoffice trunks are located at frame 112 by operating a twenty-block relay TB0(54) over a circuit extending from ground, contact 5 of the ground supply relay GS4(54), contact 4 of route relay R2(54), through the winding of the proper TB relay, assumed to be TB0(54), and thence to battery over lead 5401, and identifies the location of the intraoffice trunk within that twenty-block group by operating a test group relay TG0(54) over a circuit extending from ground, contact 6 of relay GS4(54), contact 3 of relay R2(54), through the winding of the proper TG relay, assumed to be TG0(54), and thence to battery over conductor 5403.

At such time as the marker has established the necessary connections with the selected trunk line frame 112 and the intraoffice trunk 113, relays FBK(36) and LCK(23) will be operated to so inform the marker. The operating circuit for relay FBK(36) extends from battery on conductor 3700 in Fig. 37 from the cross-detection circuit, through the winding of relay FBK(36), over conductor 3600, contact 11 of relay LK1(24), conductor 2400, and through cable 4001, etc. to ground through trunk link frame connector circuit 114. The operating circuit for relay LCK(23) extends from battery through the winding of relay LCK(23), over conductor 2300 and through cable 1300, etc., to ground through the trunk line frame connector circuit 114.

The marker is now ready to determine the location of the called line. When relay ITR2(25) was operated as above described, it closed a circuit from battery through the winding of relay FLG(42), conductor 4201, through cable 26—30 to Fig. 26, conductor 4201, contact 10 of relay LK1(24), conductor 2401, contact 7 of relay ITR2(25), conductor 2501, through cable 26—30 to Fig. 30, conductor 2501 to ground at contact 10 of relay CKG3(29). Relay FLG(42) operates in this circuit to indicate that the marker is ready to establish the first (namely, the terminating) link of an intraoffice connection and closes the circuit from battery through the winding of relay SNG2(59), conductor 5900, winding of relay SNG1(60), conductor 6000 through the master test and timing circuit (not shown), back over conductor 6001, contact 7 of relay CK0(51), conductor 5102, contact 1 of relay PUL(61), conductor 6100, contact 5 of relay RNG(51), conductor 5103, through cable 43—51 to Fig. 43, conductor 5103 to ground at contact 10 of relay FLG(42). A circuit is also closed in parallel with the windings of relays SNG2(59) and SNG1(60) which extends from ground as above traced to conductor 6100, conductor 5104 and over contact 5 of relay CK0(51), conductor 5105 to the winding of relay UC(59) and battery. Relays SNG1(60), SNG2(59) and UC(59) operate in the above-traced circuit. Relay SNG2(59) closes the necessary battery supply means for the operation of the number group circuit. Relay FLG(42) also closes a circuit from ground at its contact 12, over conductor 4202, through cable 43—51, conductor 4202, contact 7 of relay PUL(61), conductor 6101, contact 1 of relay CK0(51), conductor 5106 through the winding of relay LL1(50) and battery, operating relay LL1(50). In addition, relay FLG(42) closes the circuit from ground at its contact 3 over conductor 4203, cable 26—30 to Fig. 26, conductor 4203 to battery through the winding of relay HGL1(14), from ground at its contact 2, over conductor 4204, cable 13—27, conductor 4204 to battery through the winding of relays VGL1(3) and VGL2(3), and from ground at its contact 4 over conductor 4205, cable 8—31 to Fig. 8, conductor 4205 to battery through the winding of relay VFL1(6) operating relays HGL1(14), VGL1(3), VGL2(3) and VFL1(6).

Each number group circuit is equipped to assist in the translation of one thousand directory numbers. Therefore there will be one number group circuit assigned to each series of one thousand directory numbers and the marker by examining the thousands digit of the called directory number will determine the particular number group circuit which is required.

When relay LPA(54) operated as previously described, it closed a circuit from ground over conductor 4503 in Fig. 45 to battery through the winding of relay OAN(45). Therefore, when relay SNG2(59) operates, it closes a start circuit for the number group circuit selected by the thousands digit register of Fig. 45 which may be traced from battery on conductors 3903 and 3904 of Fig. 39, contact 1 of relay TLC1(40), conductors 4008 and 3905 to the trunk link frame selection controller (not shown) back on lead 4206 in Fig. 42, conductor 4301, cable 43—51 to Fig. 51, conductor 4301, conductor 5000, contact 11 of relay SNG2(59), conductor 5901, through cable 49—56, conductor 5901, conductor 5602, contact 5 of relay TH0(45), contact 8 of relay TH1(45), contact 8 of relay TH2(45), contact 8 of relay TH4(45), contact 6 of relay TH7(45), contact 1 of relay TH0(45), contact 1 of relay TH7(45), contact 3 of relay OAN(45), conductor 4502 to the No. 7 number group circuit where it effects the interconnection of the marker with the No. 7 number group circuit over a number group frame connector.

As a result of the selection of number group 7 and its interconnection to the marker, a plurality of circuits are closed connecting the marker with the number group circuit through multi-contact relays similar to those in the other connector circuits previously described. With such multicontact relays operated, all of the circuits are completed which are necessary for transmitting the called line designation to the number group circuit and for receiving the translation of that designation from the number group circuit.

Ground is connected to conductor 5902 from the number group circuit indicated in Fig. 59 and such ground extends to battery through the winding of relay NGK(60). Another circuit is closed from ground at conductor 5903 through the winding of relay NGK1(59), conductor 5904, contact 7 of relay BN(61), contact 7 of relay R1(61), contact 7 of relay TB1(61), conductor 6102, contact 8 of relay SNG2(59), through resistance lamp NGKB(59) to battery. Relays NGK(60) and NGK1(59) operate in the above-traced circuit to indicate to the marker that the multicontact relays of the number group circuit have been operated.

At this point a circuit is closed from ground on conductor 5603 in Fig. 56 through cable 42—56, conductor 5603, conductor 4207, conductor 4302 to battery through the winding of relay PTK(44) operating that relay.

The hundreds registers of Fig. 55 connects battery to one of ten conductors leading to the number group circuit where they are extended to the windings of ten hundreds block relays. Since relays HN1(55) and HN7(55) have been operated, a circuit is closed from battery through resistance lamp HBS(59), contact 10 of relay SNG2(59), conductor 5908, contact 5 of relay SLCK1(60), conductor 6003, through cable 49—56, conductor 6003, conductor 5608, contact 1 of relay HN1(55), contact 3 of relay HN7(55), conductor 5501 to the number group circuit to operate a hundreds block relay therein.

The tens register of Fig. 55 connects battery to one of ten conductors leading to the number group circuit where they are extended in multiple to the ten hundreds block relays so that one of one hundred tens block relays of the number group circuit will be operated corresponding to the combination of the hundreds and tens digits. Since relays T2(55) and T7(55) have been operated, a circuit is closed from battery through resistance lamp TBS(59), contact 9 of relay SNG2(59), conductor 5905, winding of relay TBW(59), conductor 5901, contact 4 of relay SLCK1(60), conductor 6002, to the incoming trunk class circuit, back over conductor 5604 in Fig. 56, to conductor 5605, contact 2 of relay T2(55), contact 2 of relay T7(55), conductor 5509 to the number group circuit and to ground therein through the winding of a tens block relay. The tens block relay and relay TBW(59) operate in this circuit.

The units register of Fig. 56 connects battery to one of ten conductors leading to the number group circuit to operate one of the units relays set in that circuit. Since relays U4(56) and U7(56) have been operated, a circuit is closed from battery on conductor 5606 of Fig. 56 from the PBX hunting circuit, contact 1 of relay U4(56), contact 2 of relay U7(56), conductor 5607, through cable 49—56, conductor 5607, conductor 4905, contact 10 of relay UC(59), conductor 5909 to the number group circuit to operate a units relay therein. The number group circuit returns ground on conductor 5907 in Fig. 59 to battery through the winding of relay UK(59) to indicate to the marker that the units relay has been operated in the number group circuit.

Each number group circuit has one thousand sets of terminals, each set corresponding to one of the thousands designations having the thousands digit to which the number group circuit is individual. With one units relay and one tens block relay operated, one set of terminals is marked by having extended to them battery supplied by the marker. Corresponding to the three terminals of each line designation set there are three sets of transmitter terminals which are used for transmitting to the marker the location of the called line and the kind of ringing current required. One field provides the identity of the line-link frame on which the called line is located in terms of the tens and units digits of the frame number, the second field identifies the line group in terms of the horizontal group and vertical group on the line-link frame within which the called line is located, and the third field identifies the vertical file in which the line is located and the type of ringing current required by the line. Each translator field has as many terminals as there are combinations of the items in that field. Each translator terminal is connected in parallel to two resistances to one conductor in each of two sets, each set having one conductor for each item. These conductors are extended over contacts of the multi-contact relays back to the armatures. The number group circuit and the translator fields therein are fully disclosed by Busch and reference may be had thereto for details not disclosed herein.

When relay NGK1(59) operated as a check of the operation of the multicontact relays it connects battery through resistance lamps WF(59), WL(59) and WP(59) over contacts 1, 2 and 3 of relay SNG2(59), contacts 2, 3 and 4 of relay NGK1(59) to conductors 5909, 5910 and 5911 which extend to the number group circuit. When the units relay in the number group circuit operates as above described, it extends these conductors to corresponding terminals of the cross-connecting fields in the number group circuit. As previously assumed, since the calling and the called line locations are identical, the terminal corresponding to conductor 5909 is cross-connected in parallel to terminals connected to conductors 700 and 701 of Fig. 7 to ground through the windings of relays FTN0(7) and FUN0(7). The terminal corresponding to conductor 5910 is cross-connected in parallel to terminals connected to conductors 400 and 401 of Fig. 4 to ground through the windings of relays HGN0(4) and VGN0(4). The terminal corresponding to conductor 5911 is cross-connected in parallel to terminals connected to conductor 702 of Fig. 7 to ground through the winding of relay VFN0(7) and to conductor 5502 of Fig. 55, to ground through the winding of relay RCN7(55).

When the identification relays have operated as above described, they in turn operate relays in the marker which register the identification and lock independent of the number group circuit. Relay FTN0(7) closes a circuit from ground over its contacts, conductor 704 through the winding of relay FTT0(17), conductor 1702 to cross-detector battery. Relay FTT0(17) operates in this circuit and extends its operating ground over its contact 11, conductor 1703, through cable 17—50, contacts 5 of relay LL1(50), to the winding of relay FTL(50) and battery. Relay FTL(50) operates in this circuit and connects ground over its contact 5 to conductor 1703 to hold itself and relay FTT0(17) operated. Relay FUN0(7) closes a circuit from ground over its contacts, conductor 705, conductor 800, winding of relay FUT0(18), conductor 1800 to cross-detector battery. Relay FUT0(18) operates in this circuit and extends its operating ground over its contact 4, conductor 1801, through cable 17—50, contact 7 of relay LL1(50) to battery through the winding of relay FUL(50). Relay FUL(50) operates and connects ground over its contact 5, conductor 1801 to hold itself and relay FUT0(18) operated.

Relay HGN0(4) closes a circuit from ground over its contacts, conductor 402, conductor 1400, conductor 1504 to battery through the winding of relay HGT0(5). Relay HGT0(5) operates in this circuit and extends its operating ground over its contact 8, conductor 502, contact 1 of relay HGL1(14), conductor 1401, through cable 14—27, conductor 1401, conductor 2700, through cable 39—50, contact 9 of relay LL1(50), conductor 5002, to battery through the winding of relay HGL(60). Relay HGL(60) operates in this circuit connecting ground over its contact 4, conductor 6004 to conductor 2700 to hold itself and relay HGT0(5) operated.

Relay VGN0(4) closes a circuit from ground over its contacts, conductors 403, 300 and 301 to battery through the winding of relay VGT0(2). Relay VGT0(2) operates in this circuit extending its operating ground over its contact 6, conductor 203, contact 1 of relay VGL1(3), conductor 302 through cable 13—27, conductor 302, conductor 2701, cable 39—50, conductor 2701, contact 8 of relay LL1(50), conductor 5003, to battery through the winding of relay VGL(60). Relay VGL(60) operates in this circuit and at its contact 4 connects ground over conductor 6005 to conductor 2701 to hold itself and relay VGT0(2) operated.

Relay VFN0(7) closes a circuit from ground over its contacts, conductor 706 to battery through the winding of relay VFT0(6). Relay VFT0(6) operates in this circuit and extends its operating ground over its contact 6, conductor 601, contact 5 of relay VFL1(6), conductor 602, contact 10 of relay LL1(50), conductor 5004 to battery through the winding of relay VFL(60). Relay VFL(60) operates in this circuit and connects ground over its contact 4 over conductor 6006 to conductor 602 to hold itself and relay VFT0(6) operated.

Relay RCN7(55) closes a circuit from battery over its contact, conductor 5503, through cable 55—63, conductor 5503, winding of relay RCT7(63), conductor 6300 and over conductor 5300 to cross-detector battery. Relay RCT7(63) operates in this circuit and extends its operating ground over its contact 1, conductor 6301, conductor 5301, conductor 5107, conductor 5005, contact 11 of relay LL1(50), conductor 5006 to battery through the winding of relay RCL(60). Relay RCL(60) operates in this circuit and connects ground over its contact 4 over conductor 6007 to conductors 5005 and 5107 to hold itself and relay RCT7(63) operated.

The marker proceeds to set up the selected ringing code in the ringing switch associated with the trunk circuit. The operation of relay RCT7(63) indicates, as will be apparent hereinafter, that the ringing for the called line is to consist of positive superimposed ringing for one ring on the tip side of the line. With relay RCT7(63) operated and locked as above described, a circuit is closed from battery on conductor 6200 in Fig. 62, winding of relay RS7(62), conductor 6201, contact 4 of relay RCT7(63), conductor 6302, conductor 6202 to the sequence control circuit, back over conductor 6203, contact 1 of relay FNB(53), conductor 5302, contact 2 of relay BNB(63), contact 2 of relay RIB(63), contact 3 of relay TBIB(63), contact 1 of relay BY(63), contact 3 of relay OV(63), conductor 6303, to ground in the number check circuit. Relay RS7(62) operates in this circuit and closes a circuit from battery over conductor 2600 in Fig. 26, cable 26—30, conductor 2600, contact 6 of relay FLG(42), conductor 4208 through cable 43—62, conductor 4208, contact 2 of relay RS7(62), conductor 6204, to ground through the winding of select magnet S7 (not shown) on the ringing switch. Select magnet S7 operates to select the proper code and to prepare the ringing switch for operation. At one of its auxiliary contacts, select magnet S7 closes a circuit from ground to conductor 6205 in Fig. 62, to battery through the winding of relay RSK(62) to inform the marker that the select magnet has been operated. With relay RSK(62) operated, a circuit is closed for relay RS1(62) which in turn operates magnet S1 (not shown) to prepare the ringing switch for connecting ringing current to the tip side of a subscriber's line. The circuit for relay RS1(62) may be traced from battery on conductor 6206 of Fig. 62, winding of relay RS1(62), conductor 6207, contact 3 of relay RCT7(63), conductor 6304, contact 3 of relay RSK(62), conductor 6208, through the sequence control circuit, back over conductor 6209, contact 3 of relay FNB(53), conductor 5303, contact 4 of relay BNB(63), contact 4 of relay RIB(63), contact 5 of relay TBIB(63), contact 5 of relay BY(63), contact 8 of relay OV(63), conductor 6305 to ground in the number check circuit. Relay RS1(62) operates in this circuit and closes a circuit from battery on conductor 6200 in Fig. 62, contact 2 of relay RS1(62), conductor 6210 to ground through the winding of select magnet S1 (not shown) of the ringing selection switch. Select magnet S1 operates in this circuit and also connects ground to conductor 6205.

Upon the operation as above described, of relays VFT0(6), HGT0(5) and VGT0(2), circuits were completed for operating relays FTK1(16), HTK1(14) and VTK1(13). The circuit for relay FTK1(16) may be traced from ground over contact 3 of relay VFT0(6), over contact 4 of relay VFT1(6), VFT2(6) and VFT3(6), contact 3 of relay VFT4(6), contact 7 of relay VFG(6), conductor 603, to battery through the winding of relay FTK1(16). The circuit for operating relay HTK1(14) may be traced from battery through the winding of relay HTK1(14), contact 12 of relay HGG(14), conductor 1402, contact 4 of relay HGT9(15), contacts No. 5 of relays HGT5(15), HGT6(15), HGT7(15) and HGT8(15), conductor 1505, contact 5 of relays HGT1(5), HGT2(5), HGT3(5) and HGT4(5), to ground over contact 4 of relay HGT0(5). The circuit for operating relay VTK1(13) may be traced from battery through the winding of relay VTK1(13), contact 5 of relay VGG2(13), conductor 1302, contact 5 of relay VGG1(3), conductor 303, contact 5 of relay VGT13(12), contact 6 of relays VGT7(12), VGT8(12), VGT9(12), VGT10(12), VGT11(12) and VGT12(12), conductor 1203, over contacts No. 6 of relays VGT1(2), VGT2(2), VGT3(2), VGT4(2), VGT5(2) and VGT6(2) to ground over contact 5 of relay VGT0(2).

The operation, as above, of the locking relays FTL(50), FUL(50), VGL(60), HGL(60), VFL(60) and RCL(60), indicating that the called line designation has been translated by the number group frame and has been registered in the marker, closes a circuit for bringing about the release of the number group circuit and this circuit may be traced from battery through the winding of release number group relay RNG(51), conductor 5108, conductor 5109 to the P. B. X hunting circuit back over conductor 5110, conductor 5007, contact 3 of relay FTL(50), contact 3 of relay FUL(50), conductor 5008, contact 2 of relay VGL(60), contact 2 of relay HGL(60), contact 2 of relay VFL(60), contact 2 of relay RCL(60), conductor 6008, contact 6 of relay LL1(50), conductor 5009, through cable 43—51 to ground at contact 1 of relay PTK(44). Relay RNG(51) at contact 2 completes a circuit from ground over that contact, conductor 5111, through the winding of a number group release relay (not shown) operating that relay which opens the circuit of relays OAN(45) and N4(46). In addition relay RNG(51) opens the circuit of relays SNG1(60) and SNG2(59). Relay SNG2(59) in releasing opens the operating circuit for the marker preference relay and the connector relays interconnecting the marker with the number group frame.

Relay SNG2(59) in releasing, releases relays UK(50), NGK(60), TBW(50) and NGK1(59). Relay N4(46) in releasing releases the thousands register relays of Fig. 45, the hundreds register relays of Fig. 55 and relay N4A(46). Relay N4A(46) in releasing releases the tens register relays of Fig. 55 and the units register relays of Fig. 56. The release to normal of the number group circuit releases relays FTN0(7), FUN0(7), VFN0(7), VGN0(4), HGN0(4) and RCN7(55).

In the meantime, as a result of the operation of relays FTT0(17) and FUT0(18) the marker makes connection with the line-link frame upon which the called line location is, for the purposes of initiating the terminating connection of what the marker believes is to be an intraoffice call. Such circuit may be traced from battery on conductor 3906 in Fig. 39, conductor 3907, contact 7 of relay LLC1(28), conductor 2806 to the trunk-link frame selection controller circuit, back over conductor 4209 in Fig. 42, conductor 4210, conductor 4303, contact 2 of relay PTK(44), conductor 4400 to the number checking circuit, back over conductor 5112 in Fig. 51, contact 3 of relay RCL(60), conductor 6009, through cable 43—51, conductor 6009, contact 2 of relay SCB1(44), conductor 4401, conductor 4304, through cable 8—31, conductor 4304, contact 8 of relay FUT0(18), conductor 1802, contact 1 of relay FTT0(17) and over conductor 1704 and through cable 1700, etc. and a suitable line-link frame connector circuit for interconnecting the marker with the line-link frame upon which the called line location exists.

Up to this point all of the circuit operations are identical with those performed during the regular connection of a regular intraoffice call where the calling and the called subscribers have different equipment locations in the office.

In the meantime, the marker makes a check of the called and calling line location registrations to determine if a special reverting trunk connection is required. Such will be the case if the check circuit determines that the line location of the calling and the called subscribers is in fact the same, as the assumed conditions will show. The check circuit may be traced from battery through the winding of relay RV2(42), conductor 4211, through cable 26—30, conductor 4211, contact 7 of relay SCB(24), conductor 2402, contact 1 of relay SOG2(25), conductor 2502, cable 16—37, conductor 2502, contact 3 of relay FTK1(16), conductor 6107, contact 1 of relay VFT0(6), conductor 604, through cable 16—20B, conductor 604, contact 1 of relay VF0(10), contact 3 of relay CB7(10), conductor 1000 through cable 10—15, conductor 1000, contact 3 of relay HTK1(14), conductor 1403, conductor 1506, contact 1 of relay HGT0(5), conductor 503, conductor 1507, through cable 10—15, conductor 1507, contact 4 of relay HG7(10), contact 1 of relay HG4(10), contact 1 of relay CB7(10), conductor 1001 through cable 3—9, conductor 1601, contact 2 of relay VTK1(13), conductor 1303, conductor 1204, contact 1 of relay VGT0(2), conductor 204, conductor 304 through cable 3—9, conductor 304, contact 5 of relay VG7(9), contact 1 of relay VG4(9), conductor 900, contact 5 of relay CB7(10), conductor 1002, conductor 1803, contact 1 of relay FUT0(18), conductor 1804, conductor 801, contact 4 of relay FU7(9), contact 1 of relay FU4(9), conductor 901, conductor 1003, contact 10 of relay CB7(10), conductor 1004, contact 12 of relay FTT0(17), conductor 1705, conductor 802, contact 3 of relay FT0(8), conductor 803, conductor 1005, contact 8 of relay CB7(10), conductor 1006, through the winding of relay RV1(42), conductor 4212 to ground over contact 9 of relay CKG1(40). Relays RV1(42) and RV2(42) operate in the circuit. With relays RV1(42) and RV2(42) operated, a circuit is completed for operating relay RV(54) from ground over contact 2 of relay RV1(42), contact 1 of relay RV2(42), conductor 4213, conductor 4214, to Fig. 54, conductor 4214 to battery through the winding of relay RV(54). Relay RV(54), in operating, places ground upon conductor 4215 of Fig. 42 to battery through the winding of relay RV3(42) which operates in that circuit.

The operation of relays RV1(42), RV2(42), RV3(42) and RV(54) signify to the marker that the calling and the called lines have in fact the same equipment location in the office and cannot be handled over the usual intraoffice trunk. The marker will therefore release its connection to the line-link frame determined by the called line location and its interconnection with the trunk-link frame leading to the previously selected intraoffice trunk and will exercise a route advance, releasing the previous route relay and operating a new route relay which will extend to the marker test leads from only those trunk-link frames which have special reverting ringing trunks thereon. Details of a route advance are set forth in the Busch application in connection with a change of route in selecting a busy tone trunk if required on an intraoffice trunk connection. The marker will thereafter proceed to select an idle one of these special trunks and to interconnect the calling line with that trunk. The marker will retain the calling line location information for the purposes of later making interconnection to the line-link frame whereon the subscribers' line terminates.

Relay RV(54) in operating places ground on conductor 5404 to battery through the winding of relays RAV1(54) and RAV2(54), relays RAV1(54) and RAV2(54) operating in this circuit.

Relay RAV2(54) in operating releases relay CKG4(25). The release of relay CKG4(25) releases relays LLC1(28), LLC2(28) and ONW(38). Relay ONW(38) in releasing completes an operating circuit for relay SQA(38) from ground on conductor 3800 in Fig. 38 over contact 8 of relay ONW (38) to battery through the winding of relay SQA(38). Relay SQA(38) in operating opens at its contact 3 the operating circuit for relay SQA1(38). Relay SQA1 is slow releasing and before the full release time of relay SQA1(38), relay SQA(38) will be released to retain relay SQA1(38) operated. The release of relay LLC1(28) releases relays LXP1(36) and CHE(24). Furthermore, the release of relay LLC1(28) releases the marker preference relay and the multicontact relays interconnecting the marker with the line-link frame upon which the registrations in the marker show the called line location to terminate. The release of relay LLC2(28) releases relay FCGA(34).

The operation of relay RAV1(54) releases relays HMC(36), TLC1(40) and TLC2(40). The release of relay TLC1(40) releases the interconnections between the marker circuit and the trunk-link frame 112 by releasing the trunk-link connector 114 with its multicontact relays and thereby releasing to normal the intraoffice trunk 113 in Fig. 1 along with the ringing selection switch. The release of relay TLC1(40) specifically releases such relays as MAK1(32), TBK(32), MDK(38), FAK(36) and FBK(36).

The operation of relay RAV1(54) also initiates the control operations whereby the marker is directed to select a special reverting ringing trunk such as the trunk disclosed in Figs. 11, 21 and 23 and terminating on a trunk-link frame such as 112 of Fig. 1.

The operation of relay RAV1(54) as above, completes a circuit for operating the route advance relay RA4(54) in a circuit from ground over the contact of relay RAV1(54), contact 2 of relay R2(54), contact 3 of relay GS4(54) to battery through the winding of relay RA4(54). Route advance relay RA4(54), in operating, completes a circuit for operating ground supply relay GS4(54) from ground over contact 8 of relay CKG3(29), over conductor 2901, contact 2 of relay RA4(54) to battery through the winding of relay GS4(54). Relay GS4(54) in operating releases relays NS1(32), TB0(54) and TG0(54).

The release of relay NS1(32) releases relays ITR2(25) and ITR3(42).

The release of relay ITR2(25) releases relay FLG(42). The release of relay FLG(42) releases relays LL1(50), VGL1(3), VGL2(3), HGL1(14) and VFL1(6). Relays VFL1(6), in releasing, releases relay VFT0(6) which in turn releases relay FTK1(16). Relay HGL1(14), in releasing, releases relay HGT0(5) which in turn releases relay HTK1(14). Relays VGL1(3) and VGL2(3), in releasing, release relay VGT0(2) which in turn releases relay VTK1(3).

Relay LL1(50), in releasing, causes the release of relays FTL(50), VGL(60), HGL(60), VFL(60), FUL(50), PTK(44) and RNG(51). Relay FTL(50), in releasing, causes the release of relay FTT0(17). Relay FUL(50), in releasing, causes the release of relay FUT0(18).

The release of relay RNG(51) causes ground to be placed upon conductors 4500 and 4503 of Fig. 45 to operate relays N4(46) and OAN(45), respectively. Relay N4(46), in operating, causes the operation of relay N4A(46) as previously described. With relays N4(46) and N4A(46) operated the originating register again, over cable 4600, etc., operates the thousands register relays TH0(45) and TH7(45), the hundreds number register relays HN1(55) and HN7(55), the tens register relays T2(55) and T7(55) and the units register relays U4(56) and U7(56) and relay N4A(46) causes the operation of relay NE(45). The start conductor 4502 to the number group and connector circuit, hereinbefore described in connection with the interconnection of the marker with the number group circuit for determining the line location of the called line, will not be energized since this path is open at contact 11 of the released relay SNG2(59).

Upon the previous release of relay FTK1(16), relays RV1(42) and RV2(42) release. Upon the release of relays RV1(42) and RV2(42), relay RV(54) remains operated over its own contact 3, conductor 5405 to ground, over contact 3 of relay CKG1(40).

At approximately this time, as determined by the operation of relay GS4(54) and the release of relay NS1(32) as previously described, relays RAV1(54) and RAV2(54) are released. The release of relay RAV2(54) causes the reoperation of relay CKG4(25). The release of relay RAV1(54) causes the operation of relays TLC1(40) and TLC2(40) by causing ground to be placed upon conductor 3908 in Fig. 39, through the winding of relay TLC1(40) and to battery through the winding of relay TLC2(40). Prior to the release of relay RAV1(54), relay RA4(54) was held operated over its contact 1 to ground over the contact 3 of relay RAV1(54), following the operation of relay GS4(54). Upon the release of relay RAV1(54), relay RA4(54) releases. Upon the release of relay RA4(54), relay GS4(54) is held operated over its contact 2 and ground previously traced over conductor 2901.

The release of relay RA4(54) initiates a route advance whereby the marker will be directed to test and select an idle one of the total number of special reverting ringing trunks terminating on trunk-link frames under the control of this particular marker. Upon the release of relay RA4(54) a circuit is completed from ground over contact 9 of relay CKG3(29), conductor 2902, contact 3 of relay RA4(54), contact 1 of relay GS4(54), contact 1 of relay R2(54), contact 2 of relay RV(54), contact 1 of relay S3(54) to battery through the windings of relay R1(54). The relay R1(54) may be considered as the route relay designating to the marker that the particular route desired is one to a reverting ringing trunk as compared to the route determined by the previously operated route relay R2(54) which indicated an intraoffice call. The relays RA5(54), GS5(54) and R1(54) are similarly situated as the previously described relays RA4(54), GS4(54) and R2(54).

Upon the operation of relay R1(54) a circuit is completed from ground over a contact of its companion relay GS5(54) and a contact of relay R1(54) similar to the contact 5 of relay R2(54) and over a conductor similar to conductor 4300 to a conductor 3202 in Fig. 32 to battery through the winding of relay NS0(32) to operate relay NS0(32). The latter is similar to the situation previously described whereunder relay R2(54) operated relay NS1(32). Likewise the operation of relay R1(54) will cause the operation of two relays similar to relays TG0(54) and TB0(54) previously described as operated under the control of the route relay R2(54). The relays TB– and TG– operated by route relay R1(54) will direct the marker to particular trunk groups and trunk-link frames whereon terminate the desired ringing reverting trunks.

The marker will proceed to test all of the leads coming from all of the trunk-link frames upon which reverting ringing trunks terminate and will proceed to select and test an idle one of such trunks in the same manner as in selecting other trunks such as the intraoffice trunk fully described in the above-identified Busch application.

In this particular instance the marker will effect interconnection between itself and a reverting ringing trunk such as disclosed in Figs. 11, 21 and 33 through the means of a trunk-link connector circuit, such as 114 in Fig. 1 and will connect to such trunk, and to trunk-link frame 112 upon which the trunk terminates, a ringing selection switch 115 with the proper ringing code set up thereon for the called party as determined by the registration of the ringing combination from the number group circuit. Upon the operation of relay NS0(32) a circuit is completed for operating relays SOG3(42) and SOG2(25) from battery through the winding of relay SOG3(42), conductor 4215 through cable 26—30 to Fig. 26, conductor 4215, through the winding of relay SOG2(25), conductor 2503 to the recycle controller circuit, back on conductor 2503 from the class of call circuit indicated in Fig. 32, contact 4 of relay NS0(32), contact 3 of relay LR(32), conductor 3201, contact 8 of relay TR2E(41), conductor 4103, conductor 4007, through cable 5100, etc. to ground in the originating register 105.

Upon the operation of relay SOG2(25) a circuit is completed for operating relay CB(26). Such circuit may be traced from ground over contact 1 of relay RV1(42), contact 2 of relay RV2(42), conductor 4216, through cable 26—30, conductor 4216, contact 8 of relay SOG2(25), conductor 2504, through cable 26—30, conductor 2504, conductor 4217, contact 3 of relay DIS2(41), conductor 4104, to battery through the winding of relay CB(26).

The operation of relay CB(26) completes circuits for operating the relays which initiate the call back operation. These relays are: Relays CB7(10), CB4(6), CB3(14), CB1(3), CB2(3), CBF(8), CBD1(8), CBD(8) and LOT(30). The circuit for relay CB2(3) may be traced from ground over contact 5 of relay CB(26), conductor 2604, through cable 13—27, conductor 2604, through the winding of relay CB2(3). The circuit for relay CB1(3) may be traced from ground over contact 6 of relay CB(26), conductor 2605, through cable 13—27, conductor 2605 to battery through the winding of relay CB1(3). The circuit for relay CB3(14) may be traced from ground over contact 7 of relay CB(26), conductor 2603, through cable 14—27, conductor 2603 to battery through the winding of relay CB3(14). The circuit for relays CBD(8) and CBDI(8) may be traced from ground over contact 8 of relay CB(26), conductor 2607, through cable 8—27, conductor 2607 in parallel to battery through the windings of relays CBD(8) and CBDI(8). The circuit for relay CBF(8) may be traced from ground over contact 9 of relay CB(26), conductor 2606, through cable 8—27, conductor 2606, to battery through the winding of relay CBF(8). The circuit for relay CB7(10) may be traced from ground over contact 10 of relay CB(26), conductor 2601 through cable 20—27, conductor 2601 to battery through the winding of relay CB7(10). The circuit for relay CB4(6) may be traced from ground over contact 11 of relay CB(26), conductor 2602 through cable 16—27, conductor 2602 to battery through the winding of relay CB4(6).

The operation of these so-called call back relays in the marker initiates the operations whereby the marker makes interconnection with the calling line through a line-link frame connector, such as 107 of Fig. 1, for the purpose of testing and selecting an idle channel through the cross bar switches between the calling subscriber and the selected idle reverting ringing trunk shown in Figs. 11, 21 and 33. This call back operation and the selecting and testing of an idle channel between the line-link and trunk-link frames is fully described in the above-identified Busch application.

In order to select an idle reverting ringing trunk, the marker, by means of frame test leads cross-connected from the trunk-link frames to each marker under the control of the aforementioned route relay R1(54), tests for a frame having thereon at least one idle such trunk. Such a lead for the reverting trunk shown in Figs. 11, 21 and 33, is conductor 1100. Trunk-link frames having at least one idle such trunk will be characterized to a marker by ground on such conductors 1100, which, for the trunk disclosed, extends from the upper middle armature of relay S1(11) and from the right middle contact of the make-busy switch MB(11), which is shown in its normal position, to the right lower contact of said switch MB(11) to conductor 1100 and thence to the marker circuit. The marker will test all such conductors 1100 for all trunk-link frames having reverting trunks terminating thereon and will select a trunk-link frame having a grounded conductor such as 1100, say trunk-link frame 112 of Fig. 1. The marker will connect to trunk-link frame 112 over trunk-link frame connector 114 and will lock out other markers from seizing trunk-link frame 112.

The marker then initiates the selection of an idle trunk, such as the one shown in Figs. 11, 21 and 33, by placing ground on the leads, such as 1101, of each reverting trunk on trunk-link frame 112. Those trunks, such as that shown in Figs. 10, 21 and 33 which are idle, will extend this ground on the lead such as 1101 over the lower left two contacts of the make-busy switch MB(11), over contact 5 of relay S1(11), and through the winding of relay F(11) to conductor 1102 extending to the marker circuit over the trunk-link frame 112 and connector circuit 114. For those trunks which may be busy at the time the latter circuit will be opened at contact 5 of the associated operated relay S1(11) such that there will be no ground potential extended to the associated conductor 1102 as above traced. The marker recognizes, by the ground potential on such conductors as 1102, which of the available reverting trunks on frame 112 are idle and proceeds to select one such idle trunk by increasing the current flow over conductor 1102, thereby operating relay F(11), the relays F of other idle trunks remaining unoperated.

Relay F(11), upon operating, locks to ground on conductor 1101 over its contact 4, and, at its contact 3, grounds conductor 1103. Ground on conductor 1103 is extended to the trunk-link circuit causing that circuit, in conjunction with the marker, to perform the functions necessary to connect the trunk with the subscriber's line. The sleeve conductor 1104 is extended to the marker circuit where it is tested for trouble indicating grounds; relay S1(11) is operated in a circuit extending from ground in the marker circuit over conductor 1105, contact 2 of relay F(11), through the winding of relay S1(11) and resistance E(11) to battery and ground. Relay S1(11), upon operating, connects, at its contact 4, ground through resistance A(11) to the sleeve conductor 1104 to hold the hold magnets operated on the line, line-junctor, trunk-junctor, and trunk switches (previously operated by the marker) when the marker subsequently disconnects. Relay S1(11), upon operating, also removes at its contact 2 the ground on conductor 1100 such that when all such trunks on trunk-link frame 112 are busy there will be no ground on conductor 1100. Relay S1(11), upon operating, opens at its contact 5 the operating circuit for relay F(11), which relay, however, remains operated over its locking circuit, previously traced.

The marker also operates, as has been described, the select magnets of the ringing switch 115, associated with the trunk circuit disclosed, to select the proper ringing condition for the called line. After such select magnets have been operated, the marker operates relay RC(11) by placing ground on conductor 1106 which extends over contact 1 of relay F(11) to battery through the winding of relay RC(11). Relay RC(11), upon operating, operates the associated hold magnet on the ringing switch 115 in a circuit extending from ground over contact 1 of relay S1(11), contact 1 of relay RC(11), over conductor 1107 to the hold magnet (not shown). Relay RC(11) locks in a circuit extending from ground over contact 1 of relay S1(11), conductor 1108, over crosspoints of the ringing selection switch 115, back over conductor 1109, contact of relay RT(21), conductor 2100, over contact 6 of relay RC(11) to battery through the winding of relay RC(11).

When the marker has completed its functions for this terminating connection of the call, it releases the relay F(11) by reducing the current permitted to flow over conductor 1102. Relay F(11), upon releasing, opens at its contact 2 the operating circuit for relay S1(11), which, however, is slow-releasing. The release of relay F(11) removes at its contact 1 the operating ground for relay RC(11), which, however, is locked under the control of relays S1(11) and RT(21) as previously described. At its contact 3, relay F(11), upon releasing, removes ground from conductor 1103. The removal of ground from conductor 1103 causes the calling line to be extended by the marker to the trunk circuit, the tip, ring and sleeve conductors, 1110, 1111 and 1104, respectively, being extended to the subscriber's line over the cross bar switches. The marker thereupon releases to normal leaving the call under the supervision of the trunk circuit.

Assuming that the call has not been abandoned when the subscribers' line is extended to the trunk, relay L(11) will be operated by a circuit extending from ground, through the upper left section of repeat coil TN(21), over contact 1 of relay RS(21), conductor 2101, contact 5 of relay RC(11), tip conductor 1110, over the subscriber's line loop via the line-link and trunk-link frames 103 and 112, back over conductor 1111, contact 8 of relay RC(11), conductor 1112, contact 5 of relay RS(21), the lower left section of repeat coil TN(21), conductor 2102, contact 2 of jack L(11), through the bottom winding of the relay L(11), to battery over contact 1 of jack L(11). With the latter circuit completed, as traced, and with the top winding of relay L(11) energized in a circuit from ground over contact 3 of relay RC(11) to battery through the top winding of relay L(11) and resistance C(11), relay L(11) operates.

Relay L(11), upon operating, completes circuits for operating relays LA(11) and SR(11) extending from ground over contact 3 of relay RC(11), contact 2 of relay L(11), through the winding of relay LA(11) to battery through resistance D(11) and through the winding of relay SR(11) to battery. Relay SR(11), upon operating, provides a locking circuit for relay S1(11) before that relay releases as a result of having its operating circuit opened by the release of relay F(11), as above described. The latter locking circuit extends from ground over contact 2 of relay SR(11) to battery through the winding of relay S1(11) and resistance E(11). If the call had been abandoned prior to the extension of the subscriber's line to the trunk, relays L(11), LA(11) and SR(11) would not have operated, thus permitting relay S1(11) to release to effect the release of the connection and the restoration of the trunk circuit to normal, along with all of the hold magnets controlled by the resistance ground provided over contact 4 of relay S1(11).

The operation of relay SR(11) starts the heating element of relay RL(11) operating in a circuit extending from ground over contact 1 of relay SR(11), to battery through the heating element of thermal relay RL(11). The contacts of relay RL(11) will close within a predetermined duration of time after the operation of relay SR(11) if the calling station digit has not been dialed and if the calling party has not hung up in response to the busy tone within that time, as will be explained. If relay RL(11) should be permitted sufficient time to close its contacts, the right side of the winding of relay S1(11) would be grounded over the contacts of relay RL(11) and over either contact 1 of relay LA(11) or contact 1 of relay RA(11), to ground over contact 1 of relay SR(11). Ground on the right side of the winding of relay SI(11) would obviously shunt said winding to release relay SI(11) to thereby release the connection. It will be assumed that the calling subscriber dials his station digit and hangs up in response to the busy tone before relay RL(11) closes its contacts.

Upon the operation of relay RC(11) and after the extension of the subscriber's line to the trunk circuit, a high level continuous tone signal is transmitted over contact 10 of relay RC(11), contact 7 of relay DC(11), conductor 1113, through condenser A(21), to ground through the right section of repeat coil TN(21). This tone is transmitted to the left-hand sections of repeat coil TN(21) and thence over contacts 1 and 5 of relay RS(21), conductors 2101 and 1112, contacts 5 and 8 of relay RC(11), conductors 1110 and 1111, over the cross bar switches on the trunk-line and line-link frames, and over the subscriber's loop to inform the calling subscriber to dial his station digit. The numbers which may be assigned to the stations may be as follows:

| Ringing for Calling Station | | | Station digit |
|---|---|---|---|
| Polarity | Side of Line | Rings | |
| − | R | 1 | 2 |
| − | T | 1 | 3 |
| + | R | 1 | 4 |
| + | T | 1 | 5 |
| − | R | 2 | 6 |
| − | T | 2 | 7 |
| + | R | 2 | 8 |
| + | T | 2 | 9 |

The above station digits therefore indicate that the trunk circuit can handle four parties on a fully selective basis (fully selective single ring) or eight parties on a semiselective basis (two rings required on some stations and one on others). Upon the dialing by the calling subscriber of the associated station digits 2 through 9, relay L(11) will release each time the subscriber's loop is opened and will reoperate each time the loop is reclosed. Each time relay L(11) releases and reoperates, the operating circuits for relays LA(11) and SR(11) are opened and reclosed. The relay LA(11) will release and reoperate with relay L(11); but, relay SR(11), being a slow-releasing relay, does not release between pulses of a digit. The first time relay LA(11) releases, relay RA(11) is operated in a circuit extending from ground over contact 1 of relay SR(11), contact 2 of relay LA(11), contact 1 of relay DC(11), to battery through the lower winding of relay RA(11). Relay RA(11), being a slow-releasing relay, remains operated during the dialing of the pulses of the station digit but releases shortly after the reoperation of relay LA(11) following the last open-loop pulse, as will be described.

Upon the first release of relay L(11) in response to the first open-loop pulse, relay LC(21) is operated in a circuit extending from ground, over contact 3 of relay RC(11), contact 1 of relay L(11), contact 2 of relay DC(11), contact 3 of relay SR(11), conductor 1114, contact 2 of relay LE(33), conductor 3300, to battery through the winding of relay LC(21). Relay LE(33) cannot operate because the left side of its winding is grounded by conductor 1114 in the above circuit and the right side of its winding is grounded in a circuit extending from ground, over contact 3 of relay RC(11), conductor 1115, contact 1 of relay LC(21), conductor 2103, contact 1 of relay LD(33) to the right side of the winding of relay LE(33).

Upon the first reoperation of relay L(11) at the end of the first pulse, the shunting ground is removed from the left side of the winding of relay LE(33) permitting relay LE(33) to operate in series with relay LC(21). Relay LE(33), upon operating, operates relay P(21) in a circuit extending from ground, over contact 2 of relay RC(11), conductor 1116, contact 4 of relay LE(33), conductor 3301, contact 2 of relay P(21), to battery through the winding of relay P(21). Relay P(21) operates in the latter circuit and locks to ground on conductor 1116 over its contact 3.

Upon the second release of relay L(11), relay LD(33) operates in series with a holding winding of relay LE(33) in a circuit extending from ground, over contact 3 of relay RC(11), contact 1 of relay L(11), contact 2 of relay DC(11), contact 3 of relay SR(11), conductor 1114, contact 1 of relay LE(33), through the lower winding of relay LE(33), to battery through the upper winding of relay LD(33). Relay LD(33), upon operating, opens at its contact the holding circuit through the upper winding of relay LE(33) and the winding of relay LC(21) releasing the latter relay, relay LE(33) remaining operated through its lower winding as previously traced.

Upon the second reoperation of relay L(11) at the end of the second open-loop pulse, the operating circuit for relay LD(33) and the holding circuit for relay LE(33), as above traced, is opened at contact 1 of relay L(11). Relays LE(33) and LD(33) release. The release of relay LE(33) causes the operation of relay P23(33) in a circuit extending from ground on conductor 1116, contact 3 of relay LE(33), conductor 3302, contact 6 of relay P(21), conductor 2104, contact 3 of relay P34(33), to battery through the upper winding of relay P23(33) and resistance F(33). Relay P23(33) operates and locks in a circuit extending from ground on conductor 1116, conductor 3303, contact 7 of relay P23(33), contact 6 of relay P34(33), to battery through the lower winding of relay P23(33) and resistance F(33). Relay P23(33), upon operating, operates relay A23(33) in an obvious circuit over contact 2 of relay P23(33) and operates relay P25(33) in a circuit extending from ground on conductor 1116, conductor 3303, contact 5 of relay P23(33), contact 4 of relay P47(33), to battery through the lower winding of relay P25(33) and resistance G(33). Relay P25(33), upon operating, causes the operation of relay P29(33) in a circuit extending from ground on conductor 1116, conductor 3303, contact 5 of relay P25(33), contact 7 of relay P60(33), to battery through the lower winding of relay P29(33). Relay P29(33) locks to ground on conductors 1116 and 3303 over contact 1 of relay P29(33) and contact 5 of relay P60(33) to battery through the upper winding of relay P29(33).

Upon the third release of relay L(11) during the third open-loop pulse, relay LC(21) is reoperated in the circuit previously traced for the operation of relay LC(21) during the first release of relay L(11).

Upon the third reoperation of relay L(11) at the end of the third open-loop pulse, relay LE(33) reoperates in series with relay LC(21) as previously described for the first reoperation of relay L(11). Relay LE(33), in operating, causes the operation of relay P34(33) in a circuit extending from ground on conductor 1116, contact 4 of relay LE(33), conductor 3304, in parallel over contact 6 of relay P29(33) and contact 1 of relay P60(33), contact 1 of relay P23(33), to battery through the lower winding of relay P34(33). Relay P34(33), in operating, transfers the locking circuit for relay P23(33) from contact 6 of relay P34(33) to the operating ground for relay P34(33) over contact 5 of relay P34(33) and locks itself in a circuit extending from ground on conductors 1116 and 3303, contact 3 of relay P23(33), contact 4 of relay P34(33), to battery through the upper winding of relay P34(33). Relay P34(33), in operating, also operates relay A34(33) in an obvious circuit over contact 7 of relay P34(33).

Upon the fourth release of relay L(11) during the fourth openloop pulse, relay LD(33) operates in series with the lower winding of relay LE(33) and relay LC(21) is released as above described for the second release of relay L(11).

Upon the fourth reoperation of relay L(11) at the end of the fourth open-loop pulse, relays LE(33) and LD(33) release as described above for the second reoperation of relay L(11). This third release of relay LE(33) causes the release of relay P23(33) by opening the locking circuit for that relay at contact 4 of relay LE(33). The release of relay P23(33) releases relay A23(33). Relay P34(33) remains locked in a circuit extending from ground on conductor 1116, contact 3 of relay LE(33), conductor 3302, contact 6 of relay P(21), conductor 2104, contact 4 of relay P23(33), contact 4 of relay P34(33), to battery through the upper winding of relay P34(33). Relay P23(33), in releasing, operates relay P47(33) in a circuit extending from ground on conductor 1116, conductor 3303, contact 6 of relay P23(33), contact 7 of relay P25(33), to battery through the lower winding of relay P47(33). Relay P47(33) locks in a circuit from ground on conductors 1116 and 3303, over contact 3 of relay P25(33), contact 3 of relay P47(33), to battery through the upper winding of relay P47(33) and switches at contact 1 of relay P47(33), the locking circuit for relay P25(33) through its upper winding to the operating ground on the right side of the lower winding of relay P47(33).

Upon the fifth release of relay L(11) during the fifth open-loop pulse, relay LC(21) reoperates as described for the first and third releases of relay L(11).

Upon the fifth reoperation of relay L(11) at the end of the fifth open-loop pulse, relay LE(33) reoperates in series with relay LC(21) as previously described for the first and third reoperations of relay L(11). Relay LE(33), upon operating, releases relay P34(33) by opening at contact 3 of relay LE(33) the locking circuit for relay P34(33). Relay P34(33), in releasing, releases relay A34(33).

Upon the sixth release of relay L(11) during the sixth open-loop pulse, relay LD(33) operates in series with the lower locking winding of relay LE(33) and relay LC(21) is released as described above for the second and fourth releases of relay L(11).

Upon the sixth reoperation of relay L(11) at the end of the sixth open-loop pulse, relays LD(33) and LE(33) release as above described for the second and fourth reoperations of relay L(11). The release of relay LE(33) operates relay P23(33) as described above, for the second reoperation of relay L(11), and relay P23(33) operates relay A23(33) as before. The operation of relay P23(33) opens, at its contact 6, the locking circuit for relay P25(33) which releases. Relay P47(33) remains locked in a circuit extending from ground on conductors 1116 and 3303, contact 5 of relay P23(33), contact 4 of relay P25(33), contact 3 of relay P47(33), to battery through the upper winding of relay P47(33). Relay P29(33) remains locked in a circuit extending from ground on conductors 1116 and 3303, contact 1 of relay P29(33), contact 5 of relay P60(33), to battery through the upper winding of relay P29(33). The release of relay P25(33) operates relay P60(33) in a circuit extending from ground on conductors 1116 and 3303, contact 6 of relay P25(33), contact 2 of relay P29(33), to battery through the upper winding of relay P60(33). Relay P60(33) operates and locks through its lower winding, its own contact 6 and over contact 3 of relay P29(33) to ground on conductors 1116 and 3303. The locking circuit for relay P29(33) is switched from contact 5 of relay P60(33) to the same locking ground as for relay P60(33) over contact 4 of relay P60(33).

Upon the seventh release of relay L(11), during the seventh open-loop pulse, relay LC(21) operates as described for the first, third and fifth releases of relay L(11).

Upon the seventh reoperation of relay L(11), at the end of the seventh open-loop pulse, relay LE(33) operates in series with relay LC(21) as previously described for the first, third and fifth reoperations of relay L(11). Relay LE(33), in operating, causes the operation of relay P34(33), in circuit extending from ground on conductor 1116, contact 4 of relay LE(33), conductor 3304, contact 6 of relay P29(33), contact 1 of relay P23(33), to battery through the lower winding of relay P34(33). Relay P34(33) locks through its upper winding, its contact 4, contact 3 of relay P23(33) to ground on conductors 3303 and 1116, transfers the locking circuit for the lower winding of relay P23(33) to the operating ground for relay P34(33) over contact 5 of relay P34(33), and operates relay A34(33) in an obvious circuit.

Upon the eighth release of relay L(11), during the eighth open-loop pulse, relays LD(33) and LE(33) are operated in series and relay LC(21) is released as described for the second and fourth releases of relay L(11).

Upon the eighth reoperation of relay L(11), at the end of the eighth open-loop pulse, relays LD(33) and LE(33) release as described for the second and fourth reoperations of relay L(11). The release of relay LE(33) releases relay P23(33) which in turn releases relay A23(33). Relay P34(33) remains locked in a circuit extending from ground on conductor 1116, contact 3 of relay LE(33), conductor 3302, contact 6 of relay P(21), conductor 2104, contact 4 of relay P23(33), contact 4 of relay P34(33), to battery through the upper winding of relay P34(33). The release of relay P23(33) also opens at its contact 5 the locking circuit for relay P47(33) which thereupon releases. Relays P29(33) and P60(33) remain locked as above-described.

Upon the ninth release of relay L(11), during the ninth open-loop pulse, relay LC(21) reoperates as described above for the first, third, fifth and seventh releases of relay L(11).

Upon the ninth reoperation of relay L(11), at the end of the ninth open-circuit pulse, relay LE(33) operates in series with relay LC(21) as above-described for the first, third, fifth and seventh reoperations of relay L(11). The operation of relay LE(33) releases relay P34(33) by opening its locking circuit at contact 3 of relay LE(33). Relay P34(33), upon releasing, releases relay A34(33). Relays P29(33) and P60(33) remain locked.

Upon the tenth release of relay L(11) during the tenth open-loop pulse, relays LE(33) and LD(33) are operated in series and relay LC(21) is released as described for the second, fourth and eighth releases of relay L(11).

Upon the tenth reoperation of relay L(11), at the end of the tenth open-loop pulse, relays LD(33) and LE(33) release as for the second, fourth and eighth reoperations of relay L(11). The release of relay LE(33) reoperates relay P23(33) as for the second reoperation of relay L(11). Relay P23(33) operates and locks, as above-described, and operates relay A23(33) as above. The operation of relay P23(33) reoperates relay P25(33) in a circuit extending from ground on conductors 1116 and 3303, contact 5 of relay P23(33), contact 4 of relay P47(33), to battery through the lower winding of relay P25(33). Relay P25(33), in operating, opens at its contact 6, the locking circuit for relay P29(33). Relay P29(33) releases, leaving relay P60(33) locked in a circuit extending from ground on conductors 1116 and 3303, contact 5 of relay P25(33), contact 4 of relay P29(33), contact 6 of relay P60(33), to battery through the lower winding of relay P60(33).

The following table will illustrate the status of the relays just described at the ends of the various open-loop pulses representing pulses of the calling subscriber's station digit for the various possible digits.

| Digit Dialed | Relays Operated | | | | | | | | | | |
|---|---|---|---|---|---|---|---|---|---|---|---|
| | LC | LE | P | P23 | A23 | P25 | P29 | P34 | A34 | P47 | P60 |
| 1 | √ | √ | √ | | | | | | | | |
| 2 | | | √ | | | √ | √ | | | | |
| 3 | √ | √ | √ | √ | √ | √ | √ | √ | √ | | |
| 4 | | | √ | | | √ | √ | √ | √ | | |
| 5 | √ | √ | √ | | | √ | √ | √ | √ | √ | |
| 6 | | | √ | √ | √ | √ | √ | √ | √ | √ | |
| 7 | √ | √ | √ | √ | √ | √ | √ | √ | √ | √ | √ |
| 8 | | | √ | | | √ | √ | √ | √ | √ | √ |
| 9 | √ | √ | √ | | | √ | √ | √ | √ | √ | √ |
| 0 | | | √ | √ | √ | √ | | | | | √ |

On a party line having eight subscriber stations the calling station digits 1 and 0 would not be used and digits 2 through 9 would designate each of the eight stations. If the calling subscriber hangs up his receiver without dialing a station digit, or dials in error either a 1 or a 0 then hangs up, the connection will be released, restoring the trunk circuit to normal. It will be assumed that the calling party is identified by the station digit of 8 which, according to the former table above, indicates that the ringing required for that calling party is of positive bias superimposed on the ringing applied to the ring conductor for two rings. Under this assumption, in accordance with the latter table above, at the end of the dialing of the calling station digit by the calling station the following relays will be operated: L(11), LA(11), P(21), P29(33), P34(33), A34(33) and P60(33). Of course the relays RC(11), SI(11) and SR(11) will also be operated, having been unaffected by the calling station digit dialing. Due to the sustained operation of relay LA(11) following the last pulse of the calling station digit, slow-releasing relay RA(11) will release. The release of relay RA(11) operates relay DC(11) in a circuit extending from ground, over contact 3 of relay RC(11), conductor 1115, contact 1 of relay P(21), conductor 2105, contact 2 of relay RA(11), to battery through the winding of relay DC(11). Relay DC(11) operates and locks to ground over contact 4 of relay DC(11), and contact 3 of relay RC(11). Relay DC(11) completes a circuit from ground over contact 7 of relay RC(11) and contact 5 of relay DC(11) to conductor 1117 which insures the operation of an interrupter circuit (not shown). The interrupter circuit (not shown) supplies line-busy tone over conductor 1118, over contact 6 of relay DC(11), conductor 1113, through condenser A(21) and through repeat coil TN(21) to the subscriber's line. This busy tone replaces the continuous high tone (which informed the calling station that the trunk was ready to receive and register the calling station digit) which up until relay DC(11) was operated and had been transmitted over conductor 1113 by means of contact 10 of relay RC(11) and contact 7 of relay DC(11). The calling subscriber should hang up in response to this busy tone to initiate the ringing on the line by the trunk.

In the meantime, assuming that the called station is represented by a calling station digit 5, thus requiring a ringing condition of positive bias superimposed on the ringing over the tip conductor for one ring (see former table), the marker, prior to its release, would have set the ringing selection switch for a one-ring station of either polarity of bias as has been described previously and as a consequence conductor 1119 will have been grounded, thus operating relay RI(21) from the ground on conductor 1119 to battery through the winding of relay RI(21). The relay RI(21), when released, is arranged normally to connect, over its contact 5, two-ring (code 2) ground on conductor 3305 from the power ringing circuit (not shown) indicated in Fig. 33. When operated, relay RI(21), connects over its contact 4, the one-ring (code 1) ground on conductor 3306 instead of the code 2 ground. Likewise, at its contact 2 relay RI(21) connects to the code 1 ring generator which produced negatively biased alternating current ringing potential through resistance M(21) and over conductor 2106 from the ringing supply (not shown) and disconnects, at its contact 1, from the code 2 ring generator connected to conductor 2114 and resistance N(21) which produces negatively biased ringing potential. These transfers are in preparation for controlling the called station ringing, which, as above, has been assumed as positively biased ringing on the tip conductor for one ring (code 1). If the called station required two rings (code 2), relay RI(21) would not have been operated.

If the called station requires negative superimposed ringing, as is not the assumed condition, the same negative code 1 ringing potential is provided over conductor 1120 from the ringing selection switch as is supplied over contact 2 of relay R1(21). One of these ringing supply sources is traced over conductor 1120 to one side of the lower winding of relay RPD(21); the other is traced over conductor 2106 through resistance M(21), over contact 2 of relay R1(21), conductor 2107, contact 5 of relay F(11), conductor 1121, contact 3 of relay RPD(21) to the other side of the lower winding of relay RPD(21). Therefore, under these conditions, relay RPD(21) does not operate since it has at all times the same potential on both sides of its lower winding.

If, on the other hand, the called station had required positive superimposed ringing, as has been assumed, then positively biased ringing potential is provided over conductor 1120 to thereby operate relay RPD(21) through its lower winding due to the difference of potential of the positive bias on conductor 1120 from the ringing selection switch and the negative bias from the code 1 generator. Relay RPD(21), upon operating, locks in a circuit extending from ground, over contact 3 of relay S1(11), conductor 1122, contact 1 of relay RPD(21), to battery through the upper winding of relay RPD(21). At its contact 3, relay RPD(21) opens its operating circuit, above-traced.

Since the called station is a tip station, as assumed, relay RVD(21) will be operated in a circuit extending from ringing ground at the ringing selection switch, over conductor 1123, to battery through the winding of relay RVD(21). Furthermore, when the called station requires positive superimposed ringing, as assumed, relay RP(21) is operated in a circuit extending from ground, over contact 3 of relay A23(33), conductor 3309, contact 4 or relay RPD(21), to battery through the winding of relay RP(21), which thereupon operates.

When the calling subscriber hangs up, in response to the aforementioned busy tone transmitted to such subscriber, the line loop is opened and relay L(11) releases. Relay L(11), in releasing, releases relay LA(11) and permits relay SR(11) to start releasing. When relay SR(11) releases, the aforementioned circuit for the heating element of relay RL(11) is opened at contact 1 of relay SR(11), to prevent the shunting down of relay S1(11) if relay RL(11) should have operated its contacts, and the holding circuit for relay S1(11) is opened at contact 2 of relay SR(11). Relay S1(11) is a slow-releasing relay and, as will be seen presently, another holding ground is provided to prevent the release of relay S1(11). Relay SR(11), in releasing, operates relay RS(21) in a circuit extending from ground, over contact 3 of relay RC(11), contact 1 of relay L(11), contact 3 of relay DC(11), contact 4 of relay SR(11), conductor 1125, contact 7 of relay P29(33), conductor 3310, to battery through the winding of relay RS(21). Relay RS(21), upon operating, provides a locking circuit for relay S1(11) so that the latter relay will not release. Such circuit may be traced from ground, over contact 6 of relay RS(21) and conductor 2108, to battery through the winding of relay S1(11) and resistance E(11).

Upon the operation of relay RS(21), the tip conductor 2101 and the ring conductor 1112 are transferred at contacts 2 and 4 respectively of relay RS(21) to the respective upper outer and upper inner armatures of relay RV(21) partially completing the necessary ringing ground and ringing signal connections, to be described presently, for ringing the called party and for notifying the calling party of that fact and of the fact of the called party's answer.

At this juncture in the description it is well to assume that nothing further happens until certain timing operations are described per se without reference to the operation of the circuit of the whole trunk as such and to fully acquaint oneself with such timing operations. These operations control the actual ringing on one or both sides of the subscriber's line and relate to the functions of relays PU(11), R(21), G(21), RV(21), and RT(21) and to the peculiarities of the various coded grounds and generator outputs, previously mentioned. The following table will be referred to in order to clearly describe the above-timed relay operations, said table illustrating the timing of the indicated events:

| Name of Source | Conductor Reference | 0 | 1 | 2 | 3 | 4 | 5 | 06 | 1 | 2 | 3 | 4 | 5 | 06 |
|---|---|---|---|---|---|---|---|---|---|---|---|---|---|---|
| Code 1 Gnd | 3306 | — | — | | | | | — | — | — | | | | |
| Code 1 Gen | 2106 | — | — | | | | | — | — | — | | | | |
| Code 2 Gnd | 3305 | — | — | — | | | | | | — | — | | | |
| Code 2 Gen | 2114 | — | — | — | | | | | | — | — | | | |
| Code A Gnd | 3307 | | | — | — | | | | | | — | — | | |
| Code B Gnd | 3313 | | | | | — | — | | | | | | — | — |
| Code C Gnd | 3311 | | | | | | | | | | | | | |
| Pick-up Gnd | 2109 | | | | | | | — | | | | | | — |
| Ringing Gnd | 2112 | — | — | — | — | — | — | | — | — | — | — | — | |

The above table may be described as follows: starting at a reference point, indicated as 0, the horizontal direction is divided into two complete ringing cycles containing six one-second intervals each; code 1 ground, which is provided over conductor 3306 in Fig. 33, produces ground on conductor 3306 from 0 to 2 seconds; code 1 generator, which is provided over conductor 2106 in Fig. 21, produces negatively biased ringing voltage on conductor 2106 from 0 to 2 seconds; code 2 ground, which is provided over conductor 3305 in Fig. 33, produces ground on conductor 3305 from 0 to 1 second and from 1½ to 2½ seconds; code 2 generator, which is provided over conductor 2114 in Fig. 21, produces negatively biased ringing voltage over conductor 2114 from 0 to 1 second and from 1½ to 2½ seconds; code A ground, which is provided over conductor 3307 in Fig. 33, produces ground on conductor 3307 from 2¾ to 5¾ seconds; code B ground, which is provided over conductor 3313 in Fig. 33, produces ground on conductor 3313 from 3 to 5 seconds; code C ground, which is provided over conductor 3311 in Fig. 33, produces ground on conductor 3311 from 3 to 4 seconds and from 4½ to 5½ seconds; pick-up ground, which is provided over conductor 2109 in Fig. 21, produces ground on conductor 2109 from a little past 5½ seconds to 5¾ seconds; and ringing ground, which is supplied over conductor 2112 in Fig. 21, produces continuous ground on conductor 2112.

As will be apparent from the above table and brief description, the cycle is repeated every six seconds. It is therefore necessary to ring both parties within one cycle. If the calling and called stations are on the same side of the line, say the tip side, it will be necessary to ring only the called party because the calling party will hear such ring. If, however, as has been assumed, the parties are on opposite sides of the line, it will be necessary to ring both parties so that the calling subscriber will know when the answering called party trips the ringing.

It has been assumed that the particular subscriber's line under consideration may contain a maximum of eight stations, thus requiring the supplying of two codes of ringing (code 1 and code 2 generators) to provide an eight-party, semiselective ringing situation. The trunk is capable of functioning for a four-party, fully selective situation, requiring only one code of ringing (code 1 generator). When the trunk circuit is used with a four-party, fully selective party line situation the following changes are required: conductor 2114 in Fig. 21 is opened to disconnect code 2 generator from the circuit; conductor 3311 in Fig. 33 is open to disconnect code C ground from the circuit; conductor 3305 in Fig. 33 is opened to disconnect code 2 ground from the circuit; and, the section "X" of conductor in Fig. 33, normally connecting the lowermost armature of relay P29(33) to conductor 3310, is removed.

As will be apparent presently, the period of time from 0 to 2½ seconds each cycle is consumed by the ringing of the called subscriber and the period of time from 3 to 5½ seconds each cycle is used for the ringing of the calling subscriber, if necessary, as in the case where the two subscribers are on opposite sides of the line.

The first time pick-up ground is provided over conductor 2109 after the operation of relay RS(21), as above-described, relay PU(11) is operated from such ground over conductor 2109, through resistance lamp PU(21), over contact 3 of relay RS(21), conductor 2110, contact 3 of relay PU(11), contact 11 of relay RC(11), to battery through the winding of relay PU(11). Relay PU(11) locks over contact 11 of relay RC(11), its own contact 2 (which closes before its contact 3 opens), to ground over contact 1 of relay SI(11). The only relay which can have been operated at the time relay PU(11) operates and locks is relay G(21), as will be apparent from the latter table. Such a circuit for relay G(21) extends from code A ground, over conductor 3307, contact 9 of relay DC(11), conductor 1124, contact 7 of relay A23(33), contact 3 of relay A34(33), conductor 3308, contact 2 of relay RVD(21), to battery through the winding of relay G(21). Code A ground, as per the latter table above, is removed at 5¾ seconds, however, to release relay G(21). It is therefore proper to assume conditions at the beginning of a ringing cycle (at 0 or 6 seconds) with relay PU(11) operated and relay G(21) released. When relay G(21) is released, relay RV(21) is operated in a circuit extending from ground, over contact 4 of relay RVD(21) and contact 1 of relay G(21), to battery through the winding of relay RV(21). As will be apparent, relay RV(21) is operated whenever relay G(21) is released and relay RV(21) is released whenever relay G(21) is operated. It will be seen from the latter table above that the operation of relay RV(21) coincides for all practical purposes with the part of the ringing cycle used for ringing the called party and the release of relay RV(21) coincides likewise with the part of the ringing cycle used for ringing the calling party.

At the begining of the ringing cycle under consideration, relay RV(21) is operated as above. Ringing ground is provided over conductor 2112, contact 4 of relay RV(21), contact 4 of relay RV(21), contact 4 of relay RS(21), conductor 1112, contact 8 of relay RC(11), to the ring conductor 1111 to the ring side of the subscriber's line over the trunk link frame 112 and the line link frame 103. Ringing trip battery is supplied over contact 5 of relay P(21), contacts 8 and 2 of relay RP(21), contacts 4 and 1 of relay R(21), through the winding of relay RT(21), contact 2 of relay RV(21), contact 2 of relay RS(21), conductor 2101, contact 5 of relay RC(11), and to the tip conductor 1110 to the tip side of the subscriber's line over the trunk link frame 112 and the line link frame 103. The ringing trip battery is ineffective to operate relay RT(21) because the subscribers' direct current line-loop paths are open at this time. However, ringing ground has been supplied to the ring side of the line in preparation for ringing the called tip station.

At the 0 second reference time, code 1 ground operates relay R(21) until the end of two seconds at which time relay R(21) releases. The operating circuit for relay R(21) extends from code 1 ground, over conductor 3306, contact 4 of relay RI(21), contact 6 of relay G(21), conductor 2111, contact 1 of relay PU(21), conductor 1126, to battery through the winding of relay R(21). Relay R(21), in operating, completes a circuit for extending to the tip side of the line positive superimposed ringing, as has been assumed is required to call the called party. Such circuit extends from the positive superimposed ringing supply on conductor 2113 over contact 4 of relay P(21), contacts 7 and 5 of relay RP(21), contacts 3 and 2 of relay R(21), through the winding of relay RT(21), contact 2 of relay RV(21), contact 2 of relay RS(21), conductor 2101, contact 5 of relay RC(11), over tip conductor 1110, over the tip side of the subscriber's line back to the previously traced ringing ground on the ring side. This alternating current ringing will not operate relay RT(21). The line loop, although being open to direct current, will permit the alternating current ringing to actuate the bell, or other signal thereat by means of capacity bridging across the tip and ring sides of the line circuit at each station. The parties whose station calls require ringing on the tip side will hear the ringing but since there will be only one ring the party whose call requires two rings will not answer.

At the end of the two-second interval when one ring was supplied over the tip side of the line, code 1 ground is removed from conductor 3306 to release relay R(21). The release of relay R(21) removes the ringing supplied to the tip conductor and substitutes therefor the previously described ringing trip battery. At the 2¾-second timing point, code A ground is supplied over conductor 3307, contact 9 of relay DC(11), conductor 1124, contact 7 of relay A23(33), contact 3 of relay A34(33), conductor 3308, contact 2 of relay RVD(21), to battery through the winding of relay G(21) which thereupon operates, releasing relay RV(21), and remains operated until code A ground is removed from conductor 3307 at the 5¾-second timing point.

Shortly after the 2¾-second point, namely, the 3-second point as disclosed, code C ground is applied over conductor 3311, contact 8 of relay P60(33), conductor 3312, contact 5 of relay G(21), conductor 2111, contact 1 of relay PU(11), conductor 1126, to battery through the winding of relay R(21) which thereupon operates and remains operated until the 4-second point. Relay R(21), in operating, supplies the previously traced positive superimposed ringing signal through the winding of relay RT(21), over contact 3 of relay RV(21), contact 4 of relay RS(21), conductor 1112, contact 8 of relay RC(11), ring conductor 1111, over the alternating current line-loop, back over tip conductor 1110, contact 5 of relay RC(11), conductor 2101, contact 2 of relay RS(21), contact 1 of relay RV(21), to ringing ground on conductor 2112. At the 4-second point, code C ground is removed from conductor 3311 to release relay R(21). At the 4½-second point code C ground is reapplied to conductor 3311 to reoperate relay R(21) as above. At the 5½-second point code C ground is removed from conductor 3311 to release relay R(21). Thus code 2 ringing has been applied to the ring side of the line as was the assumed requirement for ringing the calling party.

At the 5¾-second point, code A ground is removed from conductor 3307 to release relay G(21), which relay upon releasing, reoperates relay RV(21).

The above cycle is repeated until the called party picks up his receiver in answer of the call. When the called party picks up his receiver he closes the direct current line loop at his substation thereby permitting relay RT(21) to operate during the silent period of ringing when relay R(21) is released. Relay RT(21) operates from the previously described ringing trip battery to ringing ground. Relay RT(21), in operating, opens at its contacts the locking circuit for relay RC(11) which thereupon releases. The release of relay RC(11) operates the relay S(11) through its two windings and contacts 4 and 9 of relay RC(11) over the closed line loop. Relay S(11) supplies ground over its contact to hold relay SI(11) operated in an obvious circuit. The release of relay RC(11) releases the hold magnets on the ringing selection switch to thereby release such switch, and releases relays PU(11), DC(11) and RS(21). The release of relay RS(21) releases relay RT(21) and the ringing cycle is discontinued. The calling party, being aware of the cessation of ringing, knows that the called party has answered and has tripped the ringing. The calling subscriber now may pick up his receiver and hold a conversation with the called party under the supervision of relay S(11). Relays RI(21) and RVD(21) release when the ringing selection switch is released. Relay RV(21) releases when relay RVD(21) is released. Relay RC(11), in releasing, releases relay P(21) and the releases of relays RC(11) and P(21) release relays P29(33), P60(33), P34(33) and A34(33).

The relays remaining operated in the trunk circuit are relay S(11) over the line loop, relay SI(11) to ground at relay S(11), relay RPD(21) to ground at the relay SI(11) and relay RP(21) under control of relay RPD(21). The hold magnets of the link frames 103 and 112 are held from ground at relay SI(11), through resistance A(11) and over the sleeve conductor 1104.

At the conclusion of the conversation between subscribers 100 and 101 and after both parties (and all others whose receivers may have been lifted from their switch hooks) have hung up, relay S(11) releases. Relay S(11), in releasing releases relay SI(11). Relay SI(11), in releasing, releases relays RPD(21) and RP(21) and all of the hold magnets on the link frames, to thereby return all circuits to normal.

It is not intended that the scope of the present invention be limited to the embodiment disclosed by way of example; consequently, claims are appended which alone define the scope of the invention.

What is claimed is:

1. In a telephone system, a subscriber line having a plurality of substations thereon, a set of switches, a switch controlling marker, registers in said marker, means operable under the control of a calling one of said substations to register in said registers of said marker the calling line number and the called line number, a reverting ringing trunk, means in said marker to compare the calling line number with the called line number, and means in said marker operable under the control of registrations of identical numbers in said marker to control said switches to connect said line with said trunk.

2. In a telephone system, a subscriber line having a plurality of substations thereon, a set of switches, a switch controlling marker, a register circuit, means operable under the control of a calling one of said substations to connect said register circuit with said line, means to register the calling line number and the called line number in said register circuit, means to transmit said registrations to registers in said marker, a reverting ringing trunk, means in said marker to compare the calling line number with the called line number, and means in said marker operable under the control of registrations of identical numbers in said marker to control said switches to connect said line with said reverting trunk.

3. In a telephone system, a subscriber line having a plurality of substations thereon, a set of switches, a switch controlling marker, a register circuit, means operable under the control of a calling one of said substations to connect said register circuit with said line, means to register the calling line equipment location number and the called line directory number in said register circuit, means to transmit said registrations to registers in said marker, a translator circuit, means under the control of said marker for transmitting to said translator circuit the said called line directory number registration and to receive from said translator circuit in registers in said marker the called line equipment location number, a reverting ringing trunk, means in said marker to compare the equipment location numbers of said calling and called lines, and means in said marker operable under the control of registrations of identical location numbers in said marker to control said switches to connect said line with said reverting trunk.

4. In a telephone system, a subscriber line having a plurality of substations thereon, a set of switches, switch controlling markers, means operable under the control of a calling one of said substations to connect one of said markers with said line and to register in registers of said one marker the calling line equipment location number, a register circuit, means for connecting said one marker with said register circuit and for transmitting to said register circuit the calling line equipment location number, means under the control of said one marker for interconnecting said register circuit with said line, means for registering in said register circuit the called line directory number, means to transmit to registers of one of said markers the calling line equipment location number and the called line directory number registrations of said register circuit, a translator circuit, means under the control of the latter marker for transmitting to said translator circuit the said called line directory number and to receive from said translator circuit in registers in said latter marker the called line equipment location number, a reverting ringing trunk, means in said latter marker to compare the equipment location numbers of said calling and said called lines, and means in said latter marker operable under the control of registrations of identical location numbers in said marker to control said switches to control said switches to connect the equipment location comprising said line with said reverting trunk.

5. In a telephone system, a subscriber line having a plurality of substations thereon, a set of switches, a switch controlling marker, registers in said marker, means operable under the control of a calling one of said substations to register in said registers of said marker the calling line number and the called line number, an intraoffice trunk, means responsive to the registration of said called line number in said marker for initiating an interconnection over said switches between said trunk and said line, a reverting ringing trunk, means in said marker to compare the calling line number with the called line number, and further means operable under the control of registrations of identical numbers in said marker to control said switches to release the initiated intraoffice trunk interconnection and to connect said line with said reverting ringing trunk.

6. In a telephone system, a subscriber line having a plurality of substations thereon, a set of switches, a switch controlling marker, a register circuit, means operable under the control of a calling one of said substations to connect said register circuit with said line, means to register the calling line number and the called line number in said register circuit, means to transmit said registrations to registers in said marker, an intraoffice trunk, means responsive to the transmission of part of the called line number to said marker for initiating an interconnection over said switches between said trunk and said line, a reverting ringing trunk, means in said marker to compare the calling line number with the called line number, and further means operable under the control of registrations of identical numbers in said marker to control said switches to release the initiated intraoffice trunk interconnection and to connect said line with said reverting ringing trunk.

7. In a telephone system, a subscriber line having a plurality of substations thereon, a set of switches, a switch controlling marker, a register circuit, means operable under the control of a calling one of said substations to connect said register circuit with said line, means to register the calling line equipment location number and the called line directory number in said register circuit, means to transmit said registrations to registers in said marker, an intraoffice trunk, means responsive to the transmission of the office code of said directory number to said marker for initiating an interconnection over said switches between said trunk and said line, a translator circuit, means under the control of said marker for transmitting to said translator circuit some of the numericals of said directory number and for receiving from said translator circuit in registers in said marker the called line equipment location number, a reverting ringing trunk, means in said marker to compare the calling line location number with the called line location number, and further means operable under the control of registrations of identical location numbers in said marker to control said switches to release the initiated intraoffice trunk interconnection and to connect said line with said reverting ringing trunk.

8. In a telephone system, a subscriber line having a plurality of substations thereon, a set of switches, switch controlling markers, means operable under the control of a calling one of said substations to connect one of said markers with said line and to register in registers of said one marker the calling line equipment location number, a register circuit, means for connecting said one marker with said register circuit and for transmitting to said register circuit the calling line equipment location number, means under the control of said one marker for interconnecting said register circuit with said line, means for registering in said register circuit the called line directory number, means to transmit to registers of one of said markers the calling line equipment location number and the called line directory number registrations of said register circuit, an intraoffice trunk, means responsive to the transmission of the office code of said directory number to said one marker for initiating an interconnection over said switches between said trunk and said line, translator circuits, means under the control of said latter marker for establishing a connection between itself and one of said translator circuits depending upon the thousands numerical digit of said directory number, additional means under the control of said latter marker for transmitting to said one translator circuit the hundreds, tens and units numerical digits of said directory number and for receiving from said one translator circuit in registers in said latter marker the called line equipment location number, a reverting ringing trunk, means in said latter marker to compare the calling line location number with the called line location number, and further means operable under the control of registrations of identical location numbers in said marker to control said switches to release the initiated intraoffice trunk interconnection and to connect said line with said reverting ringing trunk.

RALPH E. HERSEY.

REFERENCES CITED

The following references are of record in the file of this patent:

UNITED STATES PATENTS

| Number | Name | Date |
|---|---|---|
| 1,575,140 | Williams | Mar. 2, 1926 |
| 2,164,731 | Bascom | July 4, 1939 |
| 2,355,207 | Dehn | Aug. 8, 1944 |
| 2,385,228 | Ostline | Sept. 18, 1945 |
| 2,392,089 | Hersey | Jan. 1, 1946 |